United States Patent [19]

Morgan

[11] Patent Number: 5,596,698
[45] Date of Patent: Jan. 21, 1997

[54] METHOD AND APPARATUS FOR RECOGNIZING HANDWRITTEN INPUTS IN A COMPUTERIZED TEACHING SYSTEM

[76] Inventor: Michael W. Morgan, 733 Sutton Dr., Walnut Creek, Calif. 94598

[21] Appl. No.: 381,010

[22] Filed: Jan. 30, 1995

Related U.S. Application Data

[63] Continuation of Ser. No. 82,031, Jun. 24, 1993, abandoned, which is a continuation-in-part of Ser. No. 994,950, Dec. 22, 1992, Pat. No. 5,428,805.

[51] Int. Cl.$^6$ .............................. G06K 9/00; G06F 3/033
[52] U.S. Cl. ........................ 395/339; 382/186; 382/189; 364/709.12; 434/308; 395/751
[58] Field of Search .................................. 395/800, 152, 395/155, 154, 146, 161, 179, 180, 149, 27, 22, 24, 21, 133, 12, 62, 51, 157; 345/168, 175, 179, 180, 181, 182, 183, 173, 119; 364/DIG. 1, DIG. 2, 419.08, 419.01, 419.03, 709.12; 434/159, 162, 163, 308, 156, 165; 382/157, 158, 186, 218, 189, 315, 325, 121, 187

[56] References Cited

U.S. PATENT DOCUMENTS

| | | | |
|---|---|---|---|
| 4,151,596 | 4/1979 | Howells | 364/709.11 |
| 4,464,118 | 8/1984 | Scott et al. | 434/85 |
| 4,578,811 | 3/1986 | Inagaki | 382/182 |
| 4,793,810 | 12/1988 | Beasley, Jr. | 434/165 |
| 5,189,633 | 2/1993 | Bonadio | 364/709.12 |
| 5,233,547 | 8/1993 | Kapp et al. | 364/705.02 |
| 5,249,296 | 9/1993 | Tanaka | 395/700 |

OTHER PUBLICATIONS

"AMS Donates Pen Computing Exhibit to The Computer Museum," *Mobile Systems News*, American Management Systems, Inc. publication.
"Exciting Pen Computer Products," Ink Development Corporation publication.
"The Newest Advancement in Computers . . . THE PEN!," Greycat, Inc. publication.
"Numero!The financial work processor for pen computers," 1992 PenMagic Software Inc. publiczation.
"Numbers to go: PenCell Portable Spreadsheet," PenWare, Inc. publication.
"PenMan™ Wireless Pen And Digitizer," 1992 Logitech publication.
"The Dauphin Difference," 1992 Dauphin Technology, Inc. publication.
"Wacom Application Report 6 For Pen Computer Manufacturers and Software Developers," Wacom Technology Corporation publication.
"Perspective," 1992 Pensoft Corporation publication.
"Desktop Pen Computing," FTG Data Systems publication.
"Kurta High Performance Pen System For Pen–Based Computers," 1992 Kurta publication.
"The Magazine of Pen–Based Computing," *pen*, PenWorld Inc., Issue 9, Sep./Oct. 1992.
"de–ja vu," Slate Corporation publication.
"Slate At–Hand™," 1992 Slate Corporation publication.
"FieldNotes, GIS for *Laptop* and *Pentop* Computers!," PenMetrics, Inc., 1992 publication.
"Sales Automation solutions: General Programming, Inc. uses Infolio™ to premiere Sales–Manager™ tool," PI Systems Corporation publication.

(List continued on next page.)

Primary Examiner—Daniel H. Pan
Attorney, Agent, or Firm—Merchant, Gould, Smith, Edell, Welter and Schmidt

[57] ABSTRACT

A pen-based teaching system recognizes handwritten input. The system comprises a display simulating a sheet of paper, and a stylus simulating a pen. The system uses handwriting recognition to interact with the student, so that the student enters input into the system as though it were a piece of scratch paper.

24 Claims, 42 Drawing Sheets

OTHER PUBLICATIONS

"Slate PenApps™ Application is the complete development environment for pen–based applications," Slate Corporation, 1992 publication.

"Microsoft® Windows™ for PEN Computing Resource Guide: Pens," Microsoft Consulting Services publication.

"Stroke of the Hand," Concept Technologies, Inc., 1992 publication.

"SuperScript II DISPLAY TABLET," SuperScript Inc. publication.

"PenPoint™," GO Corporation, 1992 publication.

"All–Terrain Supertablet™," Tusk Inc., Jul. 1992 publication.

"Programming Windows™ for Pen Computering Using Visual Basic™," Synaptix, Inc., 1992 publication.

"The Next Wave of Portable Computing PC Labs Tests the First Eight Pen PCs," *PC Magazine*, Nov. 10, 1992, vol. 11, No. 19, pp. 175–178, 182–186, 191–203.

"486 Pen PC," *Microslate*, 1992 publication.

"Nope. It Wasn't Steroids!" *Microslate*, publication.

– 5,596,698 –

METHOD AND APPARATUS FOR RECOGNIZING HANDWRITTEN INPUTS IN A COMPUTERIZED TEACHING SYSTEM

CROSS-REFERENCE TO RELATED APPLICATION

This is a continuation, of application Ser. No. 08/082,031, now abandoned, filed Jun. 24, 1993, which is a continuation-in-part of application Ser. No. 07/994,950, now U.S. Pat. No. 5,428,805, filed Dec. 22, 1992, by Michael W. Morgan, and entitled "PEN-BASED CALCULATOR," which application is incorporated by reference herein.

BACKGROUND OF THE INVENTION

1. Field of the Invention

This invention relates generally to a computer-implemented teaching apparatus, and more specifically, to a teaching system capable of recognizing handwritten input.

2. Description of Related Art

Current teaching methods typically revolve around a classroom with the simultaneous teaching of a group of students by a single teacher. This has the advantage of using teachers efficiently, and is the dominant form of teaching today. However, it has several disadvantages.

For many students, the classroom is slow and inefficient because students have varying levels of skill, and the students can easily become bored. Typically, there is no immediate feedback for students in the form of quizzes or exercises, and thus correction of any mistakes or misconceptions in the learning process must come much later. Usually, there is little or no explanation regarding mistakes, thereby hindering the student's ability to get immediate feedback on the learning process. Further, there is significant teacher effort in grading or correcting quizzes and other exercises.

There have been numerous attempts to overcome some the deficiencies of the classroom setting. One example is the tutoring method, wherein a single student is instructed by a single teacher or tutor. This has the advantage of being very efficient for the student, because the student's progress is not hampered by the interaction of other students. Moreover, it provides one-on-one interaction with the tutor, so that the student can progress at their own pace. In addition, tutoring provides immediate feedback and correction of the student's mistakes, thereby facilitating the learning process. On the other hand, tutoring is a very inefficient use of teacher time and thus is rarely used.

Another example is a computer-assisted instructional (CAI) system. CAI systems have the advantage that students can interact one-on-one with the system and thus progress at their own pace. However, prior art CAI systems have numerous disadvantages as well. For example, prior art CAI systems typically consist of automated practice drills or tests, and provide little in the way of instruction. Moreover, the teacher cannot observe the student's learning process and provide appropriate help at those points in the process where mistakes are made.

Thus, there is a need in the art for enhanced instructional methods and apparatus.

SUMMARY OF THE INVENTION

To overcome the limitations in the prior art described above, and to overcome other limitations that will become apparent upon reading and understanding the present specification, the present invention discloses a computer-implemented, pen-based teaching system that recognizes handwritten input. The system comprises a display simulating a sheet of paper, and a stylus simulating a pen. The system uses handwriting recognition to interact with the student, so that the student enters input into the system as though it were a piece of scratch paper.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

Figure 1:
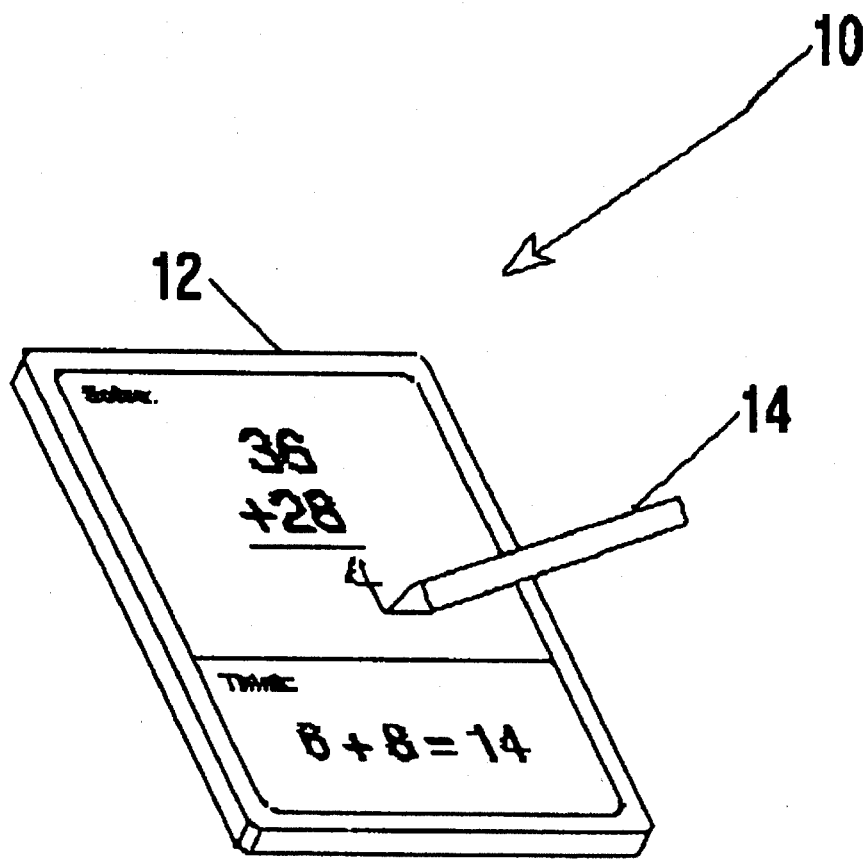
FIG. 1 is a pserspective view of the present invention.

FIG. 1 illustrates the present invention, termed a TeachPad™ computer 10, which is a computer-implemented, pen-based teaching system that uses interactive computer graphics and handwriting recognition to teach a student in virtually any subject area. The TeachPad computer 10 comprises a display 12 simulating a sheet of paper and a stylus 14 simulating a pen. The TeachPad computer 10 uses handwriting recognition to interact with the student, so that the student enters input into the TeachPad computer 10 as though it were a piece of scratch paper.

The TeachPad computer 10 could be as small as about 4 by 5 inches or as large as 8 by 10 inches. It must either be very flat or provide a large wrist area, to allow natural handwriting. If there is a wrist area, it supports both left- and right-handed students.

The combination of interactive computer graphics with handwriting recognition makes it possible to teach in ways that previously were not possible. The characteristics of the TeachPad computer 10 comprise:

(1) The TeachPad computer 10 presents a natural pen-and-paper interface to the student.

(2) The TeachPad computer 10 guides a student through the problem-solving process by animating the solution algorithm.

(3) The TeachPad computer 10 corrects the student's mistakes at the time the student makes them.

The TeachPad computer 10 combines the advantages of current teaching methods while eliminating various disadvantages. It allows a student to have one-on-one interaction during the learning process, which is very efficient for the student who can then progress at their own rate.

The TeachPad computer 10 enhances the instruction and guidance aspects of teaching. When defining a new concept, the "thinking" or "problem-solving" process can be animated for new concepts. The TeachPad computer 10 prompts the student to respond and/or interact with the process. The TeachPad computer 10 also provides an immediate feedback and reward indication upon completion of specific tasks in the learning process.

During practice, the TeachPad computer 10 corrects mistakes at the time the student makes them. If the student fails to enter a timely response, the TeachPad computer 10 will proceed on to animate the next step. If no further response is received from the student, the TeachPad computer 10 will provide additional instruction to the student.

The TeachPad computer 10 can be programmed using lesson scripts to provide instruction in any subject area. The TeachPad computer 10 includes a lesson script interpreter that reads a scripting language to determine how the system should interact with the student. Lessons can be easily and compactly described using the scripting language. Moreover, the scripting language is extensible, so that additional features can be added in the future. Localization is possible within the scripting language, so that the TeachPad computer 10 invention can be easily adapted for any language. The TeachPad computer 10 also includes a voice synthesis module wherein spoken text can be specified in the scripting language.

Lessons are comprised of scripts that teach one or more concepts, and courses are comprised of a sequence of one or more lessons covering a particular subject. Typically, there are six phases involved in any lesson or course:

1. A motivation phase providing the student with an incentive to learn a new concept.

2. An instruction phase where the student is provided with a explanation and demonstration of the concept.

3. A guidance phase to help the student through the solution process.

4. A practice phase that allows a student to solve problems without guidance, except for mistakes.

5. A testing phase so that the student is forced to solve several problems within certain time limits, without guidance.

6. A reward phase for successful learning and solving.

Potential lessons and courses that can be developed for use with the TeachPad computer 10 include writing, reading, spelling, arithmetic, word problems, science and engineering, and other subjects.

For writing courses, the TeachPad computer 10 could be used to teach the basics of writing numbers and letters, as well as good penmanship. As the student writes, they would receive immediate feedback. The TeachPad computer 10 would also prompt the student on the proper strokes, sequence, neatness, etc., related to the numbers and letters.

For reading and spelling courses, the TeachPad computer 10 would use video and audio to present the word. As the student writes the word, the TeachPad computer 10 would determine if the word was spelled correctly, and provide immediate feedback to the student. In addition, verbs could be animated to show that they are action words.

For arithmetic and mathematics courses, the TeachPad computer 10 can be used to teach at all levels of complexity, from simple counting to fractions to algebra, trigonometry, calculus and other higher math concepts. The graphics and animation capability of the TeachPad computer 10 are especially valuable for algebra, trigonometry, geometry, calculus and other higher math concepts. The TeachPad computer 10 can follow the student's theorem proving logic and provide feedback where warranted. For word problems, the TeachPad computer 10 can animate the analysis process, and show the student how to derive the solution method from the text, i.e., how to translate the text into an algorithm. The TeachPad computer 10 can display the operation of any algorithm using animation techniques.

For science and engineering courses, such as physics, chemistry, astronomy, biology, and other subjects, the TeachPad computer 10 can simulate experiments to facilitate the learning process.

The TeachPad computer 10 also enhances learning for students with disabilities. For example, if the student has a hearing ability, the TeachPad computer 10 can be used without audio or speech capabilities, and could display or teach sign language. For learning disabilities, the TeachPad computer 10 can be programmed for special lessons on reversals, dyslexia, etc.

To support teachers' use, the TeachPad computer 10 provides administrative functions including previewing lessons, the ability to display information from the teacher screen on a student screen or external monitor, lesson control where the teacher specifies the sequence of lessons for students or groups of students, lesson customization so that the teacher can set the parameters that direct the learning process, and tracking the status and progress of students.

The TeachPad computer 10 is particularly well suited for use by schools, teachers, parents, students, and businesses. Schools could benefit significantly by supplying every student and every teacher with a TeachPad computer 10. This maximizes the teacher's efficiency, allowing large classes to be taught more effectively with less effort. Alternatively, a school might equip a small number of rooms with TeachPad computers 10 at every desk. This allows classes to make use of the TeachPad computer 10 for a portion of the day, perhaps when introducing specific subjects. Finally, a school might have a limited number of TeachPad computers 10 available for short-term use by individual students that are having difficulties.

Since the TeachPad computer 10 increases a teacher's efficiency, teachers as individuals could benefit from the TeachPad computer 10. If the price is low enough, a teacher might buy one or a few TeachPad computers 10 for use in his or her class by all students for part of the day or by specific students that need more help.

Many parents want their children to have a better education than that provided by the schools. However, few parents have the time or ability to do much of the work themselves. For this reason, many parents buy educational devices and computer programs for their children. Unfortunately, these devices usually only provide practice taking tests, and provide little, if any, instruction. Most parents are reluctant to provide the instruction. Since the TeachPad computer 10 provides instruction to students, parents without the training or time to teach their own children will benefit from their child's use of the TeachPad computer 10.

Besides parents of children attending school, there are some parents who teach their children at home, usually for religious reasons. These parents might also benefit from the TeachPad computer 10, especially if religion-friendly lessons were available.

Of course, the student is the person who ultimately benefits from the use of the TeachPad computer 10.

A business might find the TeachPad computer 10 useful in certain situations. For example, the interactive lessons might help train new employees on complex business procedures or manufacturing processes. The business might also have products that require extensive customer training and the TeachPad computer 10 may prove useful in meeting this need. To be competitive with other training methods, such as printed materials or videotapes, the TeachPad computer 10 must take advantage of its interactive student interface. To be competitive with training by humans, the TeachPad computer 10 need only be significantly less expensive.

EXAMPLE LESSONS

Figure 2A:
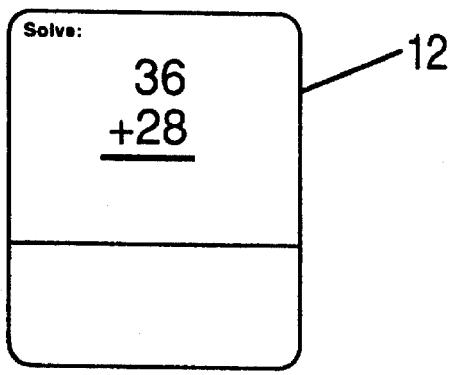
FIGS. 2A–2P illustrate the sequence of steps performed by the student using the TeachPad computer in a typical lesson.
Figure 2B:
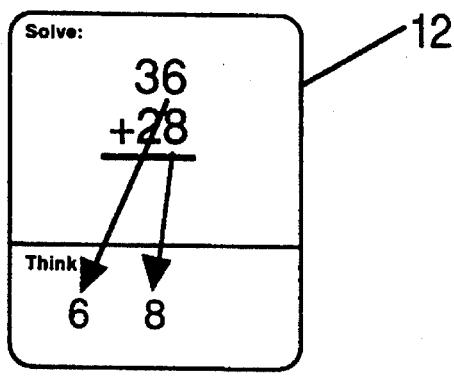
Figure 2C:
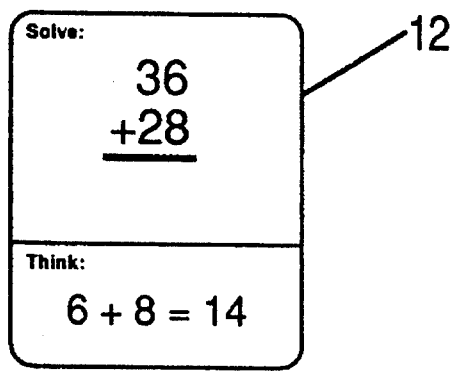
Figure 2D:
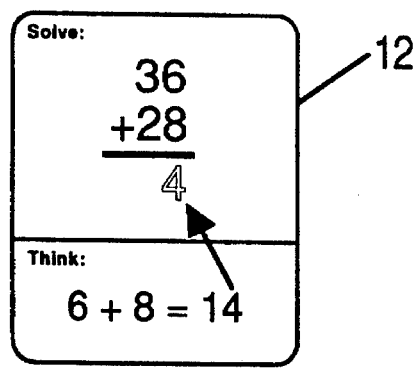
Figure 2E:
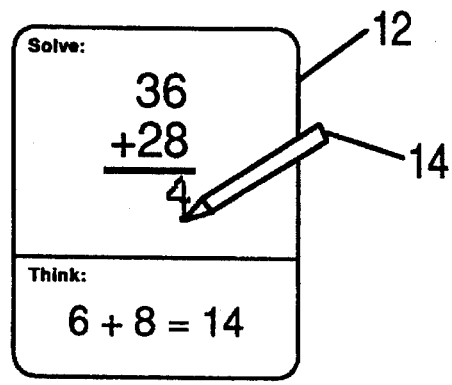
Figure 2F:
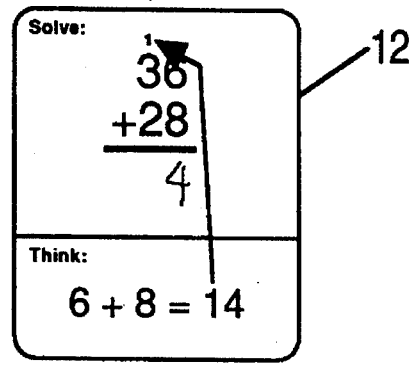
Figure 2G:
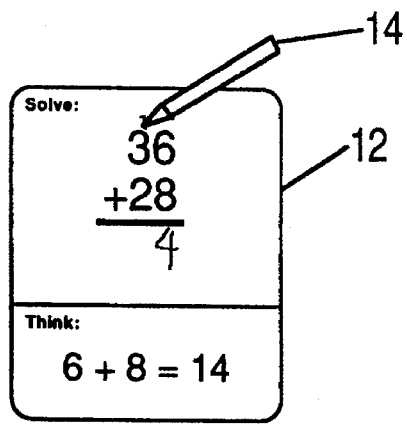
Figure 2H:
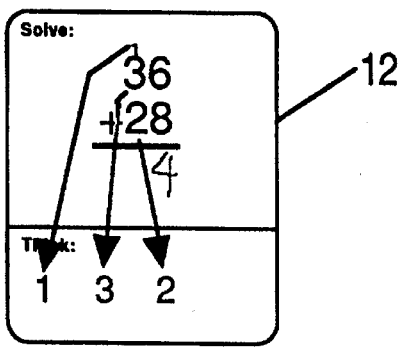
Figure 2I:
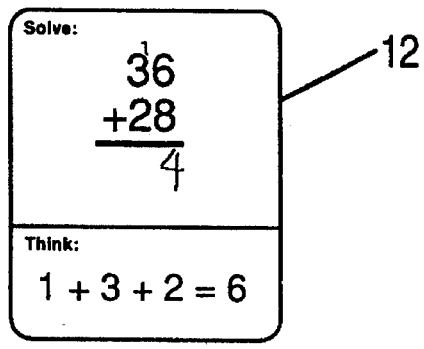
Figure 2J:
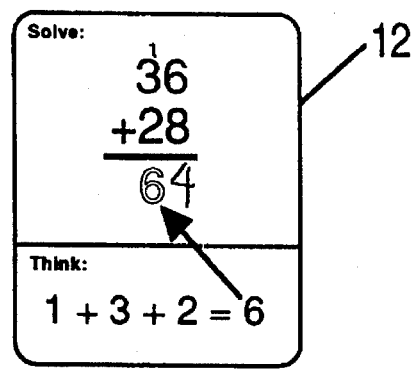
Figure 2K:
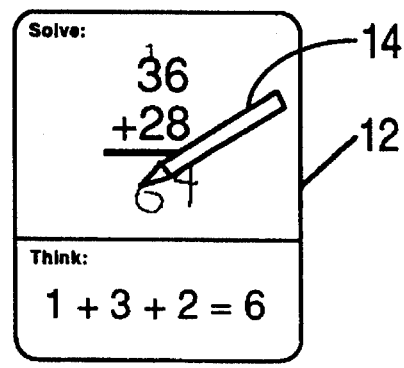
Figure 2L:
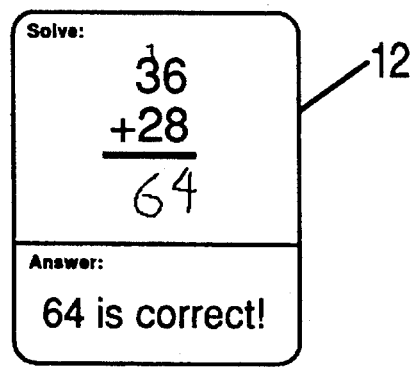
Figure 2M:
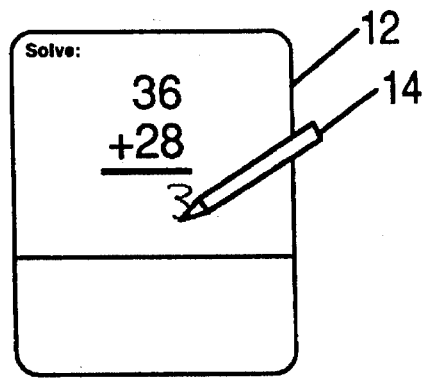
Figure 2N:
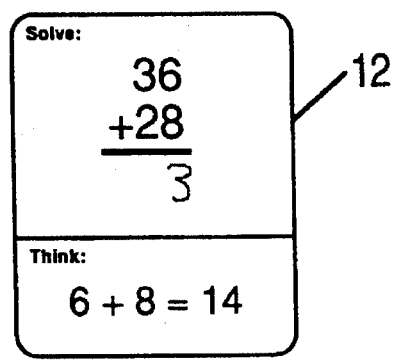
Figure 2O:
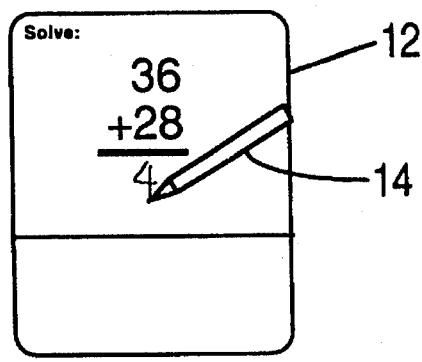
Figure 2P:
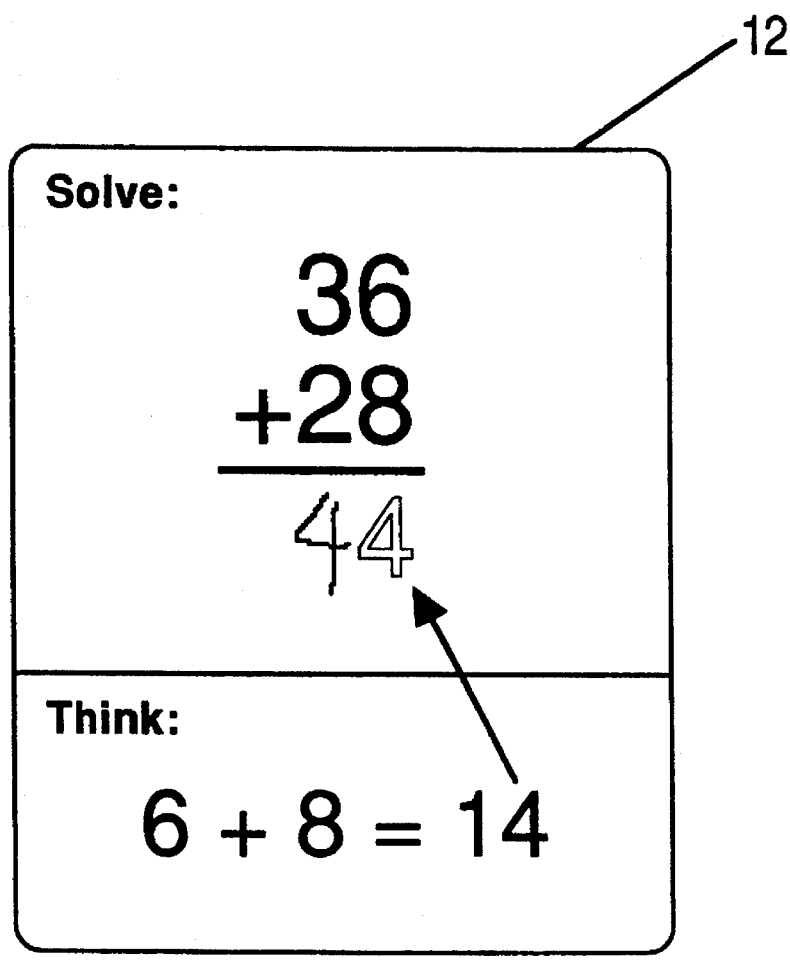

FIGS. 2A–2P illustrate a typical sequence of steps performed by the student using the TeachPad computer 10.

Consider a student learning two-column addition with regrouping (carrying). Prior to that point, the student has learned horizontal and vertical one-digit addition as well as two-column addition without regrouping. The student is first asked to solve a problem, as illustrated in FIG. 2A, wherein the display 12 of the TeachPad computer 10 is logically divided into labeled subareas titled as "solve" and "think".

The student is told that regrouping is required when the digits add up to ten or more. The regrouping process is displayed graphically in several steps. First, copies of the two digits to add move into the "think" area. The think area shows what the student is supposed to be thinking about. The arrows in this illustration are not actually drawn; they show the path taken by the moving digits, as illustrated in FIG. 2B.

Next, the two digits are added together, yielding a two-digit sum that is also displayed in the think area. The student is not asked to enter the sum in the think area because he or she is supposed to mentally compute the sum, as illustrated in FIG. 2C.

Then, the one's digit of the sum in the think area moves to the one's digit of the problem, but disappears when it gets there because the student is supposed to write it down. The digit is not actually displayed in outline; this just indicates that the digit is erased after a short while, as illustrated in FIG. 2D.

The TeachPad computer 10 waits for the student to write the correct digit in the correct location, as illustrated in FIG. 2E.

After the student correctly writes down the one's digit of the sum, the ten's digit of the sum in the think area (a "1") moves to the carry area over the ten's digits of the problem. Again, it disappears when it gets there because the student is supposed to write it down, as illustrated in FIG. 2F.

The TeachPad computer 10 waits for the student to write the carry digit in the correct location, as illustrated in FIG. 2G.

After the student correctly writes down the carry digit, the two ten's digits of the problem and the carry move into the think area, as illustrated in FIG. 2H.

Then, the three digits are added together, yielding a sum that is also displayed in the think area, as illustrated in FIG. 2I.

Next, the sum moves to the ten's digit of the problem, again disappearing when it gets there, as illustrated in FIG. 2J.

Finally, the TeachPad computer 10 waits for the student to write the correct digit in the correct location, as illustrated in FIG. 2K.

After the student completes the answer correctly, the TeachPad computer 10 tells the student the answer is right, as illustrated in FIG. 2L.

After going through this process a few times correctly, the TeachPad computer 10 asks the student to do the problems without any guidance on placement, e.g., without showing anything moving into or out of the think area. After doing this a few times correctly, the student is asked to solve the problems entirely on his or her own by not showing anything in the think area. After successfully completing several problems without any help, and then completing a timed test, the student is finished with the lesson.

Besides animating the solution process, the TeachPad computer 10 helps the student by responding to mistakes immediately. Not only is the response immediate, but it is appropriate to the kind of mistake make. For example, suppose the student writes the wrong digit in the one's place, as illustrated in FIG. 2M.

This probably indicates that the student thought:

6+8=13

The TeachPad computer 10 shows the correct one-digit sum in the think area and waits for the student to write the correct digit. The "4" does not move from the think area to the problem area because the student obviously knew where to write the digit, as illustrated in FIG. 2N.

Suppose instead the student writes the correct digit in the wrong place, as illustrated in FIG. 2O.

The TeachPad computer shows the digit moving from the think area to the correct location and then waits for the student to write the digit there, as illustrated in FIG. 2P.

Finally, if the student simply fails to respond within a certain length of time, the TeachPad computer 10 animates the next step again. If there is still no response, the TeachPad computer 10 may provide more explicit written and/or voice instructions.

HARDWARE

Figure 3:
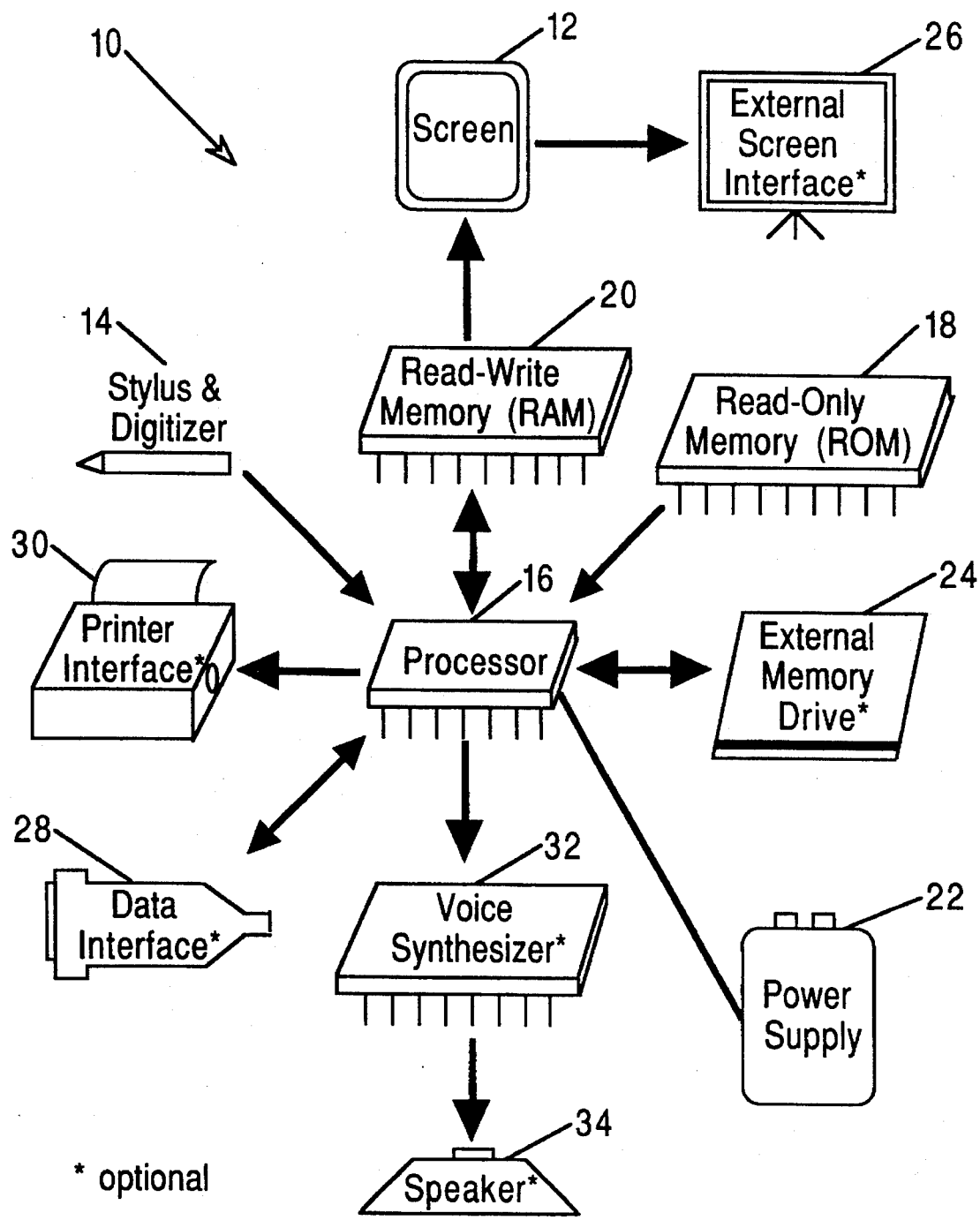
FIG. 3 illustrates the typical components used in the TeachPad computer.

FIG. 3 illustrates the typical components used in the TeachPad computer 10. The TeachPad computer preferably comprises a screen/digitizer 12, a stylus 14, a processor 16, read-only and read-write memory 18 and 20, and a power supply 22. It is likely to also require an external memory device 24. Some versions of the TeachPad computer 10 might also incorporate an external screen interface 26, a data interface 28, a printer interface 30, and a voice synthesizer 32 and speaker 34.

SCREEN

The screen 12 of the TeachPad computer 10 ideally resembles a sheet of paper in a notepad. It should be flat, bright, high contrast, low weight, and use very little power. When the stylus 14 glides across the surface of the screen 12, it should feel like pen or pencil on paper. There should be about one hundred or more pixels per inch.

STYLUS/DIGITIZER

The stylus 14 used with the TeachPad computer 10 ideally resembles a pencil or pen and should have the same size and weight. The stylus 14 may or may not be attached to the TeachPad computer 10 by a flexible and retractable cord to prevent the stylus 14 from being lost or taken by the student.

The digitizer (not shown) overlays or is incorporated in the screen 12 and detects when and where the stylus 14 tip touches the screen 12. As the stylus 14 touches and moves over the screen, the TeachPad computer 10 darkens the pixels under the stylus 14. This simulates the appearance of ink on paper, and shows the student what he or she wrote. As digitizer technology progresses, the student will be able to use a real pen or pencil as a stylus 14. However, this requires a fairly hard screen 12 surface to avoid damage.

Young children usually apply too much pressure to the pen or pencil when writing. This means that the screen 12 and stylus 14 should be fairly rugged. It might also be useful to make the stylus 14 pressure-sensitive, and to have the TeachPad computer 10 show the student when the pressure is too much or too little. The appearance of the "electronic ink" might provide an appropriate response, so that no ink would show with too little pressure and excessive or dripping ink would appear with too much pressure.

PROCESSOR

The processor 16 in the TeachPad computer 10 is preferably a low-power microprocessor that runs the software. Low-power versions of the INTEL 80×86, MOTOROLA 680×0, as well as other processors, are suitable for the TeachPad computer 10. Further, special-purpose circuits or microprocessors (e.g., neural networks, ASICs, etc.) may also be used.

READ-ONLY MEMORY

The internal read-only memory (ROM) 18 in the TeachPad computer 10 contains the software for performing the basic functions of the TeachPad computer 10, for recognizing handwriting, and for running lesson scripts. The ROM 18 might also contain some or all of the scripts that specify the individual lessons. Depending on the number of scripts in ROM 18, the TeachPad computer 10 requires from 128 to 512 kilobytes.

READ-WRITE MEMORY

The internal read-write memory (RAM) 20 of the TeachPad computer 10 holds all the information regarding the student's interaction with the lesson. This includes which lesson the student is in, the lesson parameters, how far the student is into that lesson, what kinds of difficulties the student is having, and what the screen 12 is displaying. Depending on the size and resolution of the screen 12, the TeachPad computer 10 requires from 32 to 64 kilobytes of RAM 20. Additional RAM 20 may be required if lessons can be stored in RAM 20 as well.

POWER SUPPLY

The power supply 22 in the TeachPad computer 10 provides electrical power to all of the components. The power supply 22 is ideally a small battery that lasts about a year with normal usage. Alternatively, the TeachPad computer 10 could be plugged into an AC adapter.

REMOVABLE MEMORY

The removable memory 24 of the TeachPad computer 10 could comprise both read-only and read-write memories. Removable memory 24 is not required, since scripts can be stored in internal ROM 18 and student information can be stored in internal RAM 20. However, removable memory 24 allows new lessons to be created for the TeachPad computer 10, which provides an inexpensive way for students to upgrade, as well as creating a market for lessons developed by third parties. In addition, removable memory 24 allows information about an individual student to be kept physically separate from other students. This makes it practical for more than one student to use a single TeachPad computer 10.

Preferably, removable memory 24 is in a small card or disk that is inserted into a slot on the side of the TeachPad computer 10. The TeachPad computer 10 allows students to remove and insert cards at any time.

EXTERNAL SCREEN INTERFACE

A teacher's version of the TeachPad computer 10 might support an optional external screen interface 26. Normally, the external screen 26 is a large video monitor viewed by all the students in the class, or it can be a transparent LCD panel placed on an overhead projector. The teacher typically uses the external screen 26 to provide instruction (as an alternative to the blackboard), and to show the students what to expect when they follow the next lesson.

DATA INTERFACE

Classroom versions of the TeachPad computer 10 might support a data interface 28 which allows the student's TeachPad computer 10 to communicate with the teacher's TeachPad computer 10. For example, the teacher could transmit lessons and lesson parameters to the student's TeachPad computer 10, and then the student's TeachPad computer 10 could send information about the student's progress and performance back to the teacher's TeachPad computer 10. With a data interface 28, the student's TeachPad computer 10 does not necessarily require any removable memory 24, since the teacher's TeachPad computer 10 could hold the lesson scripts and the status of each student.

The data interface 28 might comprise a cabling interface or a transceiver for infrared or radio signals. A cable requires a physical connection between the student's and teacher's TeachPad computers 10, which is expensive and inconvenient to install in a classroom. On the other hand, a cable is least likely to suffer interference.

Radio waves don't require a physical connection, but they do require more power and add more weight to the student's TeachPad computers 10. An infrared transceiver is the most cost effective, but requires line-of-sight to transmit. This could be solved by providing one or more relays on the ceiling, where they are visible to every the TeachPad computer. Even with relays, communication can still be interrupted by papers, books, or hands covering the transceiver.

With a separate device that connects to a computer, the teacher's TeachPad computer 10 is able to communicate with a desktop or other computer. This allows the TeachPad computer 10 to receive student rosters stored on the computer, or to send student grades to the computer.

PRINTER INTERFACE

Some versions of the TeachPad computer 10 might support an optional printer interface 30. The printer interface 30 allows the TeachPad computer 10 to print information on paper. A student's TeachPad computer 10 could print "awards" for students who successfully complete a series of lessons, or who do exceptionally accurate or neat work. A teacher's TeachPad computer 10 could print reports on each student's progress and performance. The interface 30 supports most printers likely to be found in a computerized classroom.

The printer interface 30 might be a direct connection to the printer, using either a standard serial or parallel computer-printer cable. The printing information might also be sent through the data interface 28, where a separate device connected to the printer can receive it.

VOICE SYNTHESIZER/SPEAKER

Some versions of the TeachPad computer 10 might provide a voice synthesizer 32 and speaker 34 for generating spoken voice output. Voice synthesis can be implemented in either hardware or software. A "speaking" TeachPad computer 10 may help students learn faster since they hear as well as read the instructions. A "speaking" TeachPad computer 10 is also useful for students who don't yet know how to read. Although a "speaking" TeachPad computer 10 is viable for home use, in the classroom it probably would require each student to wear earphones.

SOFTWARE

Figure 4:
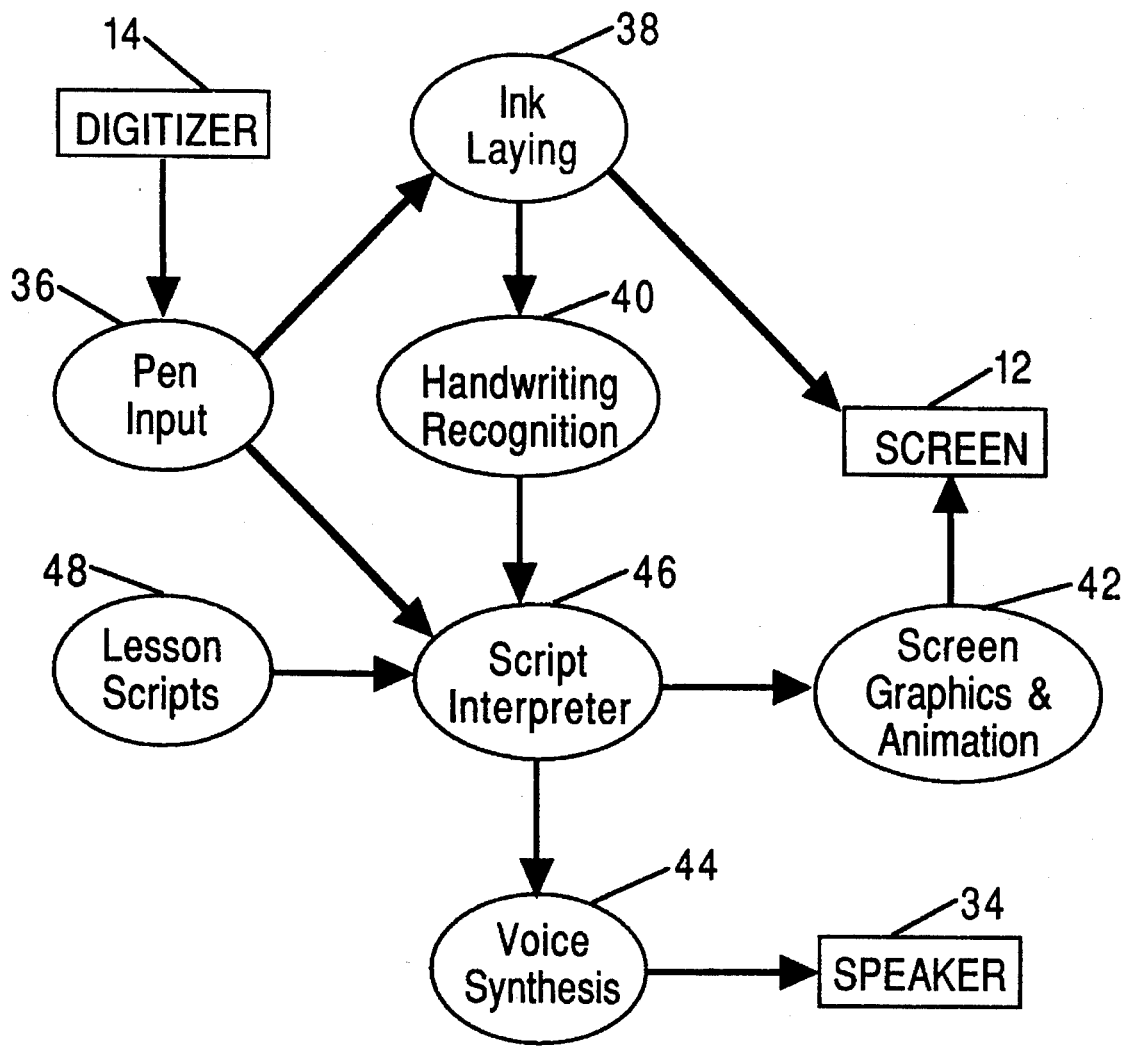
FIG. 4 is a block diagram illustrating the structure of the software modules controlling the operation of the TeachPad computer.

FIG. 4 is a block diagram illustrating the structure of the software modules controlling the operation of the TeachPad computer 10, including a pen input module 36, ink laying module 38, handwriting recognition module 40, graphics and animation module 42, voice synthesis module 44, script interpreter module 46, and lesson scripts module 48. Most of the TeachPad computer's functionality is implemented in software.

PEN INPUT AND INK LAYING

The pen input module 36 accepts pen input from the screen/digitizer 12, and the ink laying module 38 displays "electronic ink" on the screen 12. The TeachPad computer 10 displays "electronic ink" to simulate pen on paper when the tip of the stylus 14 touches the screen 12. This simply means that pixels turn dark when the stylus 14 passes over them. This is the one software function where timing is critical. Pixels under the stylus 14 must turn dark without any perceptible delay. The path of the electronic ink is recorded separately from its display, since it is needed by the handwriting recognizer module 40.

HANDWRITING RECOGNITION

The handwriting recognition module 40 analyzes the electronic ink to determine what the student wrote. This function is essential since it allows the TeachPad computer 10 to determine if the answer is correct. The handwriting recognition module 40 must be fairly quick, since the student expects a response within a fraction of a second after writing the character.

Although handwriting recognition is technically very difficult (for computers), this is partly because people write in many significantly different ways. Furthermore, young children may have difficulty writing neatly. However, good penmanship is considered important for schoolwork, and young children are taught the "correct" way to write. Thus it may be acceptable for the TeachPad computer 10 to expect students to write in a way that is not difficult for the recognizer. The TeachPad computer 10 might also teach the students good penmanship.

The handwriting recognition module 40 does not require training except possibly with older students who can't be expected to change their penmanship. This avoids some problems associated with more than one student using the same TeachPad computer 10. The handwriting recognition module 40 also requires a high recognition threshold, to minimize incorrect recognitions, so that the student is required to write neatly. When the student's writing is not recognized, the TeachPad computer 10 might ask the student to write more neatly.

The handwriting recognition module 40 recognizes one character at a time to allow the TeachPad computer 10 to recognize mistakes as soon as they are made. With the TeachPad computer 10, there is rarely any advantage to using context to aid in recognition. Context helps to automatically correct errors by the handwriting recognition module 40 or the student. With the TeachPad computer 10, the learning process requires the student to fix his or her own mistakes.

In most applications, once a handwritten character is recognized, it is erased and replaced with a well-formed display of that character. This helps the user determine the accuracy of the recognition, and it converts the writing into a form that the computer can process. However, this is not necessary with the TeachPad computer 10, because the high threshold makes it unlikely a character is recognized incorrectly. Leaving characters as ink better simulates the way students take quizzes and tests with pencil and paper. It also helps distinguish the student's work from the display generated by the TeachPad computer 10.

SCREEN GRAPHICS AND ANIMATION

To keep the lessons visually interesting, the TeachPad computer 10 requires fairly sophisticated text, graphics, and animation capabilities from the screen graphics and animation module 42. For text, the TeachPad computer is able to display characters of different sizes anywhere on the screen 12. For graphics, the TeachPad computer 10 is able to draw lines, arcs, and shapes with different weights, and to fill areas with any pattern. The TeachPad computer 10 can also display bitmap pictures and icons on the screen 12.

For animation, the TeachPad computer 10 is able to show graphic objects (characters, lines, shapes) moving across the screen. The TeachPad computer 10 can also make these objects appear to be moving in front of or behind other objects. Animation on the TeachPad computer 10 need not be particularly fast. A student can easily be confused if objects are moving quickly, or if too many objects are moving at the same time. However, the animation must be free of flicker.

VOICE SYNTHESIS

The voice synthesis module 44 can be implemented either in hardware or in software. If implemented in software, the processor 16 generates the waveforms sent to the speaker 34. If implemented in hardware, an integrated circuit 32 performs that function. In either case, the input to the voice synthesis module 44 is a sequence of phonemes (individual sounds) along with the amplitude, pitch, and duration of each one. The lesson scripts modules 48 specifies the text to be spoken, and the script interpreter module 42 looks up the word in a dictionary to determine its pronunciation. The TeachPad computer 10 includes a dictionary in memory containing the most common words in the spoken language, but scripts sometimes require additional words. The TeachPad computer 10 allows lessons to include dictionary additions on removable memory 24.

With current technology, synthesized voice tends to be somewhat "robotic." A fair amount of effort is required to make the voice sound even mildly natural. An alternative method of speaking is to play recordings of actual human speech. This can sound quite natural, but it requires large amounts of memory for any reasonable amount of spoken text. Furthermore, recorded human speech is difficult to change (the new speech must be recorded again); this makes it harder to modify lessons.

LESSON SCRIPT INTERPRETER

A key component of the TeachPad computer's software is the lesson script interpreter module 46 and lesson scripts module 48. A lesson is a process for teaching a single concept and includes the following steps:

(1) Motivation: The lesson gives the student an incentive to learn a new problem-solving concept. The lesson should use a real-world problem that the student can identify with, or else make a game out of the problem.

(2) Instruction: The lesson briefly explains the new problem-solving concept, in a way that the student can easily understand as an extension of concepts the student already knows.

(3) Guidance: The lesson guides the student through the problem solution one step at a time. Animation may be useful to illustrate the process. It may also help to show what the student should be thinking about in a separate area on the screen 12. Guidance is repeated only as many times as needed to assure learning. For simple concepts, once may be enough.

(4) Practice: The lesson provides the student with experience solving problems without guidance. When mistakes are made, appropriate portions of the guidance process are repeated to refresh the student's memory. Practice is repeated until the student successfully completes several problems without making a mistake. The student may be encouraged to work faster.

(5) Testing: The lesson has the student solve several problems without any assistance and within a certain time period. This verifies that the new problem-solving concept has been mastered. Testing may be repeated until a certain proficiency is reached.

(6) Reward: The lesson rewards the student for learning the concept and solving the problems successfully. The reward might be a spoken congratulation, an entertaining animation sequence, a personalized certificate to display and/or print, a certain number of "points" (to be redeemed by the teacher), or an opportunity to play a game.

The lesson scripts modules 44 are essentially computer programs written in the script language that specify the entire lesson process. A lesson script is a detailed step-by-step description of the process. The lesson script interpreter module 46 is the software that causes the TeachPad computer 10 to follow the script and interact with the student.

The lesson script interpreter module 46 requires scripts to be written in a language designed specifically for describing lessons. This language makes it easier to write new lessons and minimizes the memory required to store the lessons.

The script language of the TeachPad computer 10 is fairly sophisticated, and includes statements of the following types:

(1) Writing: Text of any size and style can be written anywhere on the screen 12. The text can be specified explicitly or extracted from the problem group, the lesson parameters, or the student's name.

(2) Drawing: Lines and shapes with various weights and patterns, as well as pictures in bitmap form, can be drawn anywhere on the screen 12.

(3) Animation: Any part of the screen 12 can be moved smoothly along any path. Alternatively, any part of the screen 12 can be erased and redrawn differently any number of times.

(4) Speaking: Any text being written can also be spoken.

(5) Input: The TeachPad computer 10 waits for the student to tap somewhere on the screen 12, or to write something on the screen 12. Lessons can test where and what was written.

(6) Parameters: Lessons can be customized by setting parameters, such as the number of problems to include in the final test. The teacher specifies the parameter values before the lesson begins.

(7) Selection: Problems can be selected at "random" from a specified problem group.

(8) Status: One or more variables can be set to track the student's performance, such as the number of correct responses on the final test, or the frequency of certain types of mistakes. Status information can be transmitted to the teacher's TeachPad computer 10.

(9) Control: Any part of the script can be repeated any number of times. Different parts of the script can be executed depending on any variable's value (including student input, lesson parameters, and status information).

Since the script language can't anticipate the requirements of future lessons, the TeachPad computer 10 provides a mechanism for extending the language. The extension is written in the machine language of the processor 16, and the script interpreter module 42 links the extension to the corresponding language construct. The extension is included as part of the lesson script that uses it (on removable memory 24).

COURSES

A course is a group of lessons that cover a particular subject. For example, a single course might cover second-grade arithmetic. One of the lessons in this course would be "two-column addition with regrouping in the one's digit." Typically, a course includes a large number of lessons, many of which review prior lessons to make sure the student retains the concepts. Most lessons in a course require that other lessons in the course be completed first. Similarly, many courses may have other courses as prerequisites.

PROBLEM GROUPS

A problem group is a list of ranges of numeric values for a problem's parameters. For example, consider the lesson covering "two-column addition with regrouping in the one's digit." If the problem is "AB+CD," then the problem group requires that B is between 1 and 9, D is between 10–B and 9 (so B+D results in a carry), A is between 1 and 7, and C is between 1 and 8–A (so A+C+1 doesn't result in a carry). Lesson scripts can select problems at random from a problem group, so a different problem is presented each time the lesson is run. Instead of selecting problems entirely at random, the TeachPad computer 10 makes sure the same problem is not repeated too often, or that a particular problem is not selected too infrequently.

Problem groups must be defined carefully to avoid confusion or having to learn more than one thing at a time. As an example, consider teaching two-column addition with regrouping in the one's digit. If the first problem displayed is 24+57, the student might be confused because the sum of the one's digits is unusual (4+7=11). When the one's digit, a "1," moves to the one's digit of the problem solution, and the ten's digit, also a "1," moves to the carry position, the student might not learn which digit goes where. Another example of a bad choice for the first problem is 74+59, since this requires regrouping in both the one's and the ten's digits. That means the student must learn to apply a new concept twice, instead of just once.

Most lessons require more than one problem group. The first problem group excludes any difficult cases, such as the "24+57" described above. Subsequent groups include more of these special cases. As the student completes one group, the lesson goes to the next group.

LOCALIZATION

The TeachPad computer 10 must be localized for different languages and cultures. The hardware does not have to change much, if at all. The software requires only limited changes, such as with the handwriting recognition module 40 and the voice synthesis module 44. Most of the localization is in the lesson scripts modules 48, which normally include a lot of text and many cultural assumptions. Rather than making the language and/or culture a lesson parameter, it is more efficient to write separate lessons for each language and culture.

DISABILITIES

There are many types of disabilities and, to the extent possible, the TeachPad computer 10 accommodates these disabilities. Some of the disabilities which impact the TeachPad computer 10 include:

(1) Hearing: Students unable to hear have no trouble using the TeachPad computer 10, since speech output is not an essential part of most lessons. Where speech is essential, the TeachPad computer 10 might display a person using sign language on the screen 12. This method might also be used in a course teaching sign language.

(2) Seeing: Students unable to see will have trouble making use of the TeachPad computer 10, since communication with the student is primarily through the screen 12. One alternative is to use a Braille screen 12 in which each pixel becomes a raised dot. However, such a screen 12 is expensive. Another alternative is to design lessons that rely on speech output, and keep pen input to a minimum.

(3) Writing: Students physically unable to write may still be able to point using some mechanism other than their hands. In that case, lessons might be designed to limit pen input to pointing at objects on the screen 12. Another alternative is to use speech input and recognition.

(4) Learning: Some students have specific learning disabilities that the TeachPad computer 10 could deal with directly. Lessons might be designed to help these students overcome their disability, after which the students use the regular lessons. Alternatively, lessons might include a parameter specifying a particular disability. When set, the lesson changes to accommodate the disability.

STUDENT FUNCTIONS

TeachPad computers 10 used by students support the student functions of identification, course selection, lesson selection, lesson interaction, and reward.

IDENTIFICATION

The student using a TeachPad computer 10 should be identified, so the TeachPad computer 10 can keep track of that student's progress. Identification is very difficult to do accurately (especially with young children), because they do not follow logon/off protocols without a strong motivation. In a school, the teacher can make sure the students are properly identified. In a home, the TeachPad computer 10 must provide the motivation.

Students are identified simply by their name. Using names, lessons can be "personalized" by displaying the name at various points within a lesson. Names can also be incorporated into any rewards. In a home, the name is sufficient identification. In a school, there is a chance of two students having the same name. In that case, the teacher will already be using a middle initial or a nickname to distinguish the students, and the TeachPad computer 10 can do the same.

Ideally, the identification process should be inexpensive, accurate, and passive (i.e., not requiring any action by the student). With current technology, no such process exists. The most practical method of identification is to assign each student his or her own removable memory card 24. When using the TeachPad computer 10, the student's card must be inserted into a slot. However, this doesn't prevent a student from using a TeachPad computer 10 with someone else's card. It is also easy for cards to be lost. This method is accurate only if the teacher retains control of the cards.

There is an alternative that doesn't require removable memory 24, i.e., have the student identify him or herself when the TeachPad computer 10 is first turned on. This is very inaccurate in the home where children share a single unit. It is also inaccurate in a school where students might intentionally misidentify themselves.

To maximize the accuracy of identification, the TeachPad computer 10 motivates students to identify themselves correctly. The student's name should appear frequently during the lessons, and must also be incorporated into any rewards. The TeachPad computer 10 also makes it easy to switch students at any time. For example, with memory cards 24 as identification, students simply remove one card and insert their own at any time. The TeachPad computer 10 handles the change of student automatically. In the home, a student might touch the displayed name to bring up a list of known students, from which the student selects him or herself.

COURSE SELECTION

Before starting a lesson, the student or teacher first selects a course. A course is a series of lessons covering a single subject. Once a course is selected, it remains selected until completion or until selection of another course. If the TeachPad computer 10 is used by more than one student, each student has a separate course selection.

With a TeachPad computer 10 that supports removable memory 24, each memory card typically contains one course. In that case, a course is selected by simply inserting the card. To change the selection, the student removes the current card and inserts another. Students can do this at any time, even in the middle of a lesson.

The TeachPad computer 10 may also have one or more courses in ROM 18. With a TeachPad computer 10 that doesn't support removable memory 24, or doesn't have any cards inserted, course selection is made from ROM 18. If there is only one course in ROM 18, that course is the one selected. Otherwise, the TeachPad computer 10 displays a list of courses in ROM 18, and the student or teacher then selects the course by tapping its name with the stylus 14.

LESSON SELECTION

Once a course is selected, the TeachPad computer 10 displays a list of lessons in that course. Most lessons require certain prerequisite lessons to be completed first. To make sure students can't select lessons that are too advanced, the TeachPad computer 10 keeps track of which lessons the student has completed successfully. Then, when displaying the list of lessons to the student, the TeachPad computer 10 shows only those lessons whose prerequisites have been completed. The TeachPad computer 10 tracks completed lessons separately for each student and each course, so the student can resume at the correct lesson even when switching courses.

Lessons for young children have two different names, one for the teacher and another for the student. The teacher name indicates what concepts are actually being taught, as in "two-column addition with regrouping." Since a young student would never voluntarily select a lesson with that name, the student name provides the motivation, as in "how many marbles do you and your friend have?"

LESSON INTERACTION

The primary student function of the TeachPad computer 10 is the lesson interaction. This involves following the lesson script and responding to the student's answers, as described above. An off button allows the student to suspend the lesson at any time. The on button allows the student to resume where he or she stopped. A quit button allows the student to end the lesson at any time. In that case, the student may select a different course or lesson.

REWARD

At the end of each lesson, the student is given a reward of some kind. A reward can be an entertaining animation sequence, an award to display or print, or a spoken congratulation. In addition, the student's performance is transmitted to the teacher's TeachPad computer 10, so the teacher can provide more tangible rewards. Rewards are part of the lesson script, and are generated by statements in the script language. The script language allows certain aspects of the reward to be randomized, so a different reward is provided each time.

Another powerful reward is an opportunity to play a game. The TeachPad computer 10 may include several different games. The student is allowed to play one after completing a series of lessons. The games should take advantage of the pen interface, so they differ from the video games familiar to children. The TeachPad computer 10 might also offer a "doodle" mode, which presents the student with a blank screen on which anything can be drawn.

Finally, some students enjoy making up their own problems. Either as a reward, or as part of a lesson, or as part of a review lesson, the TeachPad computer 10 might allow a student to specify a few problems to be solved by him- or herself, or perhaps by another student.

TEACHER FUNCTIONS

The TeachPad computers 10 used by teachers support the teacher functions of instruction, lesson customization, lesson control, and student monitoring.

INSTRUCTION

Before allowing students to take a lesson on the TeachPad computer 10, the teacher may wish to instruct the students on the lesson's concepts, or on how to run the lesson. The teacher's TeachPad computer 10 allows the teacher to run an abbreviated version of the lesson while explaining the concepts. This requires a special lesson script written specifically for instruction. During instruction, the student TeachPad computers 10 could display the screen from the teacher's TeachPad computer 10. In addition, the screen 12 from the teacher's TeachPad computer 10 can be displayed on an external screen 26 visible to every student.

LESSON CUSTOMIZATION

Many teachers prefer to customize lessons to better fit their own style of teaching. This is easy with passive materials such as lesson books, but is quite difficult with pre-programmed lessons on electronic devices. It is not practical to allow teachers to modify lesson scripts, since that requires skill in software maintenance. Therefore, one challenge in writing high-quality lesson scripts is to provide teachers an opportunity for customization through lesson parameters. Script writers must anticipate or determine which kinds of customization most teachers want, and provide a mechanism in the lesson script for these customizations. Besides customization for teaching styles, script writers may provide customizations for different student learning styles, disabilities, and cultural backgrounds.

LESSON CONTROL

Using the teacher's TeachPad computer 10, the teacher specifies the lesson each student is to take, as well as values for that lesson's parameters. The teacher can have the entire class taking the same lesson with the same parameters, or can partition the class into groups of one or more students and specify a different lesson for each group. The student's TeachPad computer 10 transmits the student's name to the teacher's TeachPad computer 10, providing the teacher with a list of students in the class. The teacher makes the lesson selections, and then his or her TeachPad computer 10 transmits the appropriate information to each student TeachPad computer 10.

STUDENT MONITORING

The teacher's TeachPad computer 10 assists the teacher in monitoring each student's progress. The student's TeachPad computers 10 might transmit the following types of information to the teacher's TeachPad computer 10: whether a student is doing anything, where a student is having difficulty, the student's test results, and when a student completes the lesson. The teacher's TeachPad computer 10 displays a list of students along with each student's progress. The teacher might use this information to identify talented students or students with learning problems, to provide individual assistance to students with problems, and to determine the student's grade.

PARENT FUNCTIONS

The TeachPad computers 10 sold for home use may support some parent functions. These functions may be a simplified subset of the teacher functions. A parent might want to specify the lessons that the child is to take, or the parameters of those lessons. A parent might also want to review the child's progress. However, most parents will prefer to give their children the TeachPad computer 10 without any customization or monitoring.

COURSES

The TeachPad computer 10 can implement an incredible variety of courses and lessons. Courses can cover subjects from kindergarten through college. Some potential subject areas are listed here.

WRITING

The TeachPad computer 10 can teach kindergarten students to write numbers and letters correctly. The TeachPad computer 10 speaks the name of a letter or digit, shows what it looks like, and how it is written. Then, the student practices writing the character. The TeachPad computer 10 helps the student write the character correctly by showing where to move the stylus 14 next, while the student is writing. The student learns to write characters with the proper stroke sequence and direction.

Besides printed characters, the TeachPad computer 10 might also teach cursive writing. However, this requires a somewhat more sophisticated handwriting recognition module 40.

READING

The TeachPad computer 10 can provide some instruction in reading. With high-quality speech output, the TeachPad computer 10 teaches the student the sounds of the different letters, and how they combine to make words. Then, the student is asked to sound out different words (without speech recognition, the TeachPad computer 10 can't tell if the words are spoken correctly). The TeachPad computer 10 displays a word along with several pictures or animations. The student matches the word to the correct picture. Using animation, the TeachPad computer 10 can test verbs (such as "run") as well as nouns.

SPELLING

The TeachPad computer 10 can teach spelling. First, a word is spoken or a picture of something is drawn, then the student writes the word down. Using handwriting recognition, the TeachPad computer 10 determines if the word is spelled correctly. Using animation, verbs as well as nouns can be tested. Using voice synthesis, any word can be tested.

ARITHMETIC

The TeachPad computer 10 is obviously ideal for teaching arithmetic. Courses can be created for all levels of arithmetic, from simple counting in kindergarten, to fractions and decimals in intermediate school. Concepts that involve algorithms are easily displayed using animation.

WORD PROBLEMS

The TeachPad computer 10 can teach students how to solve word problems. The problems can involve arithmetic, logic, and other subjects. The TeachPad computer 10 can animate the analysis process by showing how the solution method (for example, an arithmetic formula) is derived from the word problem. For example, if the word problem is "Jack had five apples, but Jill took two away; how many apples does Joe have left?", then the TeachPad computer 10 displays "5–2=" and shows where in the word problem the "5," the "2," and the "–" came from.

MATHEMATICS

The TeachPad computer 10 is effective teaching many areas of mathematics. This includes algebra, trigonometry, geometry, calculus, and higher mathematics. The graphics and animation capability of the TeachPad computer 10 make it especially effective for certain subjects, such as geometry and calculus. The TeachPad computer 10 could even follow a student's progress while attempting to prove a theorem, making sure the student doesn't make any mistakes.

SCIENCE AND ENGINEERING

The TeachPad computer 10 is useful for teaching many areas of science and engineering, especially where they involve mathematics. For example, many concepts in physics are easily taught using the graphics and animation capability of the TeachPad computer 10. Courses in chemistry, astronomy, and biology could also be effective. The TeachPad computer 10 can provide'simulated laboratories where experiments can be conducted (or structures built) in complete safety and at little expense. A color screen 12 is very useful (perhaps essential) for some of these courses.

OTHER SUBJECTS

Finally, the TeachPad computer 10 can teach concepts in other subjects besides hard science, such as history, geography, sociology, grammar, art, and literature. However, in many of these areas, textbooks are as effective as the TeachPad computer 10.

SOFTWARE FLOW CHARTS

Generally, the TeachPad computer 10 comprises some or all of the functionality described in co-pending and commonly owned patent application Ser. No. 07/994,950 filed Dec. 22, 1992, by Michael W. Morgan, and entitled "PEN-BASED CALCULATOR," which application is incorporated by reference herein. Thus, the parent application, and more specifically FIGS. 40-58 thereof, should be reviewed in detail for a better understanding of the logic performed by the processing circuit in the TeachPad computer 10. However, those skilled in the art will recognize that this logic may be implemented in either hardware or software. In addition, those skilled in the art will also recognize that the logic could be altered without departing from the scope of the present invention.

FIGS. 5–15 are flow charts describing additional functionality performed by the processing circuit of the TeachPad computer 10. Those skilled in the art will recognize that this logic may be implemented in either hardware or software. Those skilled in the art will also recognize that the logic could be altered without departing from the scope of the present invention.

Figure 5:
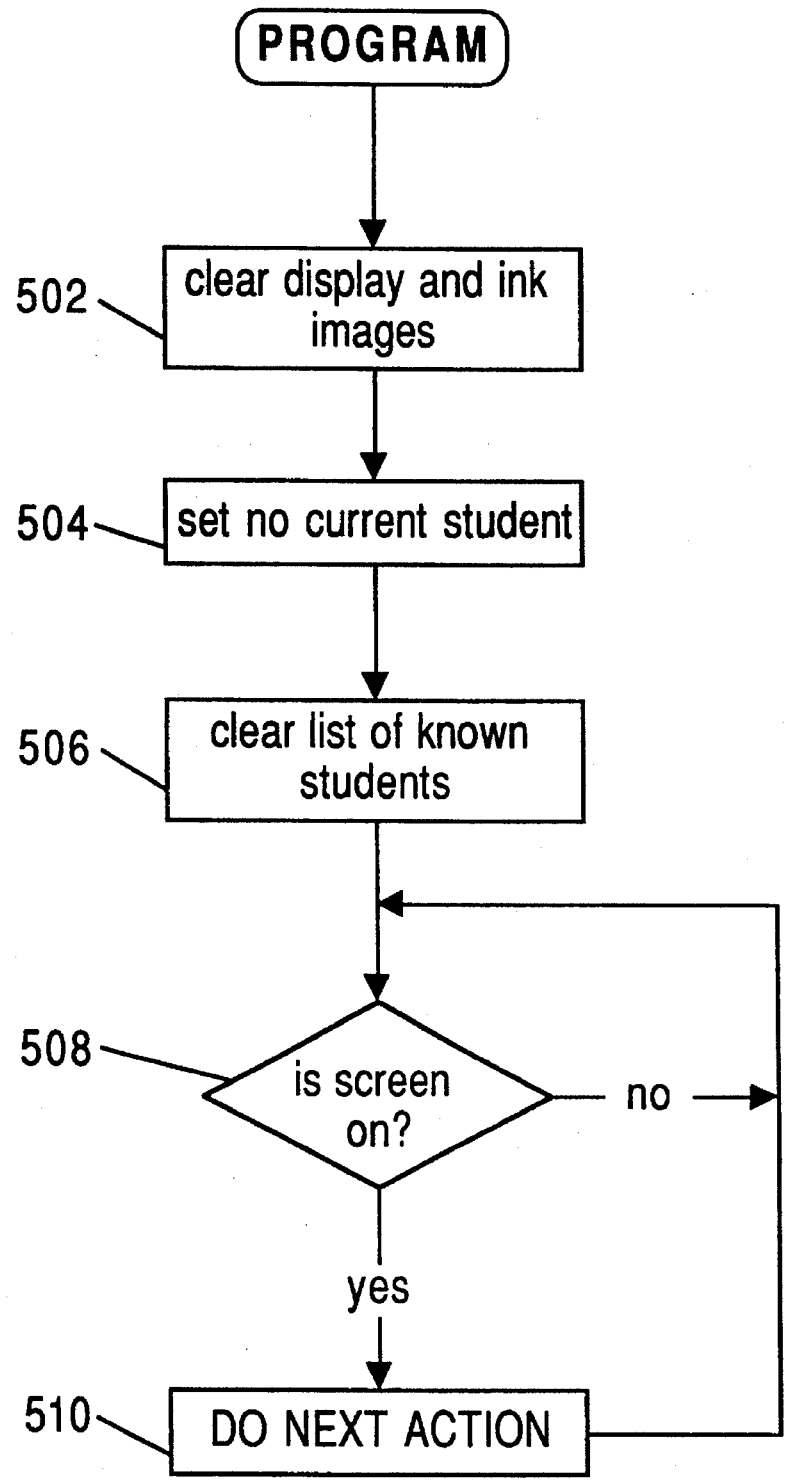
FIG. 5 is a flow chart describing the logic of the PROGRAM function (the main routine) in the preferred embodiment of the TeachPad computer.

FIG. 5 is a flow chart describing the logic of the PROGRAM function (the main routine) in the preferred embodiment of the TeachPad computer 10. Block 502 clears the screen 12 and all "electronic ink" images stored in memory. Block 504 sets a flag to indicate that there is "no current student." Block 506 clears the list of all known students. Block 508 is a decision block that determines whether the screen 12 is turned on. If not, control transfers to block 508. If so, control transfers to block 510, which performs the DO NEXT ACTION function, as described in more detail in FIGS. 6A, 6B and 6C.

Figure 6A:
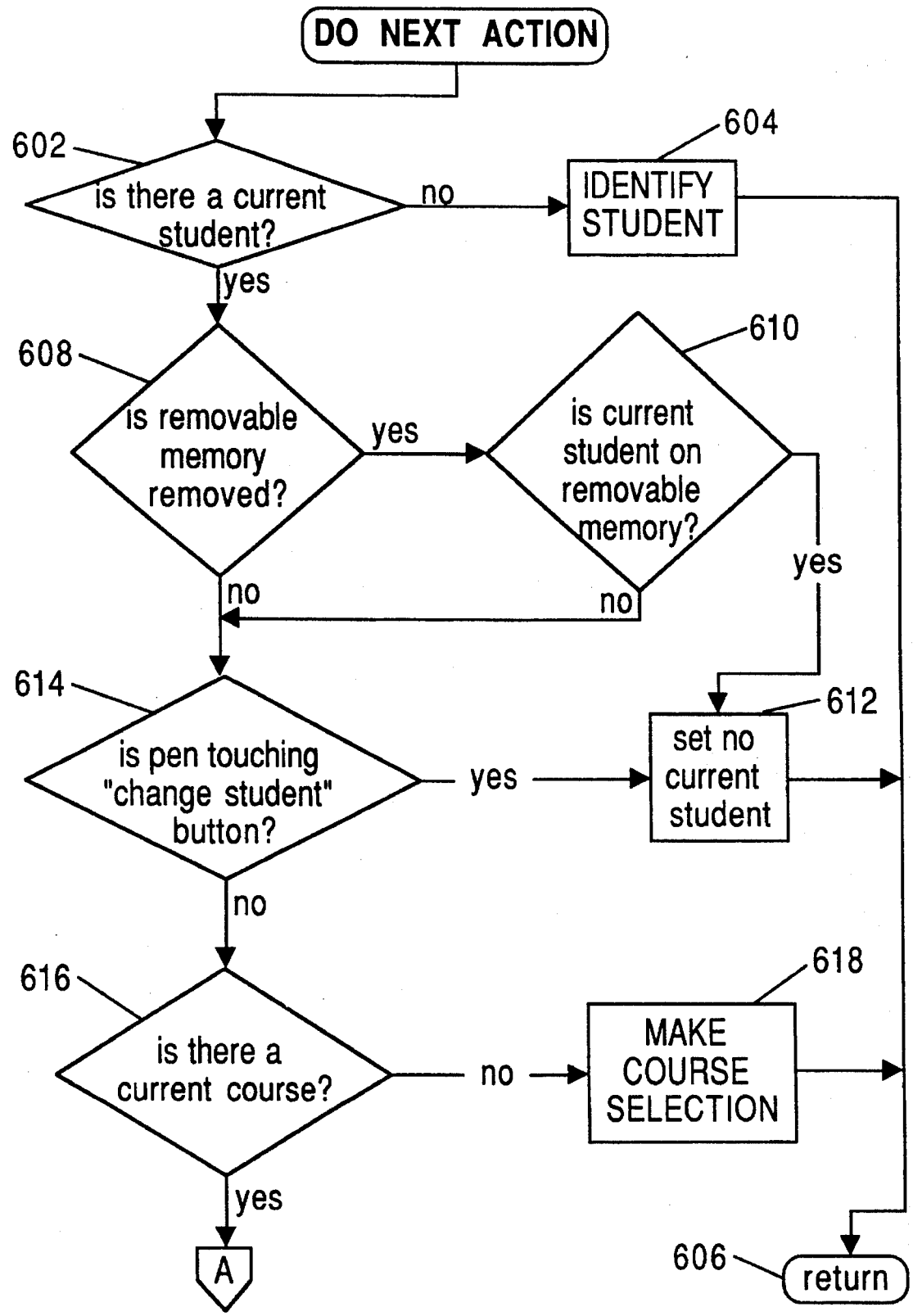
FIGS. 6A, 6B, and 6C are a flow chart describing the logic of the DO NEXT ACTION function in the preferred embodiment of the TeachPad computer.
Figure 6B:
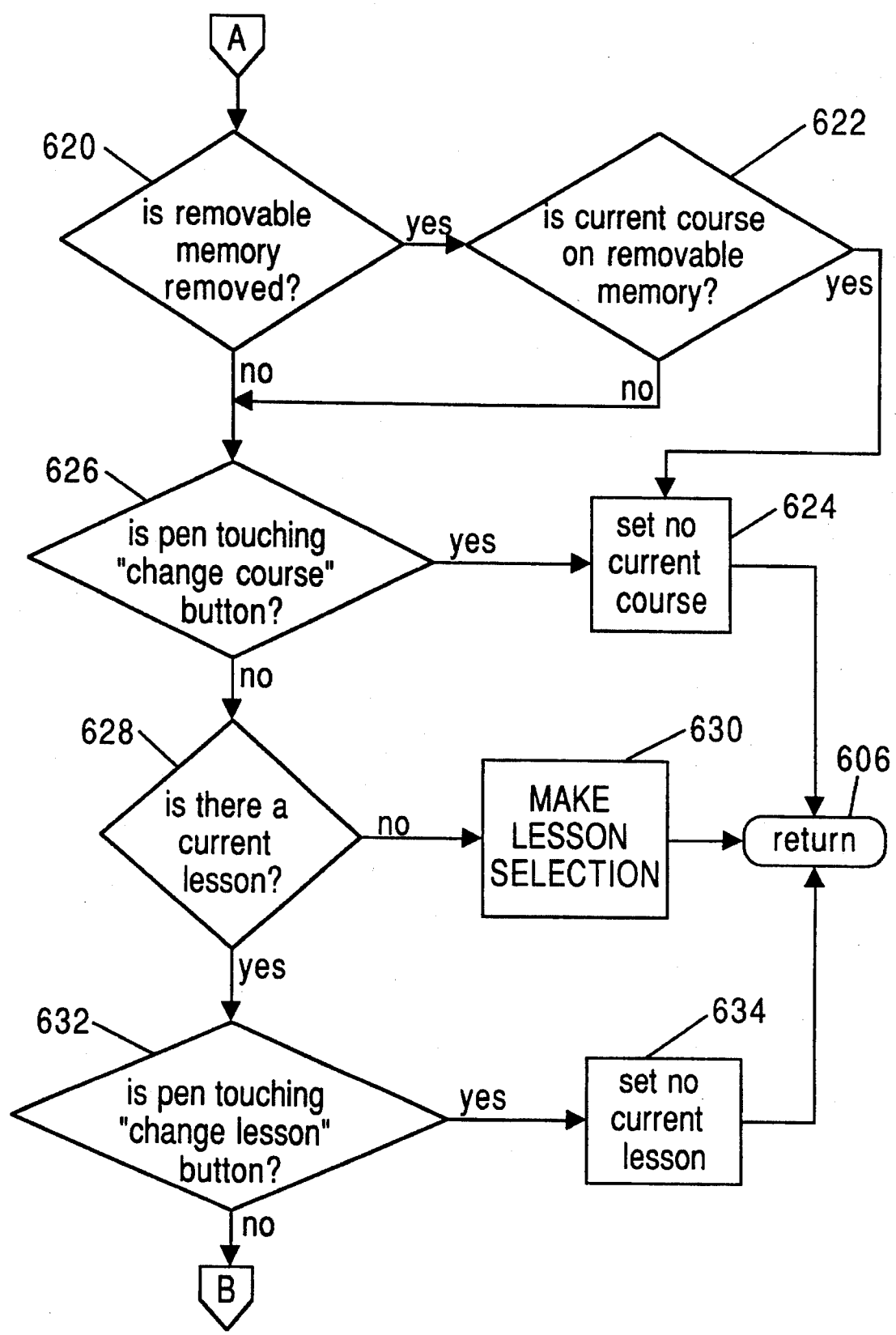
Figure 6C:
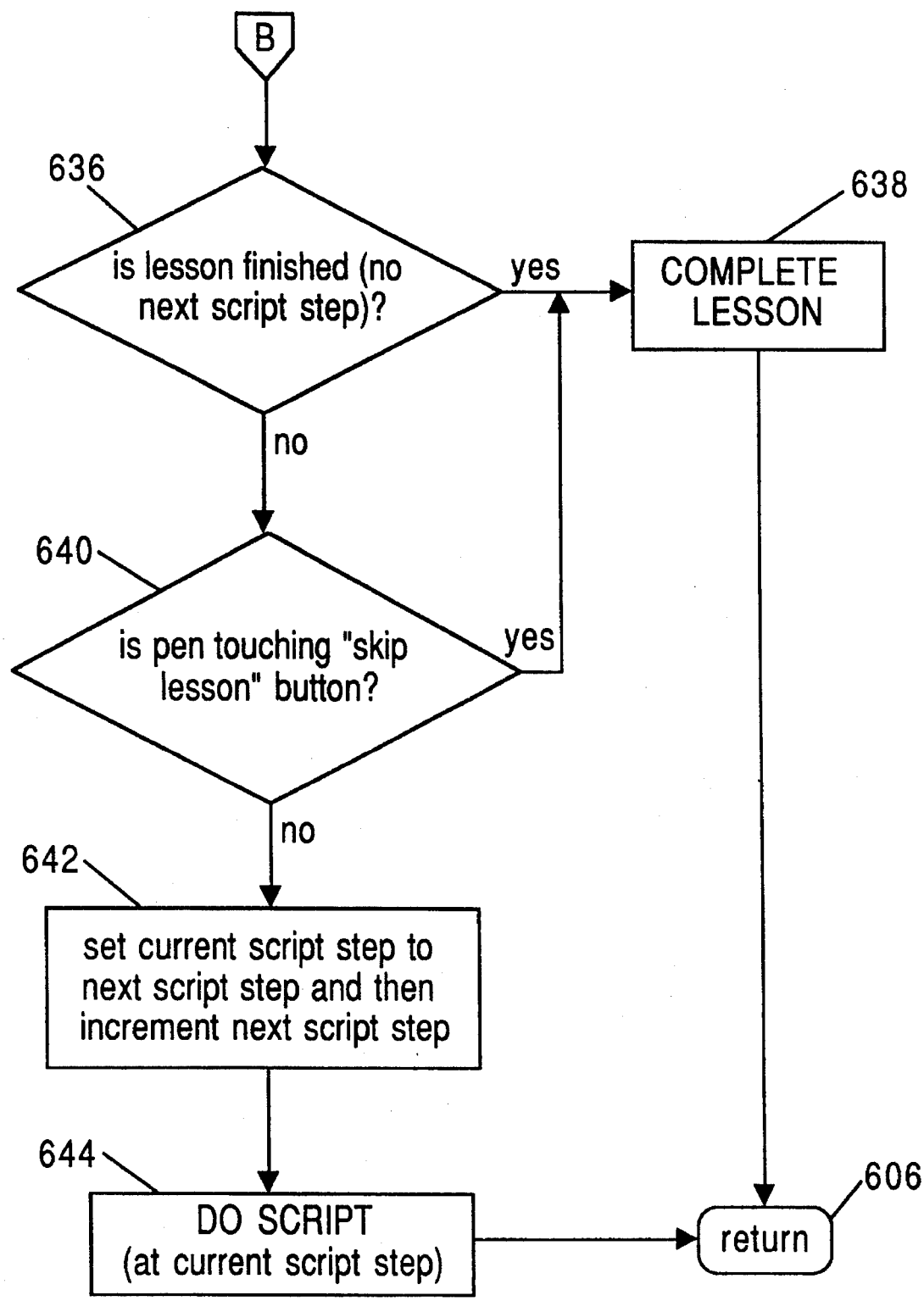

FIGS. 6A, 6B and 6C are a flow chart describing the logic of the DO NEXT ACTION function in the preferred embodiment of the TeachPad computer 10. Block 602 is a decision block that determines whether there is a current student using the TeachPad computer 10. If not, block 604 performs the IDENTIFY STUDENT function, as described in more detail in FIGS. 7A and 7B, and control transfers to block 606, which terminates the DO NEXT ACTION function. Otherwise, control transfers to block 608. Block 608 is a decision block that determines whether the removable memory 24 has been removed. If it has, control transfers to block 610, which is a decision block that determines whether the current student is on the removable memory 24. If it is, control transfers to block 612 which sets a flag to indicate that there is "no current student," and control transfers to block 606. If decision block 610 determines that the current student is not on the removable memory 24, control transfers to block 614. If decision block 608 determines that the removable memory has not been removed, control transfers to block 614. Block 614 is a decision block that determines whether the pen or stylus 14 is touching a "change student" button displayed on the screen 12. If it is, control transfers to block 612 which sets a flag to indicate that there is "no current student," and control transfers to block 606. If decision block 614 determines that the stylus 14 is not touching the "change student" button, control transfers to block 616. Block 616 is a decision block that determines whether there is a current course. If not, control transfers to block 618 which performs the MAKE COURSE SELECTION function, as described in more detail in FIG. 8, and then control transfers to block 606. If decision block 616 determines that there is a current course, control transfers to block 620. Block 620 is a decision block that determines whether the removable memory has been removed. If it has, control transfers to block 622. Block 622 is a decision block that determines whether the current course is on the removable memory 24. If it is, control transfers to block 624 which sets a flag to indicate that there is "no current course" and control transfers to block 606. If the current course is not in removable memory 24, control transfers to block 626. Block 626 is a decision block that determines whether the stylus 14 is touching the "change course" button on the screen 12. If it is, control transfers to block 624 which sets a flag to indicate that there is "no current course" and control transfers to block 606. If the stylus 14 is not touching the "change course" button, control transfers to block 628. Block 628 is decision block that determines whether there is a current lesson. If not, control transfers to block 630 which performs the MAKE LESSON SELECTION function, as described in FIGS. 10A and 10B, and then control transfers to block 606. If it is, control transfers to block 632. Block 632 is a decision block that determines whether the pen or stylus 14 is touching the "change lesson" button on the screen 12. If it is, control transfers to block 634 which sets a flag to indicate that there is "no current lesson" and control transfers to 606. If decision block 632 determines that the pen is not touching the "change lesson" button on the screen 12, control transfers to block 636. Block 636 is a decision block that determines whether the lesson is finished, i.e., whether or not there is a next script step. If it is, control transfers to block 638 which performs the COMPLETE LESSON function, as described in more detail in FIGS. 12A and 12B and then control transfers to block 606. If not, control transfers to block 640. Block 640 is a decision block that determines whether the pen or stylus 14 is touching the "skip lesson" button and the screen 12. If it is, control transfers to block 638 which performs the COMPLETE LESSON function, as described in more detail in FIGS. 12A and 12B and then control transfers to block 606. If not, then control transfers to block 642. Block 642 sets the current script step to the next script step and then increments the next script step. Block 644 performs the DO SCRIPT function, as described in more detail in FIGS. 13A–13D, at the current script step. Then control transfers to block 606 which terminates the DO NEXT ACTION function.

Figure 7A:
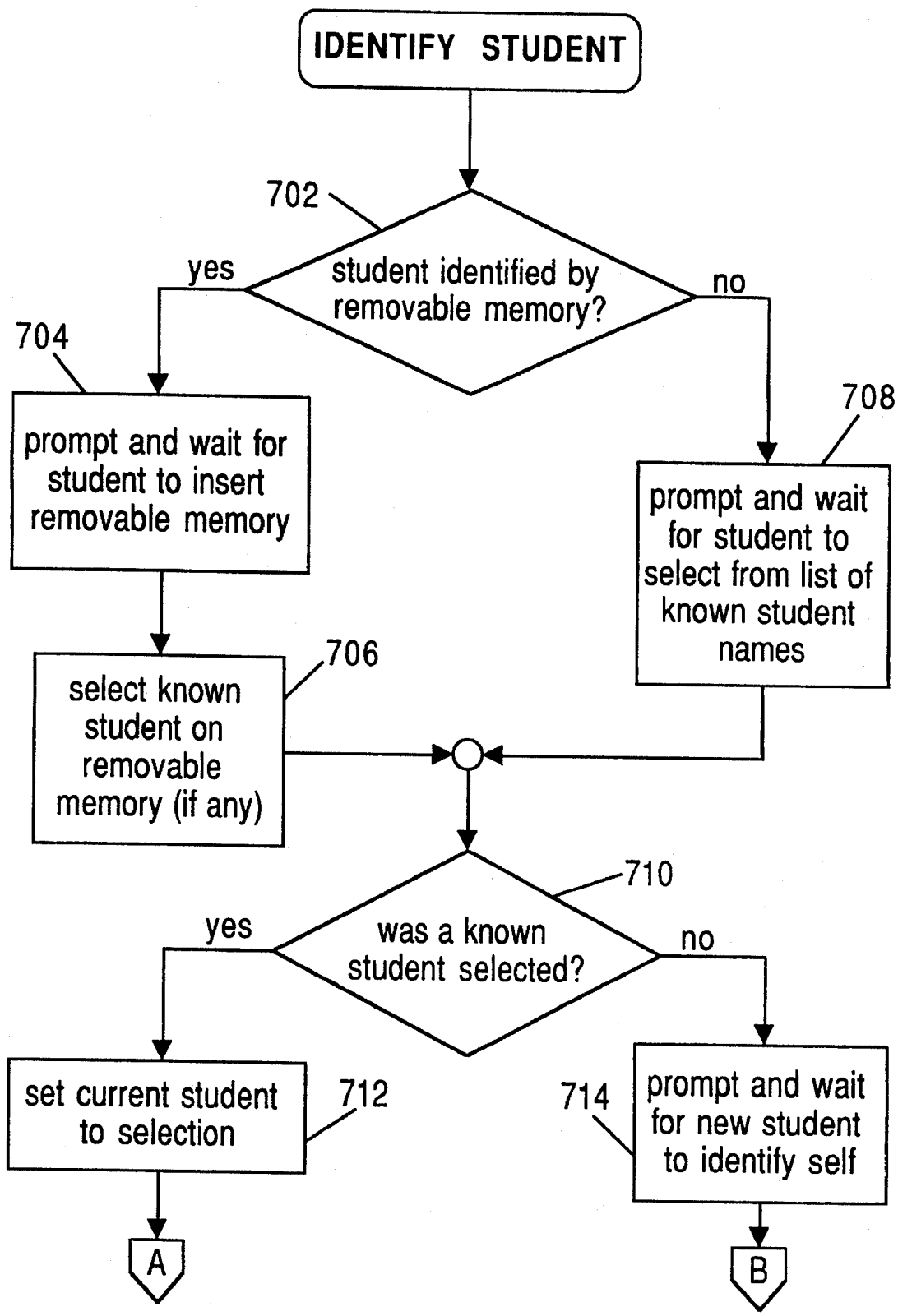
FIGS. 7A and 7B are a flow chart describing the logic of the IDENTIFY STUDENT function in the preferred embodiment of the TeachPad computer.
Figure 7B:
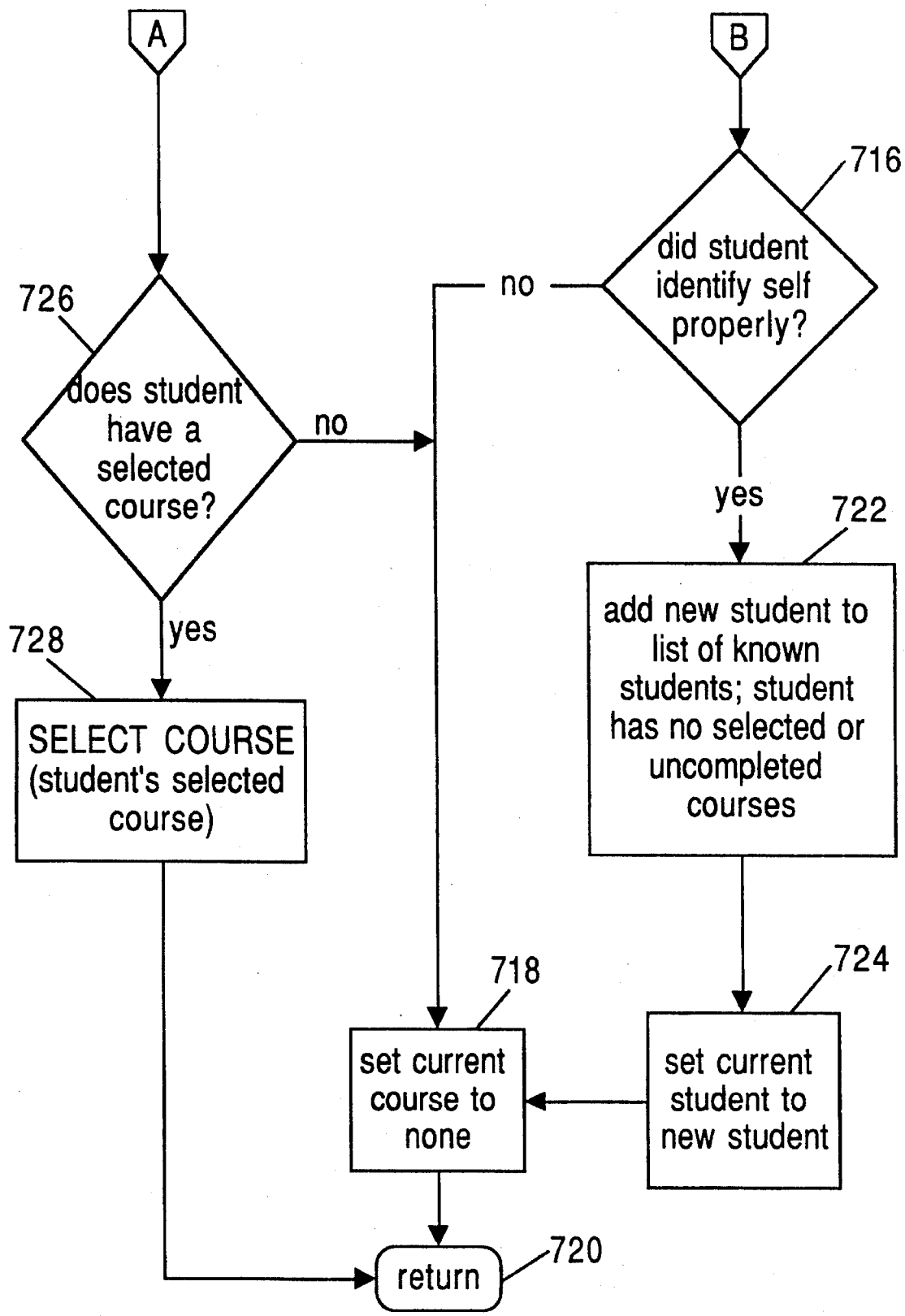

FIGS. 7A and 7B are a flow chart describing the logic of the IDENTIFY STUDENT function in the preferred embodiment of the TeachPad computer 10. Block 702 is a decision block that determines whether the student is to be identified by the removable memory 24. If so, control transfers to block 704. Block 704 prompts and waits for the student to insert the removable memory 24 in the TeachPad computer 10. Block 706 selects the known student from the removable memory 24. If decision block 702 determines that the student is not to be identified by the removable memory 24, then block 708 prompts and waits for the student to select from a list of known student names. Decision block 710 determines whether a known student was selected. If it was, block 712 sets the current student to the selection and control transfers to block 726. If not, block 714 prompts and waits for the new student to identify him or herself. Decision block 716 determines whether the student identified him or herself properly. If not, block 718 sets the current course to "none" and control returns at block 720. If the student did identify him or herself properly, block 722 adds the new student to the list of known students and indicates that the student has no selected or uncompleted courses. Block 724 sets the current student to the new student. Decision block 726 determines whether the student has a selected course. If not, block 718 sets the current course to "none" and block 720 returns control. If decision block 726 determines that the student has a selected course, block 728 performs the SELECT COURSE function, as described in more detail in FIG. 9, using the student's selected course, and then block 720 returns control.

Figure 8:
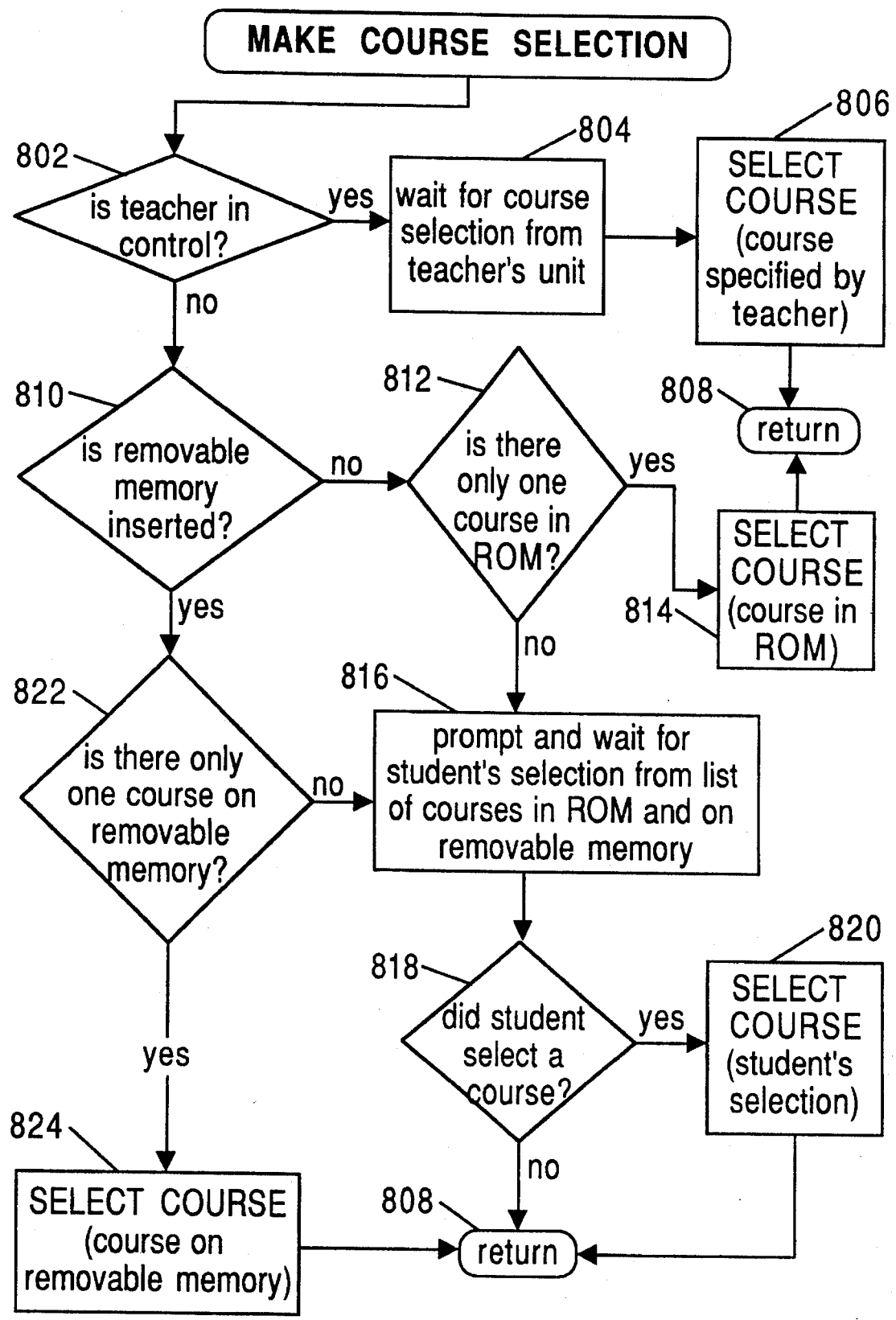
FIG. 8 is a flow chart describing the logic of the MAKE COURSE SELECTION function in the preferred embodiment of the TeachPad computer.

FIG. 8 is a flow chart describing the logic of the MAKE COURSE SELECTION function in the preferred embodiment of the TeachPad computer 10. Block 802 is a decision block that determines whether the teacher is in control of this unit. If so, block 804 waits for a course selection from the teacher's TeachPad computer 10 and block 806 performs the SELECT COURSE function, as described in more detail in FIG. 9, for the course specified by the teacher, and block 808 terminates the function. If not, control transfers to block 810. Block 810 is a decision block that determines whether the removable memory 24 has been inserted. If not, control transfers to block 812. Block 812 is a decision block that determines whether there is only one course in ROM 18. If there is, control transfers to block 814 which performs the SELECT COURSE function, as described in more detail in FIG. 9, for the course in ROM 18, and block 808 terminates the function. If decision block 812 determines that there is more than one course in ROM 18, control transfers to block 816. Block 816 prompts and waits for the student's selection from a list of courses both in ROM 18 and on the removable memory 24. Block 818 is a decision block that determines whether the student has selected a course. If not, block 808 terminates the function. If it has, block 820 performs the SELECT COURSE function, as described in more detail in FIG. 9, for the student's selection and then block 808 terminates the function. If decision block 810 determines that the removable memory is inserted, then control transfers to block 822. Block 822 is a decision block that determines whether there is only one course on the removable memory 24. If there is, block 824 performs the SELECT COURSE function, as described in more detail in FIG. 9, for the course on the removable memory 24, and block 808 terminates the function. If not, then control transfers to block 816.

Figure 9:
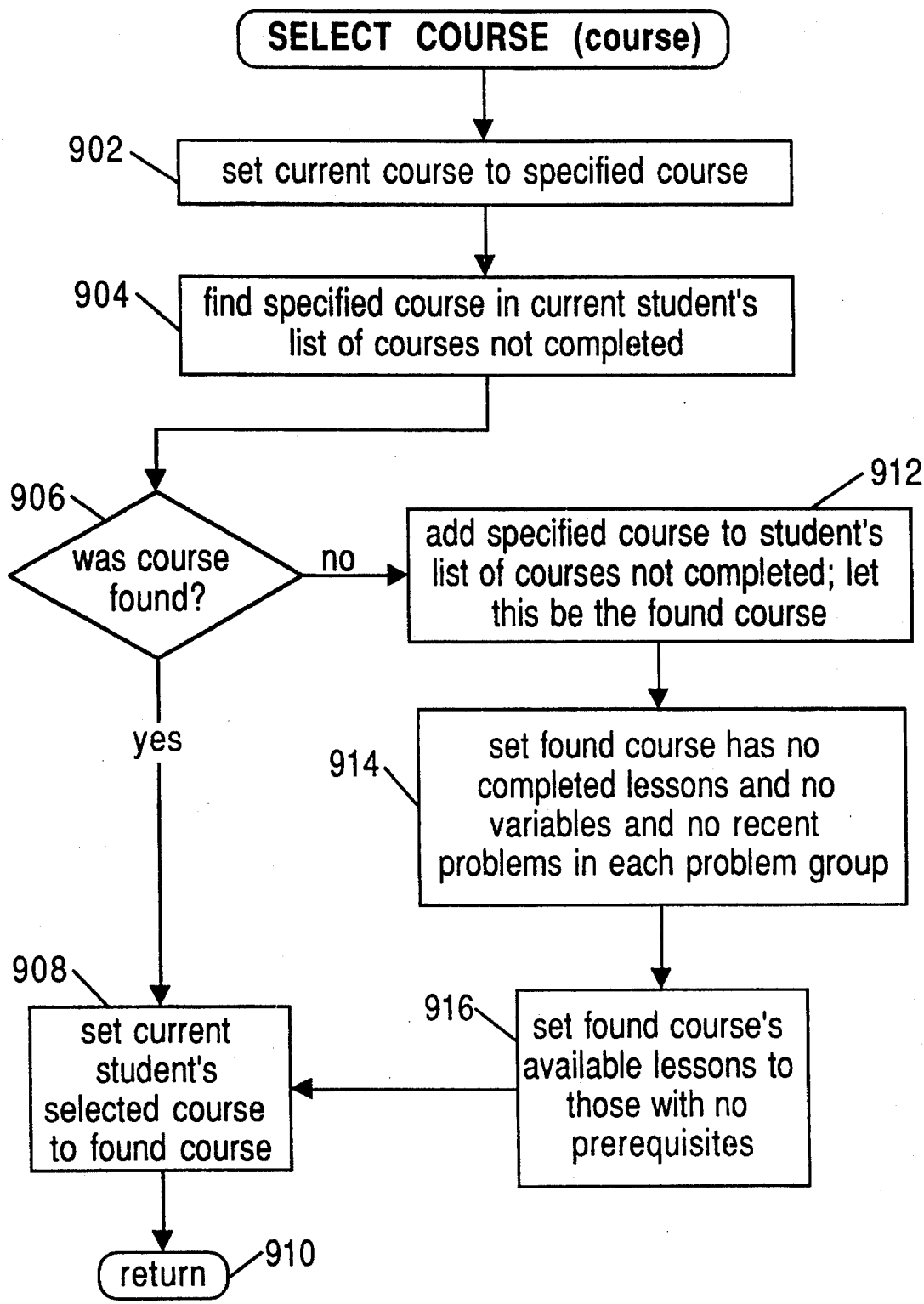
FIG. 9 is a flow chart describing the logic of the SELECT COURSE function in the preferred embodiment of the TeachPad computer.

FIG. 9 is a flow chart describing the logic of the SELECT COURSE function in the preferred embodiment of the TeachPad computer 10. Block 902 sets the current course to the specified course, and block 904 finds the specified course in the current student's list of courses that have not been completed. Block 906 is a decision block that determines whether the course was found. If so, block 908 sets the current student's selected course to the found course, and block 910 terminates the SELECT COURSE function. If not, block 912 adds the specified course to the student's list of courses that have not been completed and sets the found course to the specified course. Block 914 sets a flag to indicate that the found course has no completed lessons, no variables and no recent problems in each problem group. Block 916 sets the found course's list of available lessons to all those with no prerequisites.

Figure 10A:
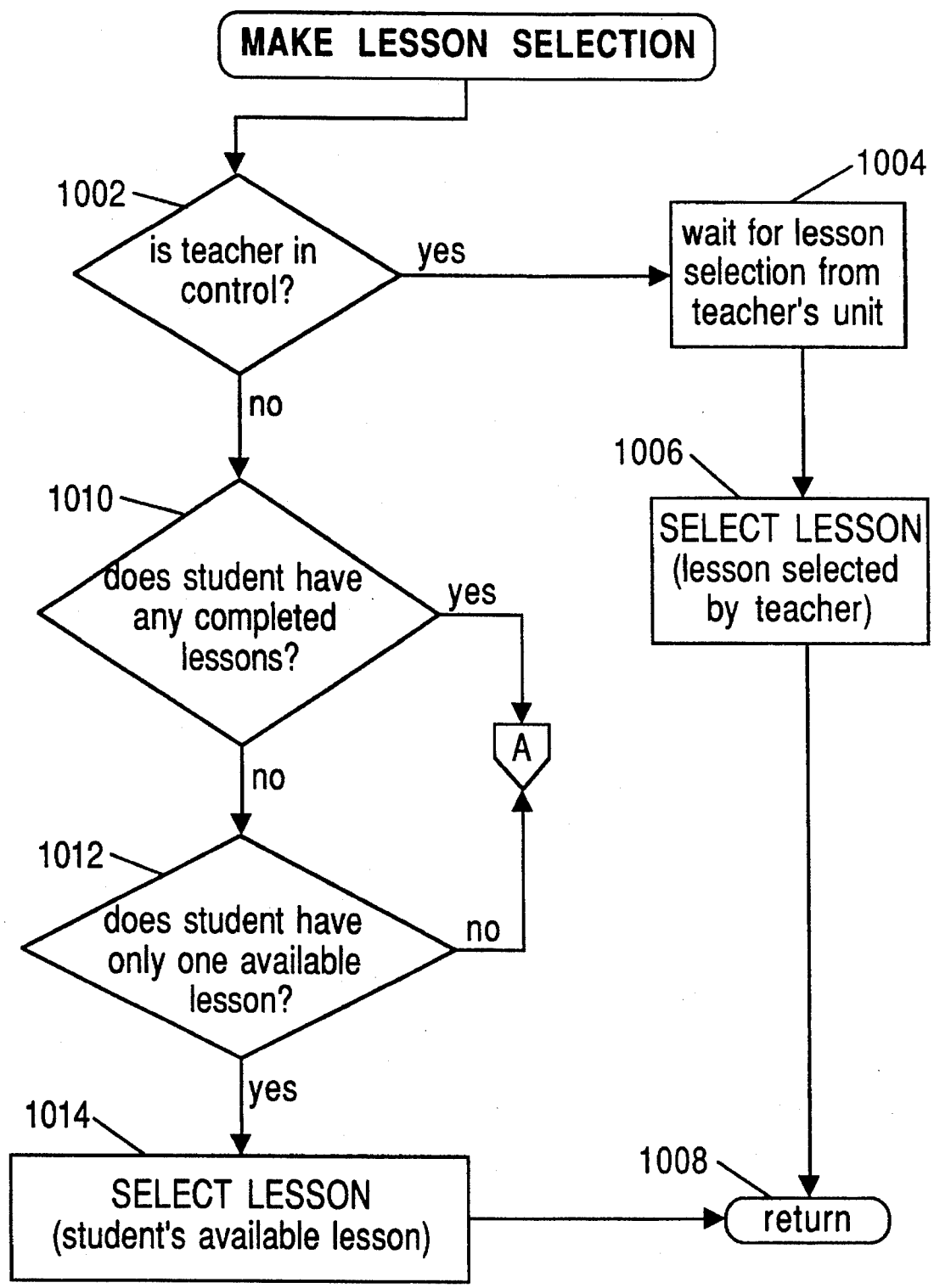
FIGS. 10A and 10B are a flow chart describing the logic of the MAKE LESSON SELECTION function in the preferred embodiment of the TeachPad computer.
Figure 10B:
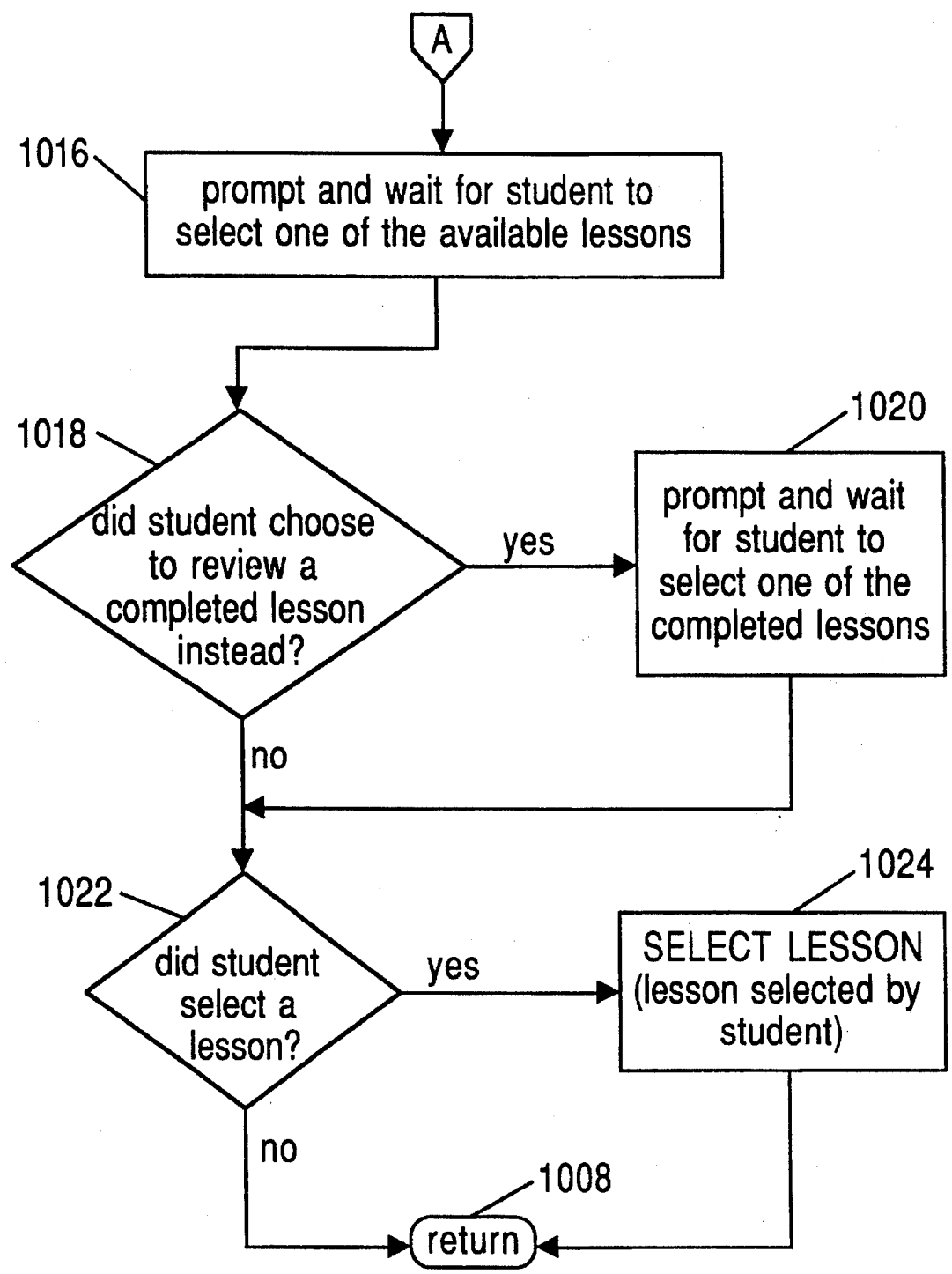

FIGS. 10A and 10B are a flow chart describing the logic of the MAKE LESSON SELECTION function in the preferred embodiment of the TeachPad computer 10. Block 1002 is a decision block that determines whether the teacher is in control of this unit. If so, block 1004 waits for a lesson selection from the teacher's TeachPad computer 10, and block 1006 performs the SELECT LESSON function, as described in more detail in FIG. 11, for the lesson selected by the teacher, and block 1008 terminates the MAKE LESSON SELECTION function. If not, control transfers to block 1010. Block 1010 is a decision block that determines whether the student has any completed lessons. If not, control transfers to block 1012. Block 1012 is a decision block that determines whether the student has only one available lesson. If so, block 1014 performs the SELECT LESSON function, as described in more detail in FIG. 11, for the student's available lesson, and block 1008 terminates the function. If not, block 1016 prompts and waits for the student to select one of the available lessons. Decision block 1018 determines whether the student chose to review a completed lesson instead. If so, block 1020 prompts and waits for the student to select one of the completed lessons. Decision block 1022 determines whether the student selected a lesson. If so, block 1024 performs the SELECT LESSON function, as described in more detail in FIG. 11, for the lesson selected by the student, and block 1008 then terminates the function.

Figure 11:
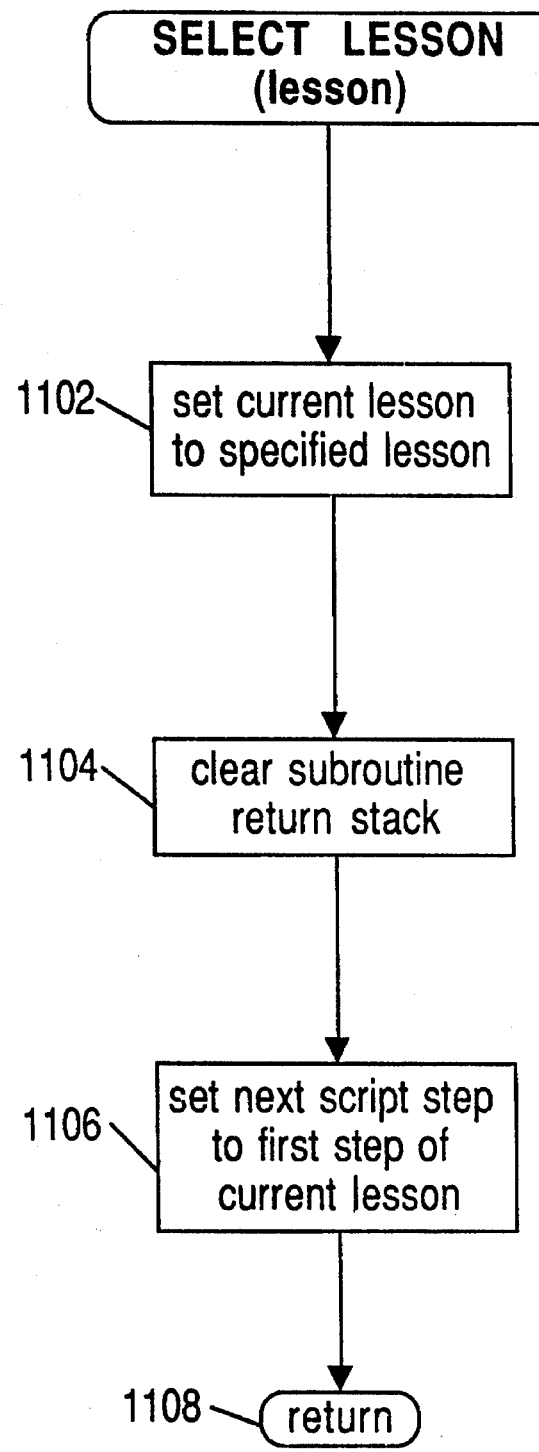
FIG. 11 is a flow chart describing the logic of the SELECT LESSON function in the preferred embodiment of the TeachPad computer.

FIG. 11 is a flow chart describing the logic of the SELECT LESSON function in the preferred embodiment of the TeachPad computer 10. Block 1102 sets the current lesson to the specified lesson. Block 1104 clears the subroutine return stack. Block 1106 sets the next script step to the first step of the current lesson. Block 1108 terminates the SELECT LESSON function.

Figure 12A:
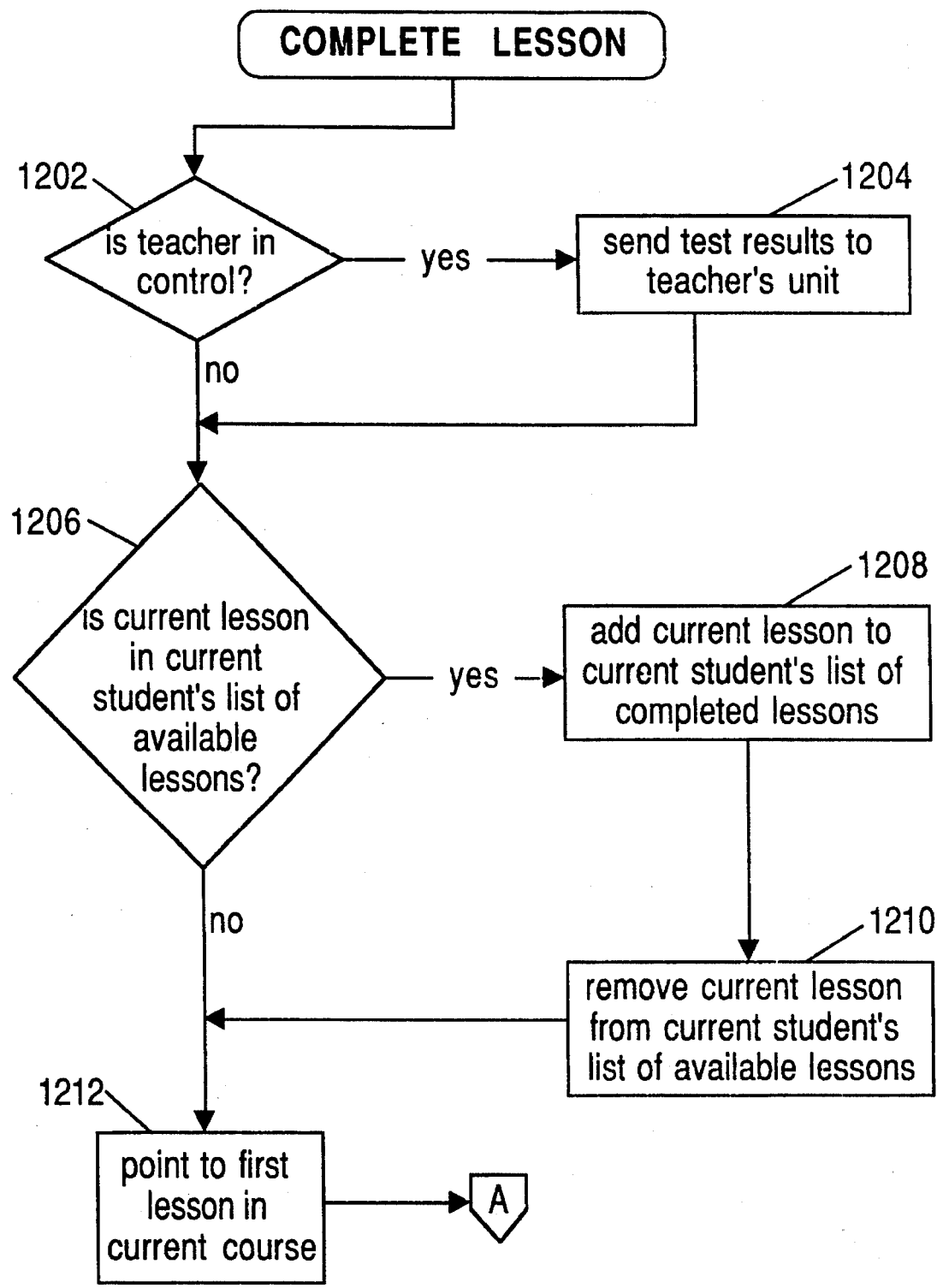
FIGS. 12A and 12B are a flow chart describing the logic of the COMPLETE LESSON function in the preferred embodiment of the TeachPad computer.
Figure 12B:
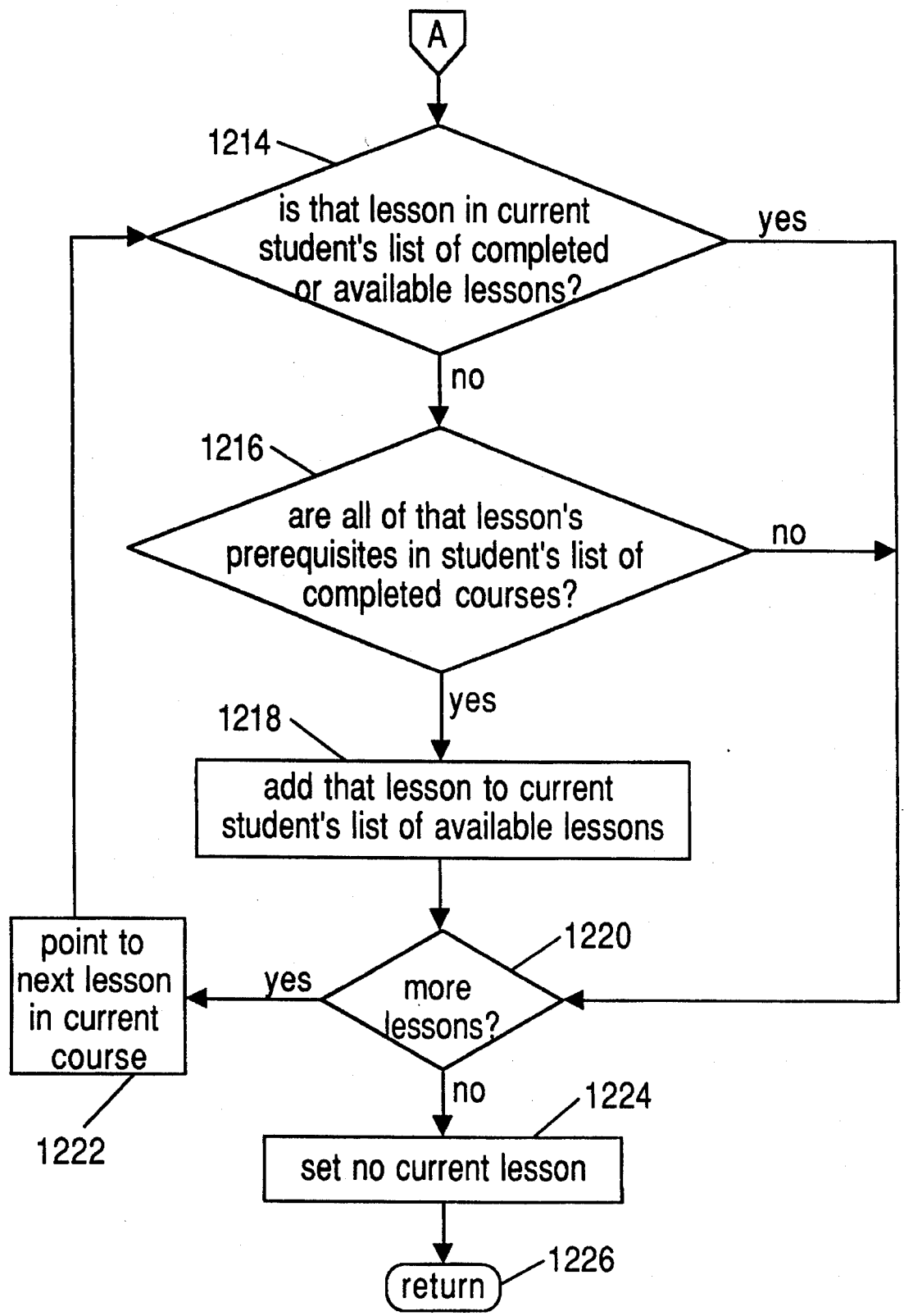
Figure 13A:
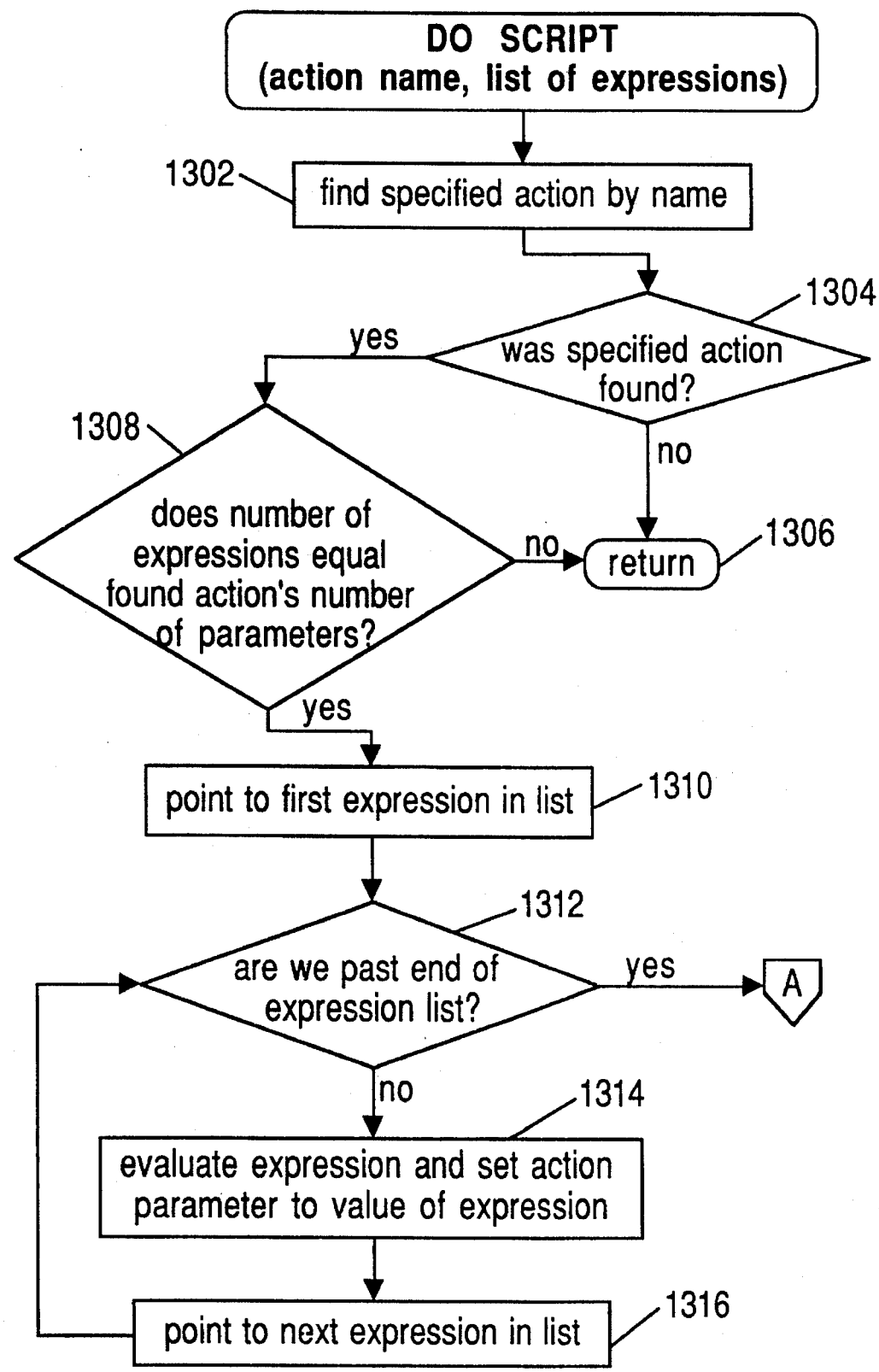
FIGS. 13A, 13B, 13C, and 13D are a flow chart describing the logic of the DO SCRIPT function in the preferred embodiment of TeachPad computer.
Figure 13B:
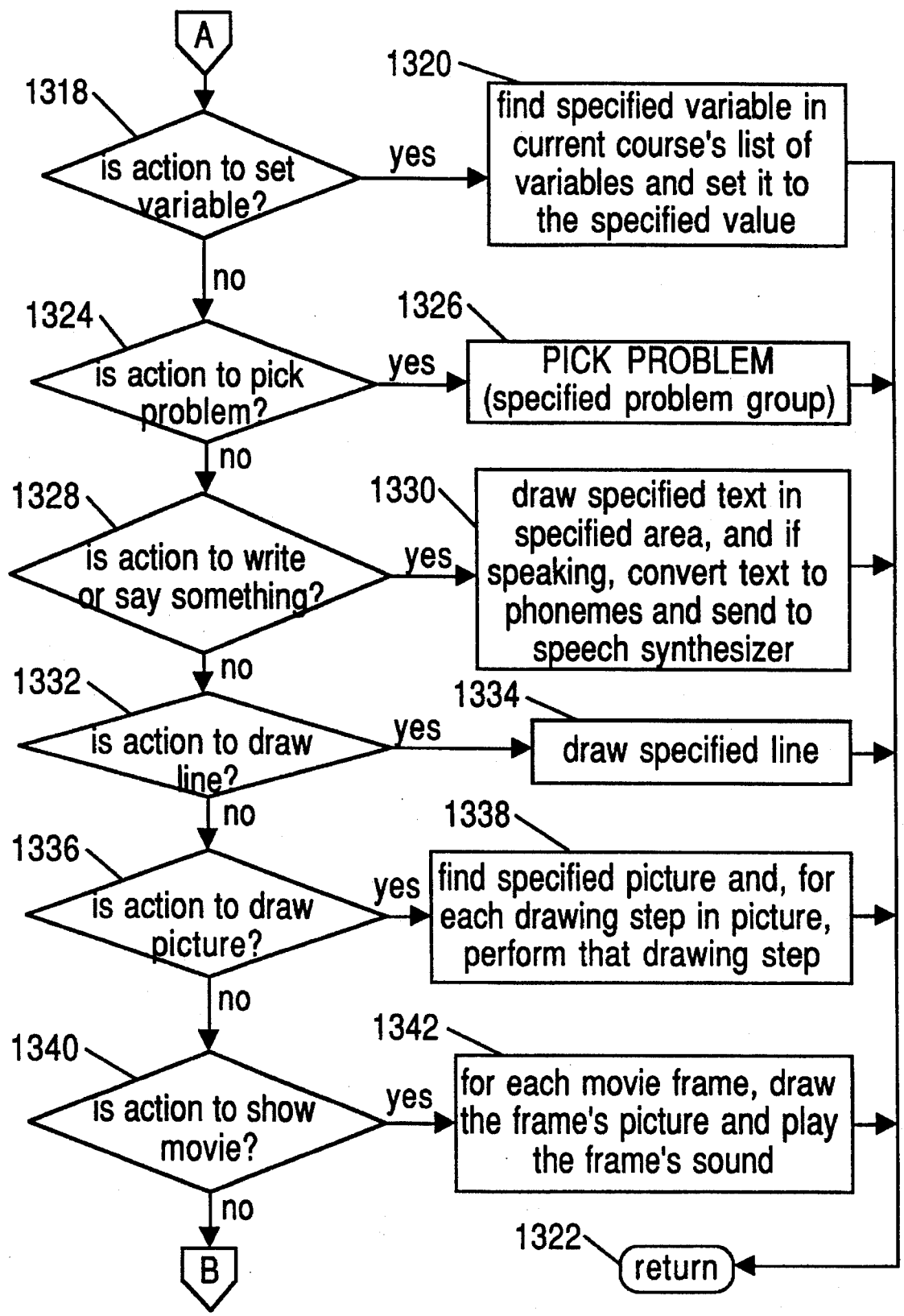
Figure 13C:
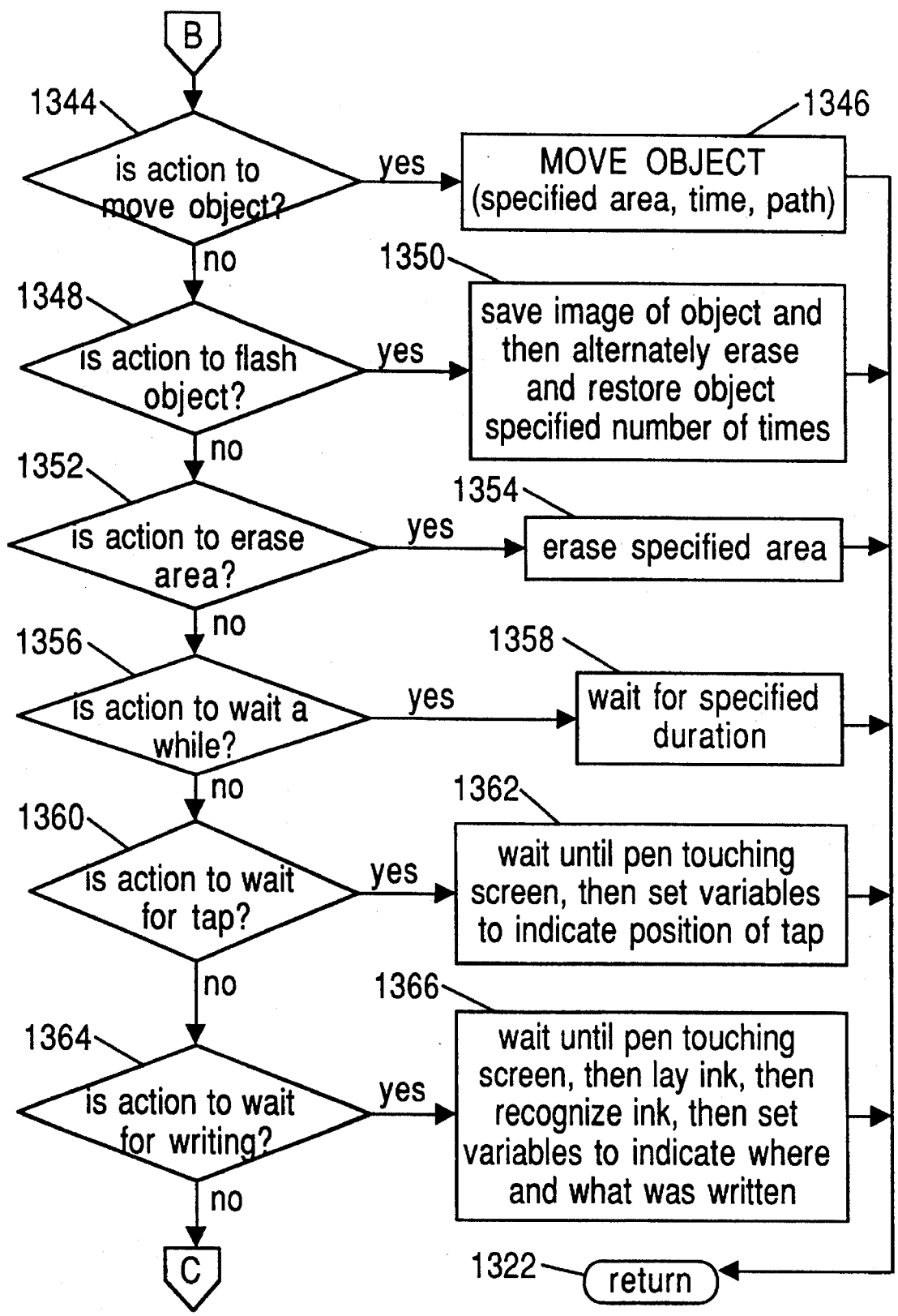
Figure 13D:
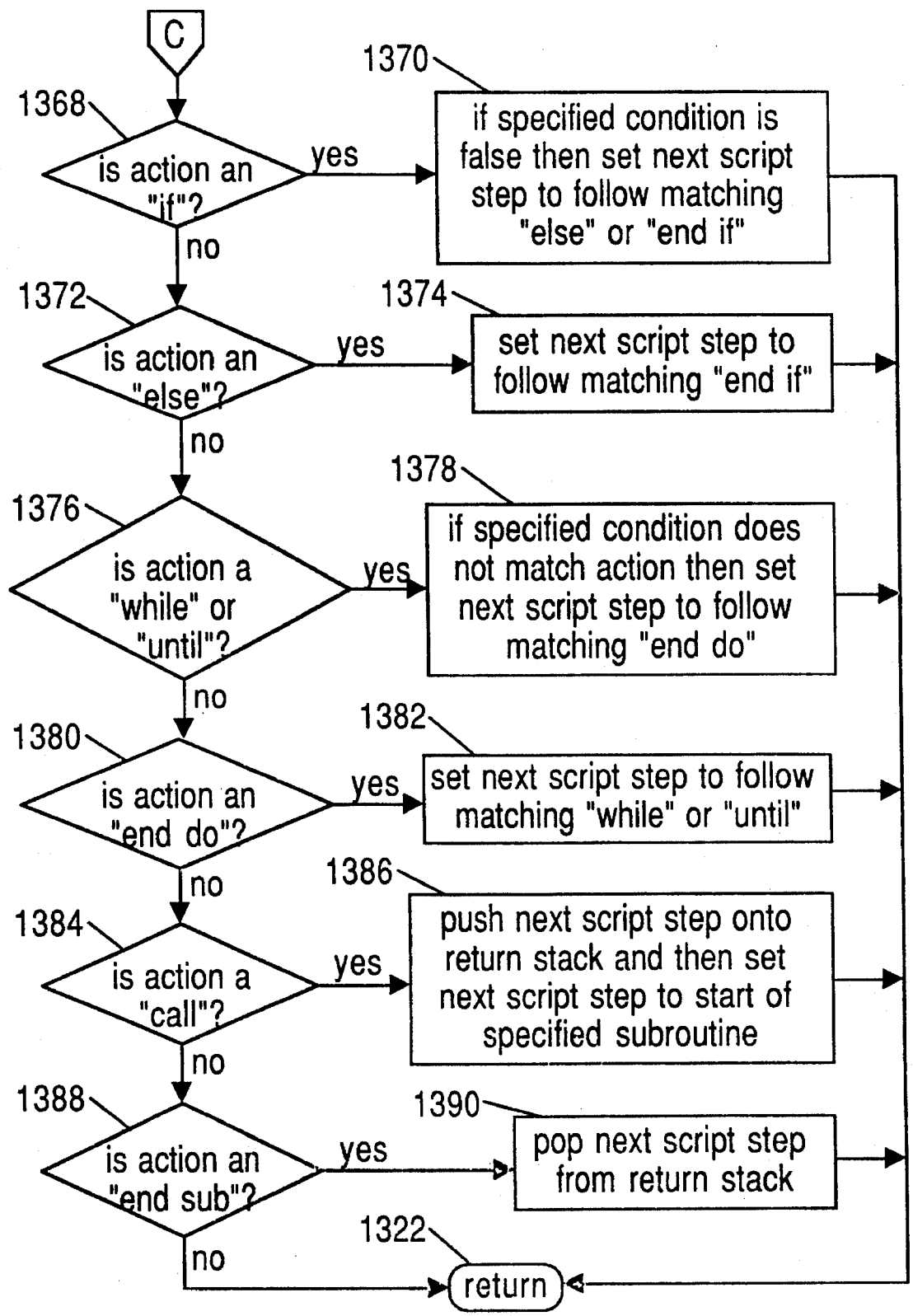

FIGS. 12A and 12B are a flow chart describing the logic of the COMPLETE LESSON function in the preferred embodiment of the TeachPad computer 10. Block 1202 is a decision block that determines whether the teacher is in control of this unit. If so, block 1204 sends test results to the teacher's computer 10. If not, control transfers to block 1206. Block 1206 is a decision block that determines whether the current lesson is in the current student's list of available lessons. If so, block 1208 adds the current lesson to the current student's list of completed lessons, and block 1210 removes the current lesson from the current student's list of available lessons. Block 1212 points to the first lesson in the current course. Block 1214 is a decision block that determines whether the first lesson is in the current student's list of completed or available lesson's. If not, decision block 1216 determines whether all of that lesson's prerequisites are in the student's list of completed courses. If they are, block 1218 adds that lesson to the current student's list of available lessons. If decision block 1214 determines that the lesson is in the current student's list of completed or available lessons, then control transfers to block 1220. Block 1220 is a decision block that determines whether there are more lessons. If so, block 1222 points to the next lesson in the current course. If not, block 1224 sets a flag to indicate there is no current lesson and block 1226 terminates the COMPLETE LESSON function.

FIGS. 13A, 13B, 13C, and 13D are a flow chart describing the logic of the DO SCRIPT function in the preferred embodiment of TeachPad computer 10. Block 1302 finds the specified action by name. Block 1304 is a decision block that determines whether the specified action was found. If not, block 1306 terminates the DO SCRIPT function. If the specified action was found, block 1308 is a decision block that determines whether the number of expressions are equal to the found action's number of parameters. If not, block 1306 terminates the function. If decision block 1308 determines that the number of expressions equals the found action's number of parameters, then block 1310 points to the first expression in the list. Block 1312 is a decision block that determines whether the pointer is past the end of the expression list. If not, block 1314 evaluates the expression and sets the action parameter to the value of the expression, and block 1316 points to the next expression in the list. If decision block 1312 determines that the pointer is past the end of the expression list, control transfers to block 1318. Block 1318 is a decision block that determines whether the action is to set a variable. If so, block 1320 finds the specified variable in the current course's list of variables and sets it to the specified value, and block 1322 terminates the DO SCRIPT function. If not, control transfers to block 1324. Block 1324 is a decision block that determines whether the action is to pick a problem. If so, block 1326 performs the PICK PROBLEM function, as described in more detail in FIG. 14, for the specified problem group, and block 1322 terminates the function. If not, control transfers to block 1328. Block 1328 is a decision block that determines whether the action is to write or say something. If so, block 1330 draws the specified text in the specified area, and if speaking, converts the text to phonemes, the speech is presented to the speech synthesizer, and block 1322 terminates the function. If not, control transfers to block 1332. Block 1332 is a decision block that determines whether the action is to draw a line. If so, block 1334 draws the specified line, and block 1322 terminates the function. If not, control transfers to block 1336. Block 1336 is a decision block that determines whether the action is to draw a picture. If so, block 1338 finds the specified picture and, for each drawing step in the picture, performs that drawing step, and block 1322 terminates the function. If not, control transfers to block 1340. Block 1340 is a decision block that determines whether the action is to show a movie. If so, block 1342 draws the frame's picture and plays the frame's sound for each movie frame, and block 1322 terminates the function. If not, control transfers to block 1344. Block 1344 is a decision block that determines whether the action is to move an object. If so, block 1346 performs the MOVE OBJECT function, as described in more detail in FIG. 15, for the specified area, time and path, and block 1322 terminates the function. If not, control transfers to block 1348. Block 1348 is a decision block that determines whether the action is to flash an object. If so, block 1350 saves the image of the object and then alternately erases and restores the object the specified number of times, and block 1322 terminates the function. If not, control transfers to block 1352. Block 1352 is a decision block that determines whether the action is to erase an area. If so, block 1354 erases the specified area, and block 1322 terminates the function. If not, control transfers to block 1356. Block 1356 is a decision block that determines whether the action is to wait a while. If so, block 1358 waits for the specified duration, and block 1322 terminates the function. If not, control transfers to block 1360. Block 1360 is a decision block that determines whether the action is to wait for a tap of the stylus 14. If so, block 1362 waits until the stylus 14 touches the screen 12, then sets variables to indicate the position of the touch, and block 1322 terminates the function. If not, control transfers to block 1364. Block 1364 is a decision block that determines whether the action is to wait for the student to write something. If so, block 1366 waits until the stylus 14 touches the screen 12, then overlays "electronic ink" on the screen 12, recognizes the ink, sets variables to indicate where and what was written, and block 1322 terminates the function. If not, control transfers to block 1368. Block 1368 is a decision block that determines whether the action is an "if" statement. If so, block 1370 determines if the specified condition is false, then sets the script step to follow the matching "else" or "end if" statements, and block 1322 terminates the function. If not, control transfers to block 1372. Block 1372 is a decision block that determines whether the action is an "else" statement. If so, block 1374 sets the next script step to follow the matching "end if" statement, and block 1322 terminates the function. If not, control transfers to block 1376. Block 1376 is a decision block that determines whether the action is a "while" or "until" statement. If so, block 1378 determines whether the specified condition does not match the action, then sets the next script step to follow the matching "end do" statement, and block 1322 terminates the function. If not, control transfers to block 1380. Block 1380 is a decision block that determines whether the action is an "end do" statement. If so, block 1382 sets the next script step to follow the matching "while" or "until" statement, and block 1322 terminates the function. If not, control transfers to block 1384. Block 1384 is a decision block that determines whether the action is a "call" statement. If so, block 1386 pushes the next script step onto the return stack, then sets the next script step to the start of the specified subroutine, and block 1322 terminates the function. If not, control transfers to block 1388. Block 1388 is a decision block that determines whether the action is an "end sub" statement. If so, block 1390 pops the next script step from the return stack, and block 1322 terminates the function.

Figure 14A:
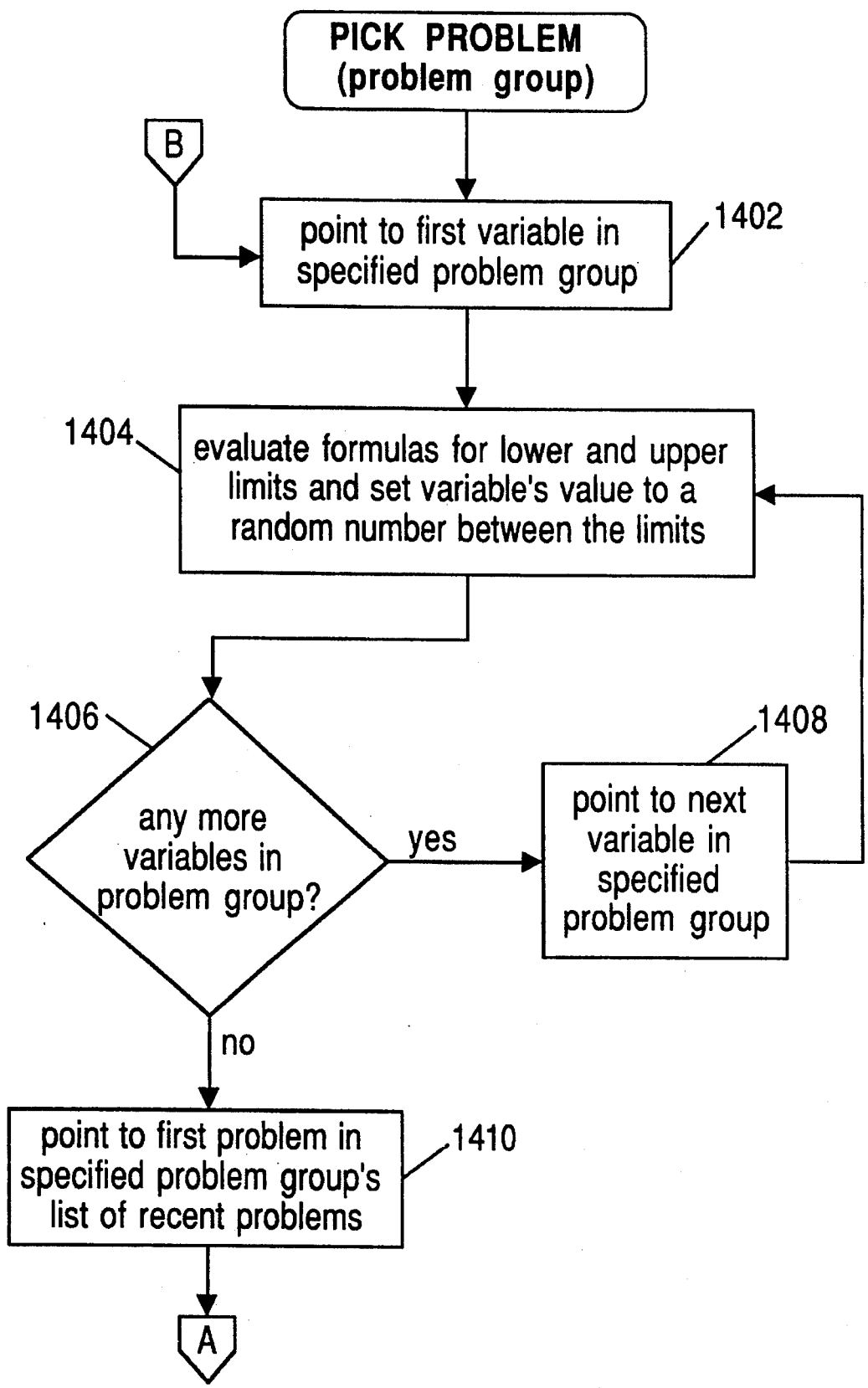
FIGS. 14A and 14B are a flow chart describing the logic of the PICK PROBLEM function in the preferred embodiment of the TeachPad computer.
Figure 14B:
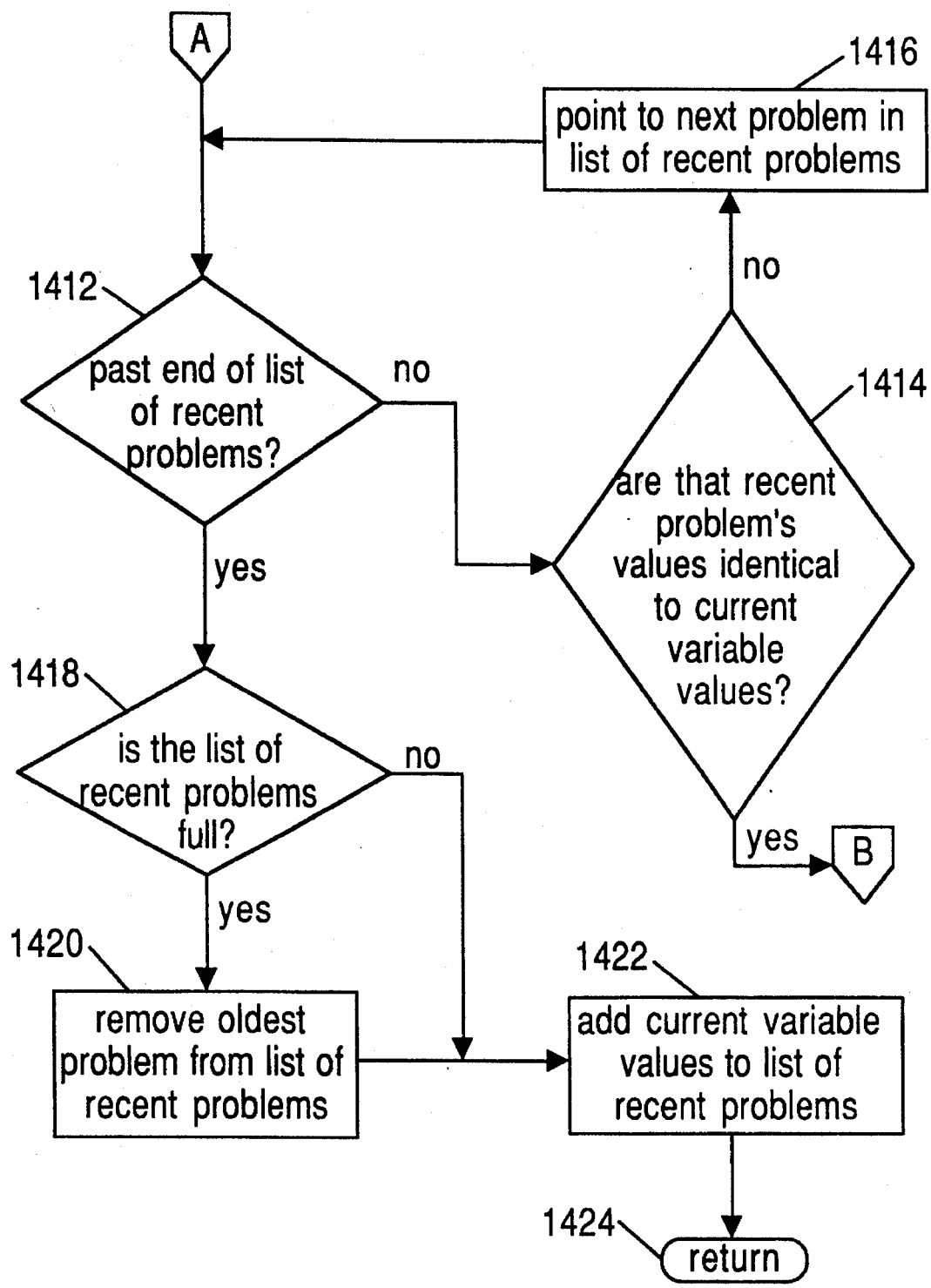

FIGS. 14A and 14B are a flow chart describing the logic of the PICK PROBLEM function in the preferred embodiment of the TeachPad computer 10. Block 1402 points to the first variable in the specified problem group. Block 1404 evaluates the formulas for that variable's lower and upper limits, and sets that variable's value to a random number between the limits. Block 1406 is a decision block that determines whether there are any more variables in the problem group. If so, block 1408 points to the next variable in the specified problem group. If not, block 1410 points to the first problem in the specified problem group's list of recent problems. Block 1412 is a decision block that determines whether the pointer is past the end of the list of recent problems. If not, block 1414 is a decision block that determines whether the recent problem's values are identical to the current variable values. If so, control transfers to block 1402. If not, block 1416 points to the next problem in the list of recent problems, and control transfers to block 1412. If decision block 1412 determines that the pointer is past the end of the list of recent problems, then control transfers to block 1418. Block 1418 is a decision block that determines whether the list of recent problems is full. If so, block 1420 removes the oldest problem from the list of recent problems, and block 1422 adds the current variable values to the list of recent problems. Block 1424 terminates the PICK PROBLEM function.

Figure 15A:
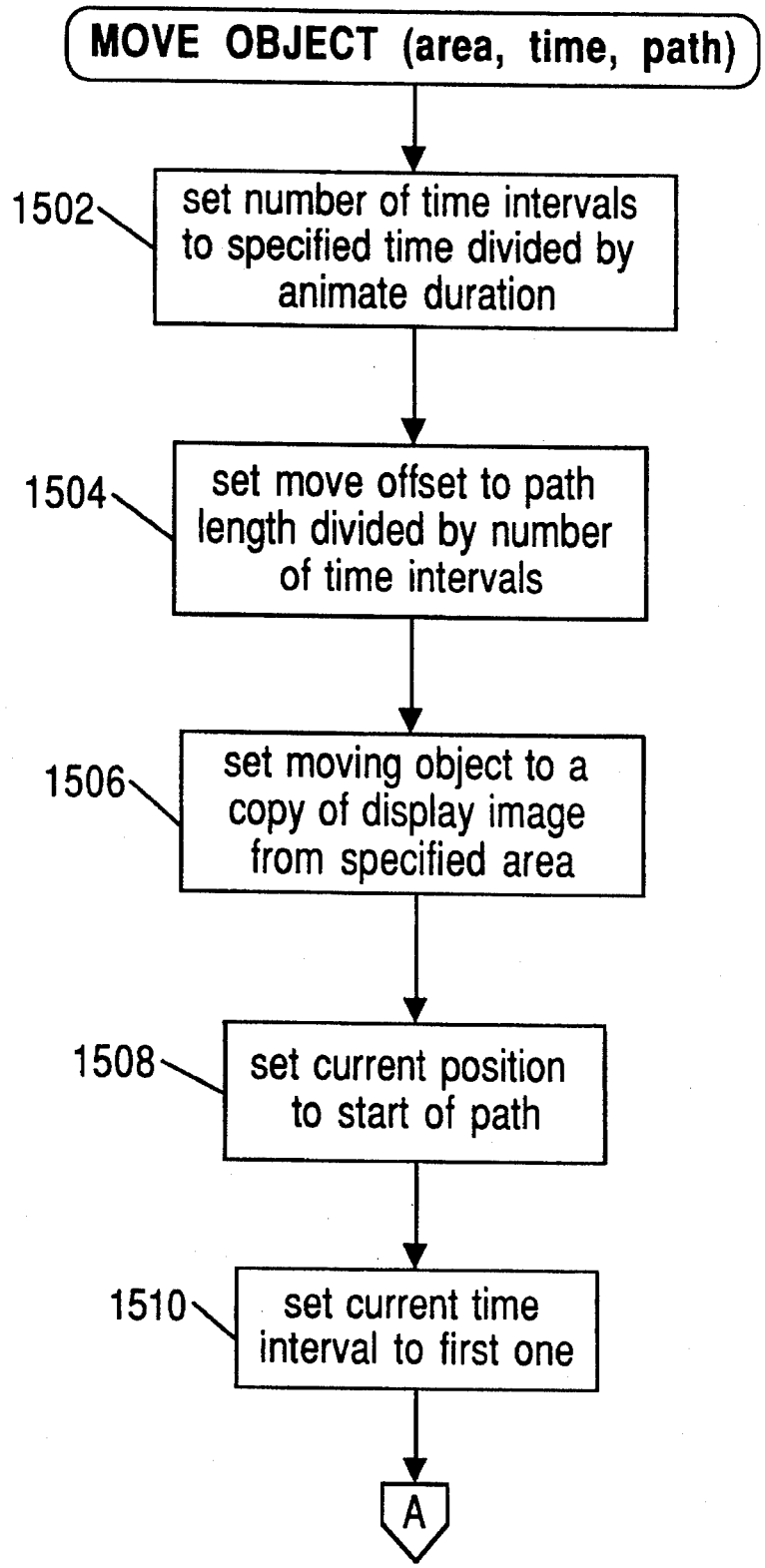
FIGS. 15A and 15B are a flow chart describing the logic of the MOVE OBJECT function in the preferred embodiment of the TeachPad computer.
Figure 15B:
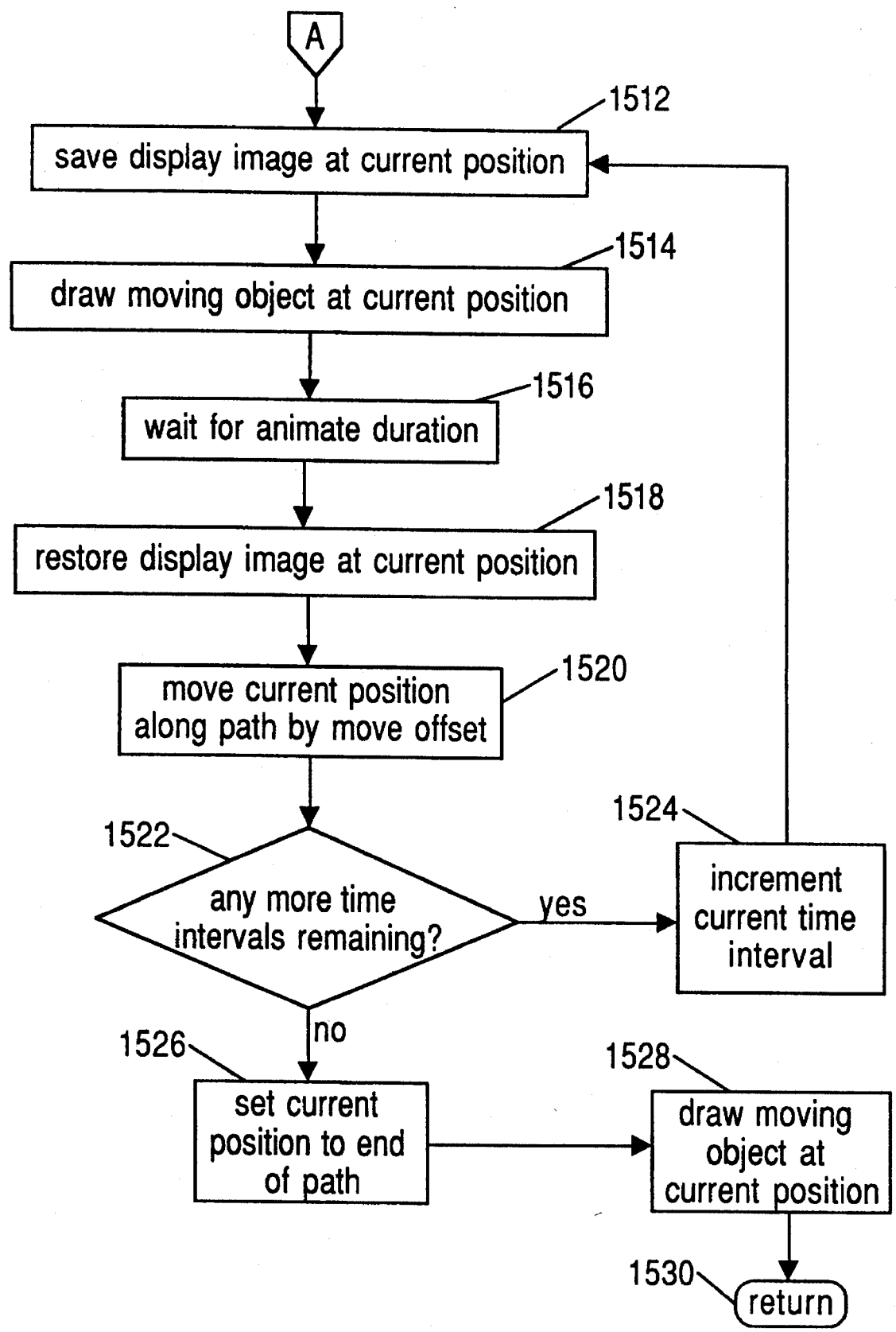

FIGS. 15A and 15B are a flow chart describing the logic of the MOVE OBJECT function in the preferred embodiment of the TeachPad computer 10. Block 1502 sets the number of time intervals to the specified time divided by an animation duration. Block 1504 sets a move offset to the length of the specified path divided by the number of time intervals. Block 1506 sets the moving object to a copy of the display image from the specified area. Block 1508 sets the current position to the start of the path. Block 1510 sets the current time interval to the first time interval. Block 1512 saves the display image at the current position. Block 1514 draws the moving object at the current position. Block 1516 waits for the animation duration to complete. Block 1518 restores the display image at the current position. Block 1520 moves the current position along the specified path by the move offset. Block 1522 is a decision block that determines whether there are any more time intervals remaining. If so, block 1524 increments the current time interval and control transfers to block 1512. If not, block 1526 sets the current position to the end of path, block 1528 draws the moving object at the current position, and block 1530 terminates the function.

LESSON SCRIPT FLOW CHARTS

FIGS. 16–26 are flow charts describing the logic performed by an exemplary lesson script in the TeachPad computer 10. Those skilled in the art will recognize that other lesson scripts could also be used without departing from the scope of the present invention.

Figure 16:
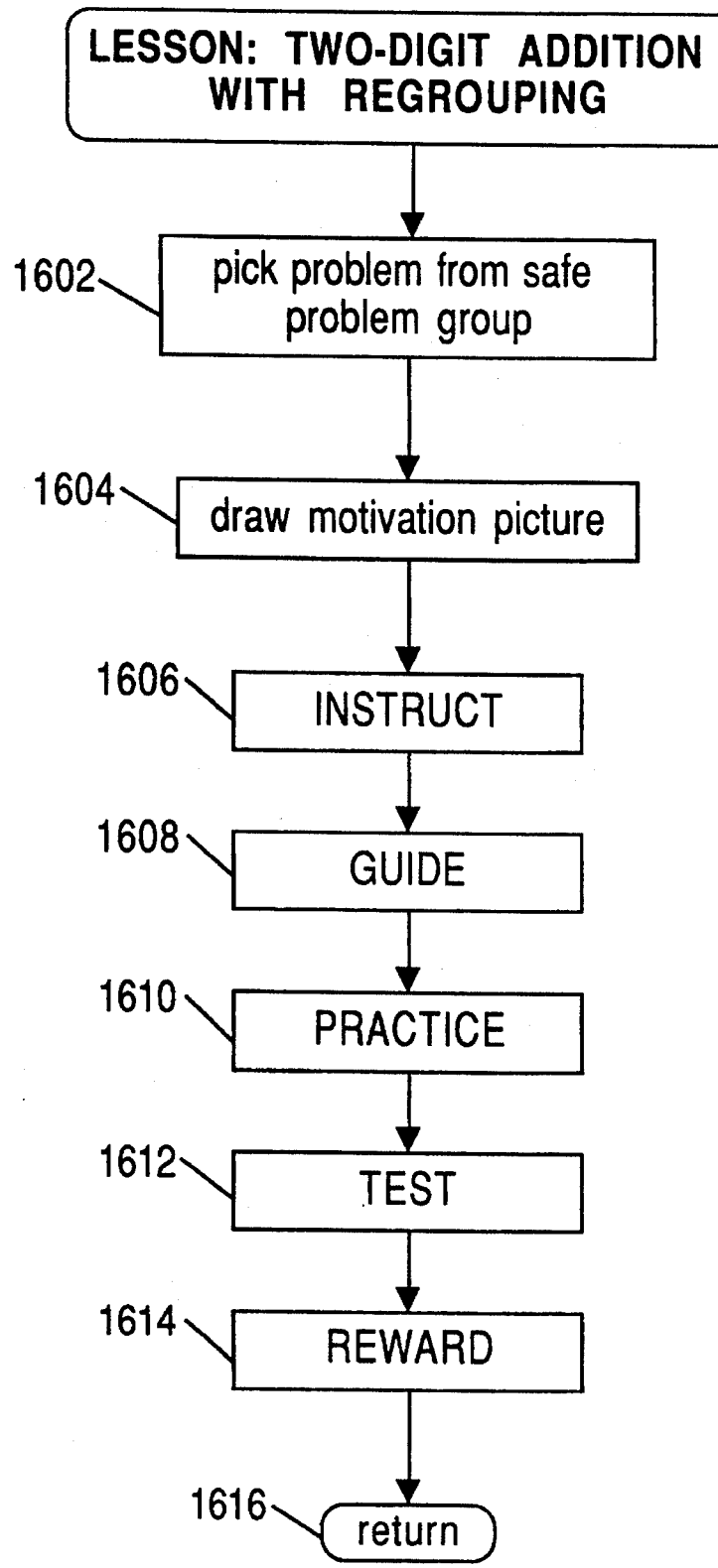
FIG. 16 is a flow chart describing the logic of the example lesson entitled TWO-DIGIT ADDITION WITH REGROUPING as performed by the TeachPad computer.

FIG. 16 is a flow chart describing the logic of the example lesson entitled TWO-DIGIT ADDITION WITH REGROUPING as performed by the TeachPad computer 10. Block 1602 picks a problem from a safe problem group. Block 1604 draws a motivation picture on the screen 12. Block 1606 performs the INSTRUCT function, as described in more detail in FIG. 17. Block 1608 performs the GUIDE function, as described in more detail in FIG. 18. Block 1610 performs the PRACTICE function, as described in more detail in FIG. 19. Block 1612 performs the TEST function, as described in more detail in FIG. 20. Block 1614 performs the REWARD function, as described in more detail in FIG. 21. Block 1616 terminates the lesson.

Figure 17:
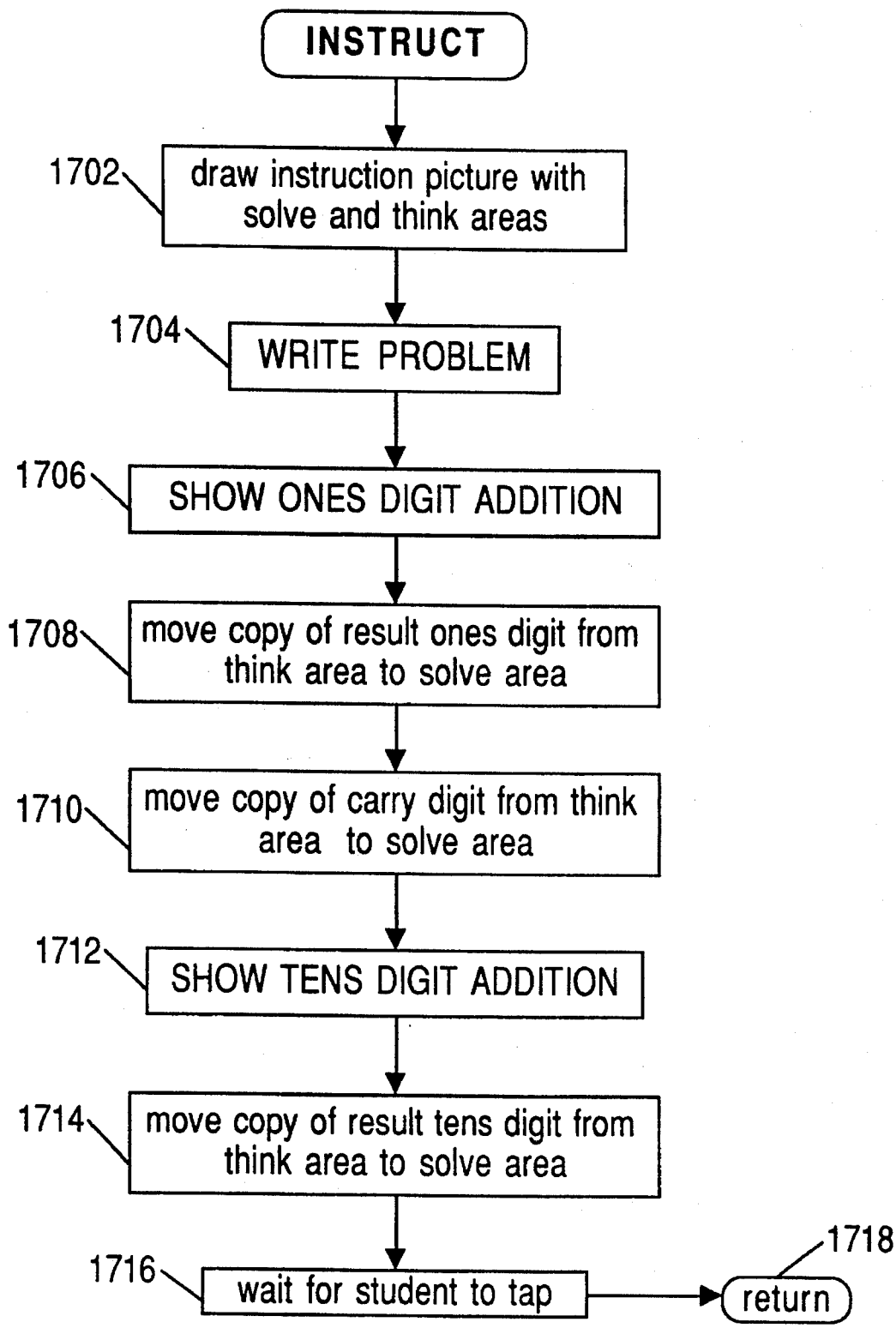
FIG. 17 is a flow chart describing the logic of the INSTRUCT function in the lesson.

FIG. 17 is a flow chart describing the logic of the INSTRUCT function in the lesson. Block 1702 draws an instruction picture on the screen 12, wherein the screen 12 is logically subdivided into "solve" and "think" areas. Block 1704 performs the WRITE PROBLEM function, as described in more detail in FIG. 22. Block 1706 performs the SHOW ONES DIGIT ADDITION function, as described in more detail in FIG. 23. Block 1708 moves a copy of the result ones digit on the screen 12 from the think area to the solve area. Block 1710 moves a copy of the carry digit on the screen 12 from the think area to the solve area. Block 1712 performs the SHOW TENS DIGIT ADDITION function, as described in more detail in FIG. 24. Block 1714 moves a copy of the result tens digit on the screen 12 from the think area to the solve area. Block 1716 waits for the student to tap the stylus 14 on the screen 12. Block 1718 terminates the function.

Figure 18:
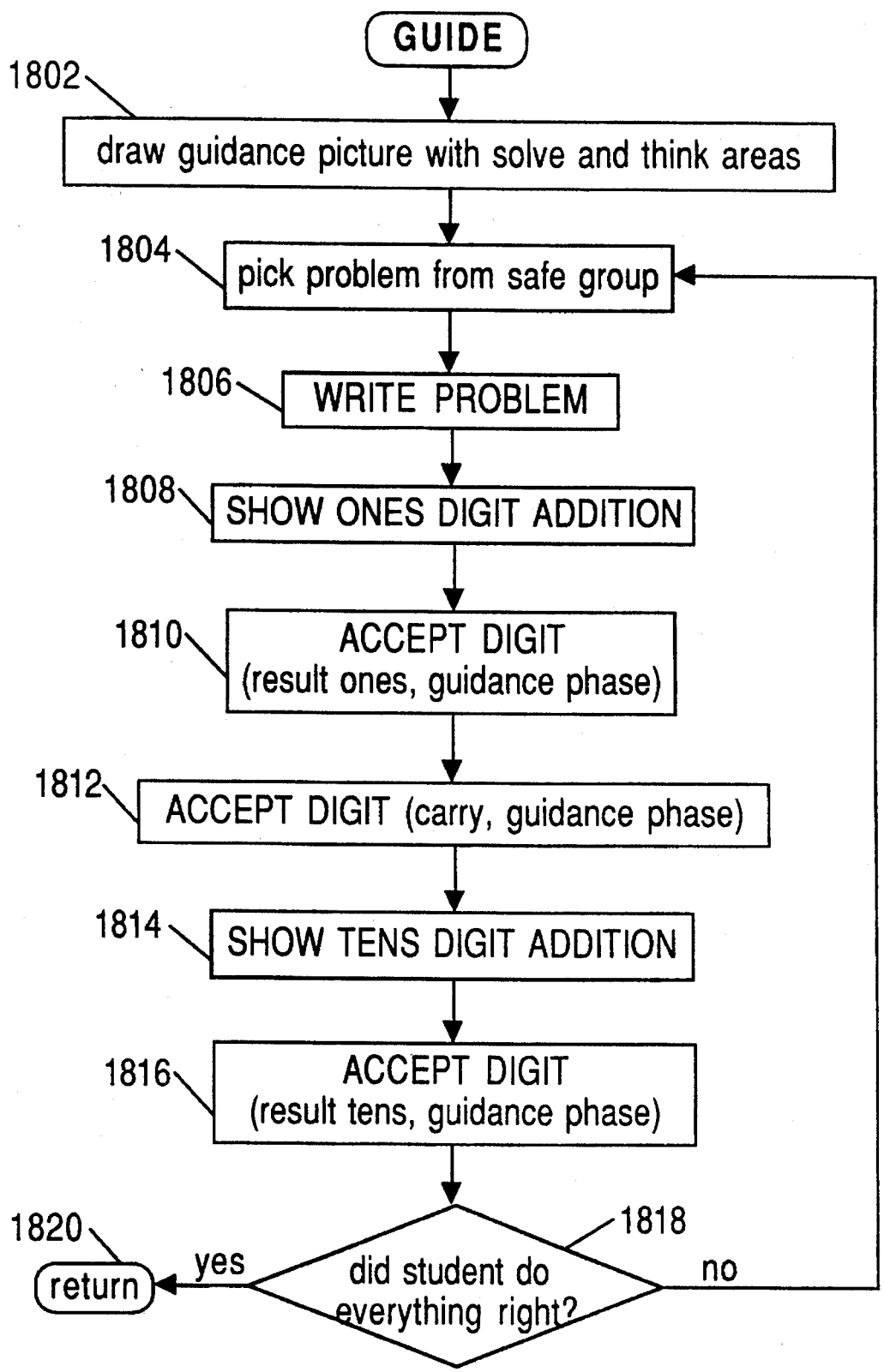
FIG. 18 is a flow chart describing the logic of the GUIDE function in the lesson.

FIG. 18 is a flow chart describing the logic of the GUIDE function in the lesson. Block 1802 draws a guidance picture on the screen 12, wherein the screen 12 is logically subdivided into "solve" and "think" areas. Block 1804 picks a problem from a safe problem group. Block 1806 performs the WRITE PROBLEM function, as described in more detail in FIG. 22. Block 1808 performs the SHOW ONES DIGIT ADDITION function, as described in more detail in FIG. 23. Block 1810 performs the ACCEPT DIGIT function, as described in more detail in FIGS. 25A and 25B, for the result ones digit in the guidance phase. Block 1812 performs the ACCEPT DIGIT function, as described in more detail in FIG. 25, for the carry digit in the guidance phase. Block 1814 performs the SHOW TENS DIGIT ADDITION function, as described in more detail in FIG. 24. Block 1816 performs the ACCEPT DIGIT function, as described in more detail in FIGS. 25A and 25B, for the result tens digit in the guidance phase. Block 1818 is a decision block that tests the flag indicating whether the student did everything correctly. If not, control transfers to block 1804. If so, control transfers to block 1820 and the function terminates.

Figure 19:
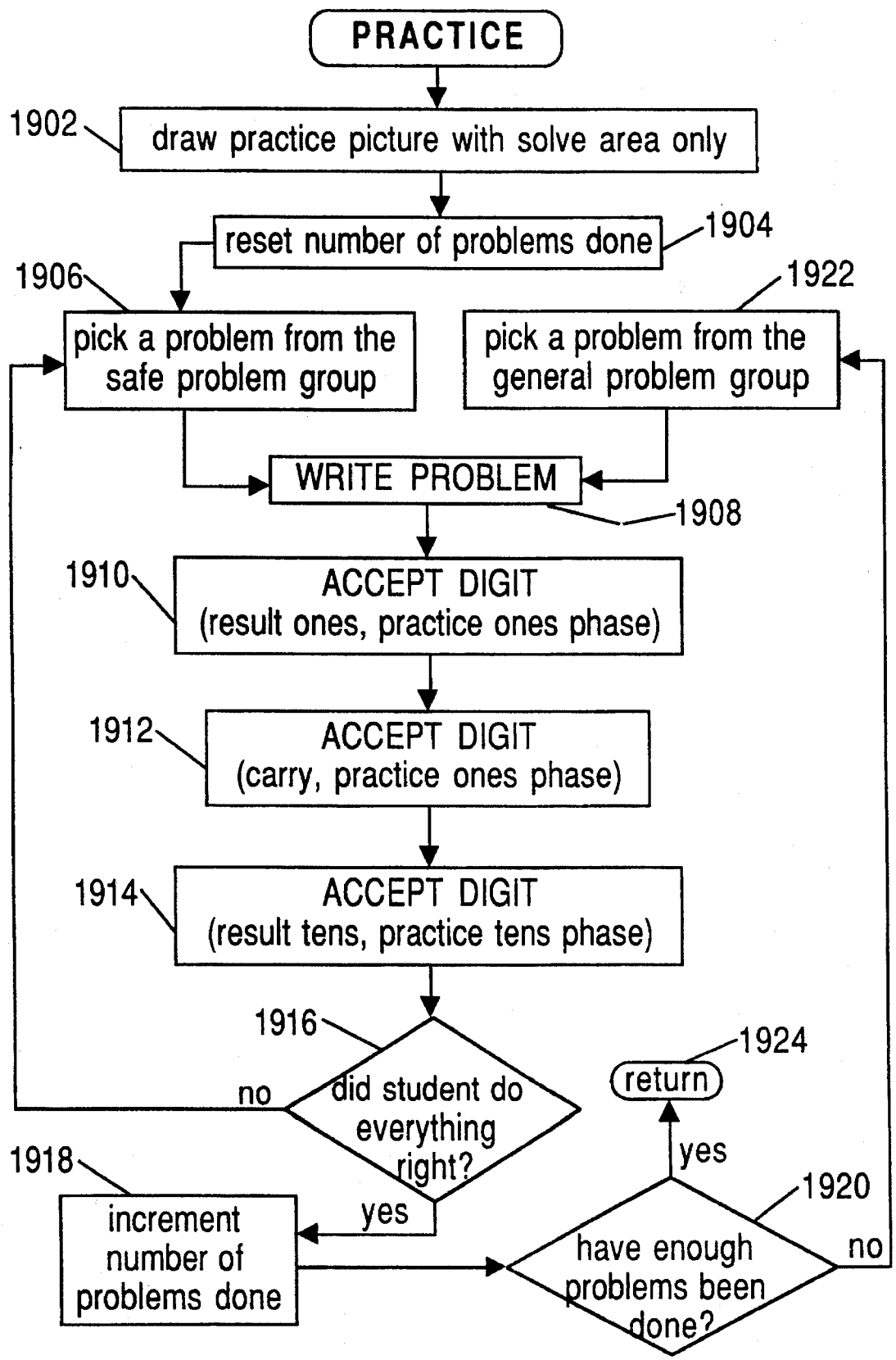
FIG. 19 is a flow chart describing the logic of the PRACTICE function in the lesson.

FIG. 19 is a flow chart describing the logic of the PRACTICE function in the lesson. Block 1902 draws a practice picture on the screen 12, wherein the screen 12 has only a "solve" area. Block 1904 resets the number of problems done. Block 1906 picks a problem from the safe problem group. Block 1908 performs the WRITE PROBLEM function, as described in more detail in FIG. 22. Block 1910 performs the ACCEPT DIGIT function, as described in more detail in FIGS. 25A and 25B, for the result ones digit in the practice ones phase. Block 1912 performs the ACCEPT DIGIT function, as described in more detail in FIGS. 25A and 25B, for the carry digit in the practice ones phase. Block 1914 performs the ACCEPT DIGIT function, as described in more detail in FIGS. 25A and 25B, for the result tens digit in the practice tens phase. Block 1916 is a decision block that tests the flag indicating whether the student did everything correctly. If not, control transfers to block 1906. If so, control transfers to block 1918 which increments the number of problems done. Block 1920 is a decision block that determines whether enough problems have been done. If not, control transfers to block 1922 which picks a problem from the general problem group. If so, control transfers to block 1924 which terminates the function.

Figure 20:
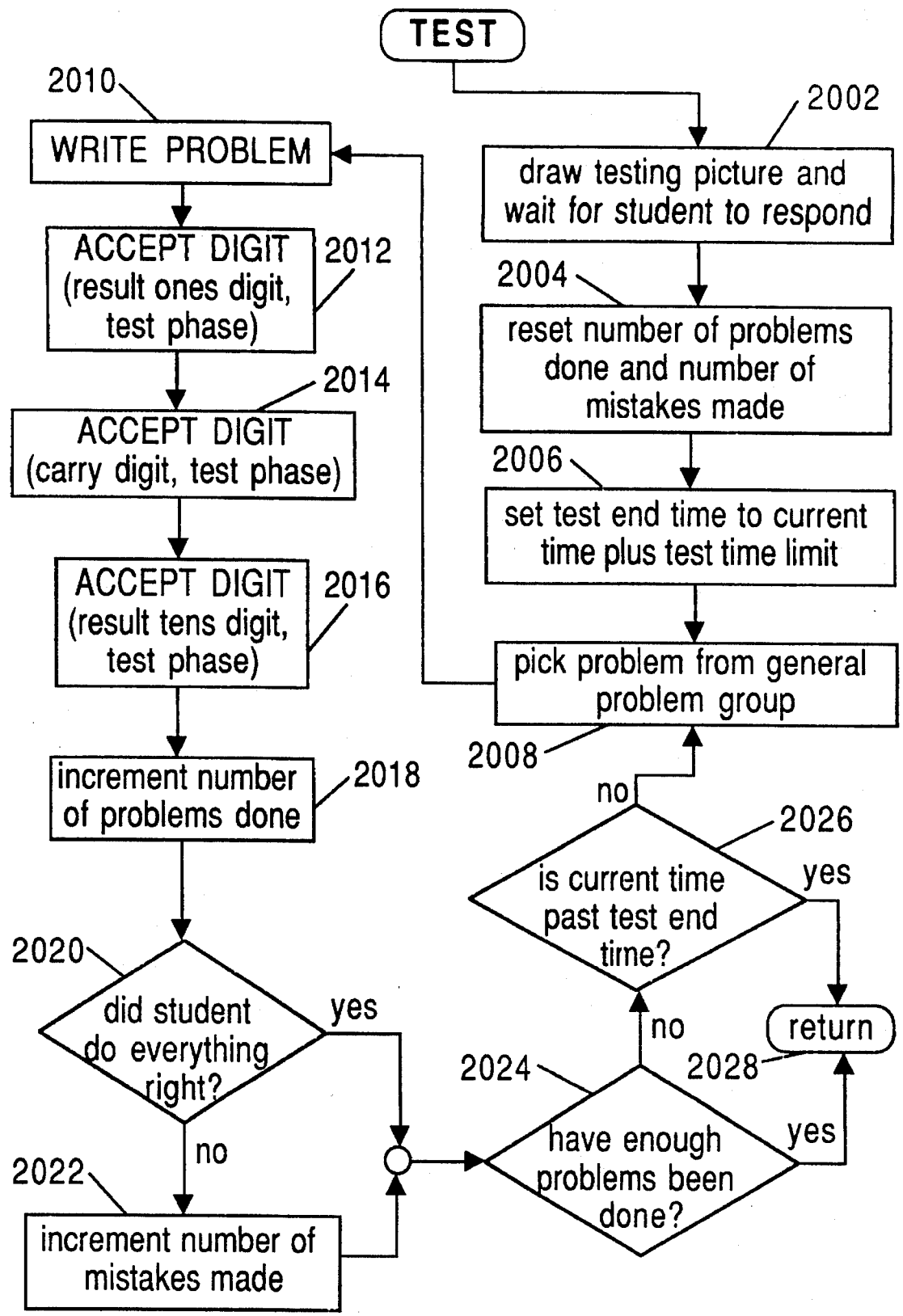
FIG. 20 is a flow chart describing the logic of the TEST function in the lesson.

FIG. 20 is a flow chart describing the logic of the TEST function in the lesson. Block 2002 draws a test picture on the screen 12 and waits for the student to respond. Block 2004 resets the number of problems done and the number of mistakes made. Block 2006 sets a test end time to the current time plus the test time limit. Block 2008 picks a problem from the general problem group. Block 2010 performs the WRITE PROBLEM function, as described in more detail in FIG. 22. Block 2012 performs the ACCEPT DIGIT function, as described in more detail in FIGS. 25A and 25B, for the result ones digit in the test phase. Block 2014 performs the ACCEPT DIGIT function, as described in more detail in FIGS. 25A and 25B, for the carry digit in the test phase. Block 2016 performs the ACCEPT DIGIT function, as described in more detail in FIGS. 25A and 25B, for the result tens digit in the test phase. Block 2018 increments the number of problems done. Block 2020 is a decision block that tests the flag indicating whether the student did everything right. If not, control transfers to block 2022 which increments the number of mistakes made. If so, control transfers to block 2024. Block 2024 is a decision block that determines whether enough problems have been done. If so, control transfers to block 2028 which terminates the function. If not, control transfers to block 2026. Block 2026 is a decision block that determines whether the current time is past the test end time. If not, control transfers to block 2008. If so, control transfers to block 2028.

Figure 21:
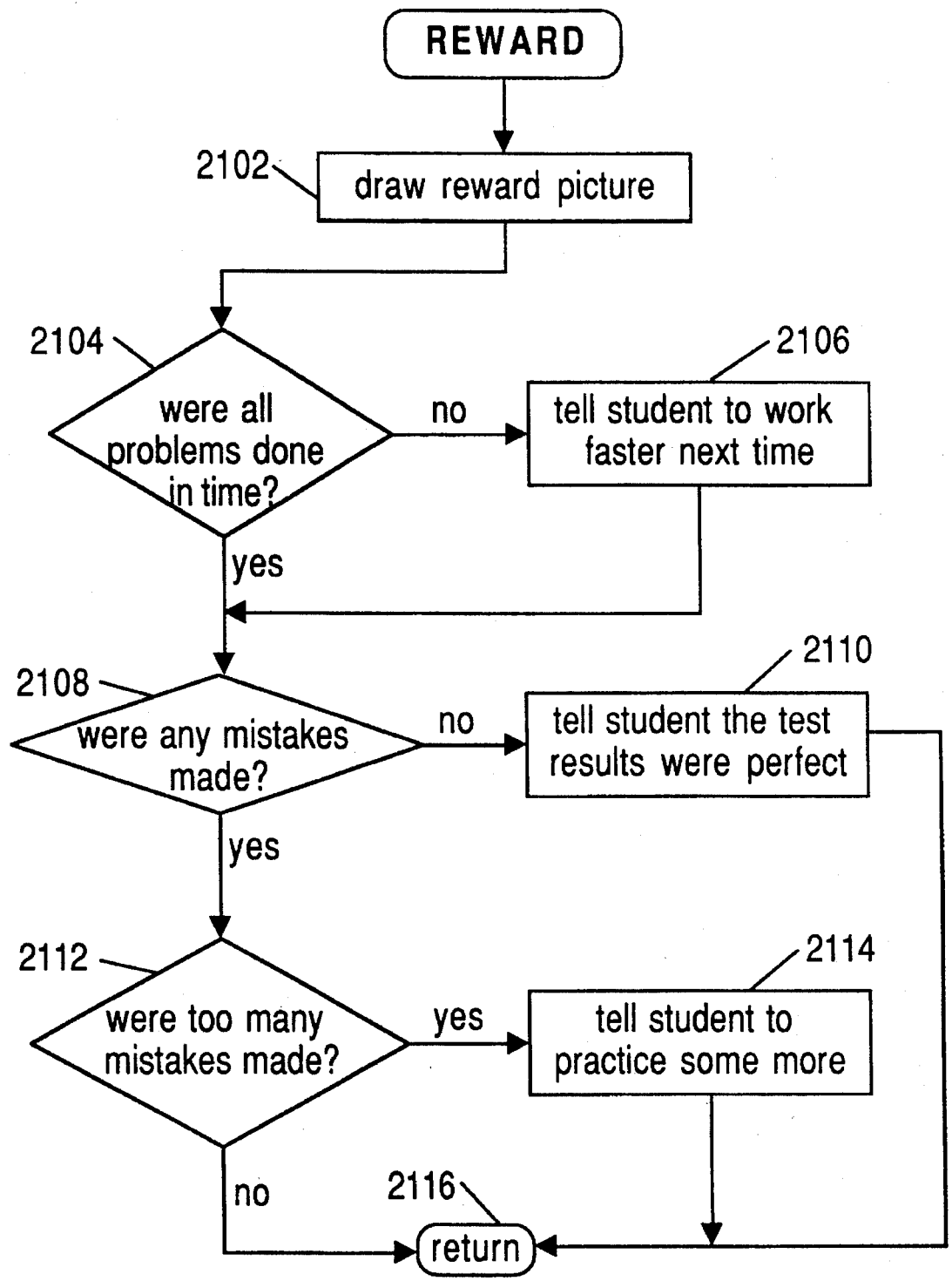
FIG. 21 is a flow chart describing the logic of the REWARD function in the lesson.

FIG. 21 is a flow chart describing the logic of the REWARD function in the lesson. Block 2102 draws a reward picture on the screen 12. Block 2104 is a decision block that determines whether all the problems were done in time. If not, block 2106 displays a message on the screen 12 telling the student to work faster next time. Block 2108 is a decision block that determines whether any mistakes were made. If not, block 2110 displays a message on the screen 12 that tells the student that the test results were perfect. If so, control transfers to block 2112. Block 2112 is a decision block that determines whether there were too many mistakes made. If so, block 2114 displays a message on the screen 12 that tells the student to practice some more. Block 2116 terminates the function.

Figure 22:
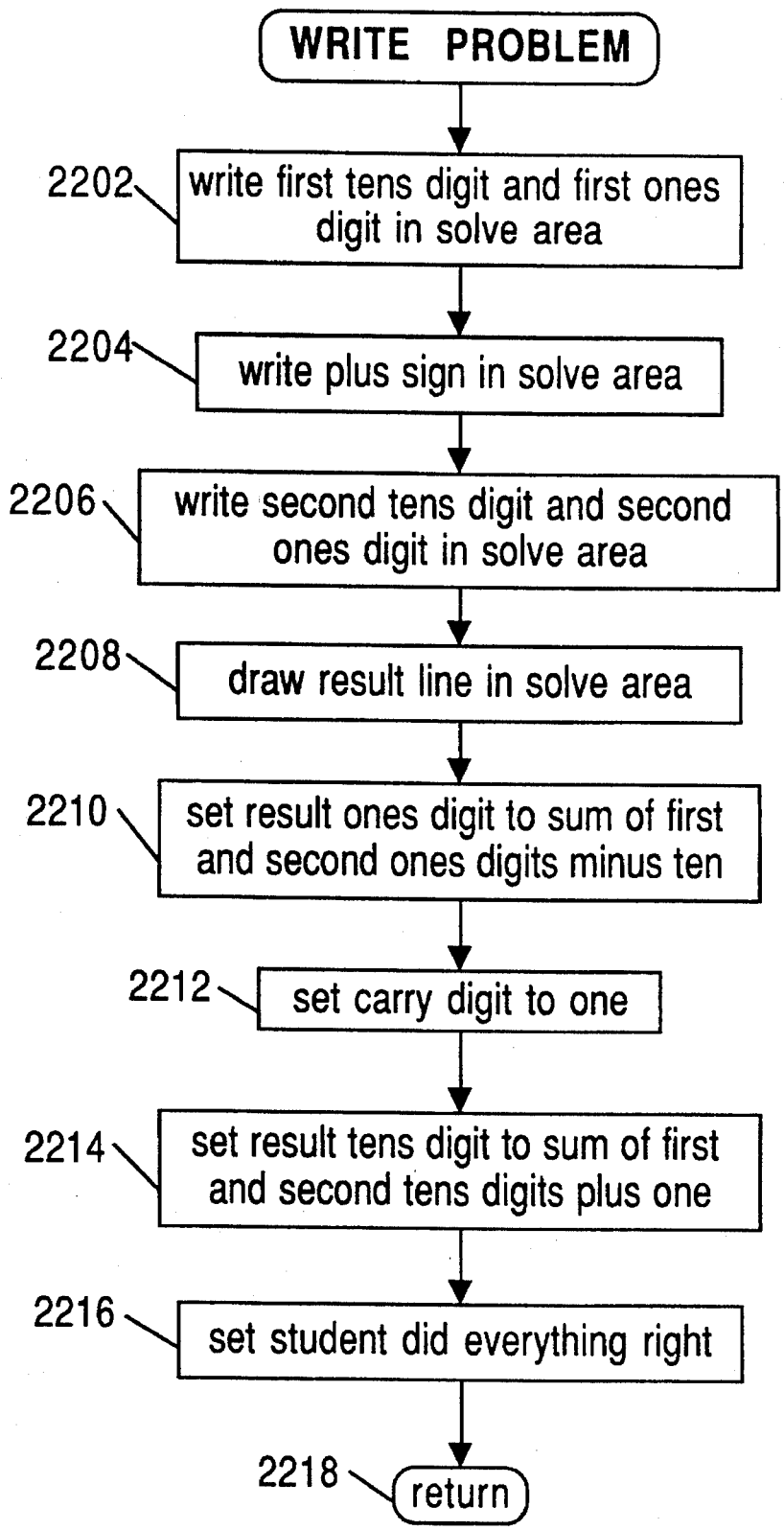
FIG. 22 is a flow chart describing the logic of the WRITE PROBLEM function in the lesson.

FIG. 22 if a flow chart describing the logic of the WRITE PROBLEM function in the lesson. Block 2202 writes the first tens digit and the first ones digit on the screen 12 in the solve area. Block 2204 writes a plus sign on the screen 12 in the solve area. Block 2206 writes a second tens digit and a second ones digit on the screen 12 in the solve area. Block 2208 draws a result line on the screen 12 in the solve area. Block 2210 sets the result ones digit to the sum of the first and second ones digits minus ten. Block 2212 sets the carry digit to one. Block 2214 sets the result tens digit to the sum of the first and second tens digits plus one. Block 2216 sets a flag indicating that the student did everything correctly. Block 2218 terminates the function.

Figure 23:
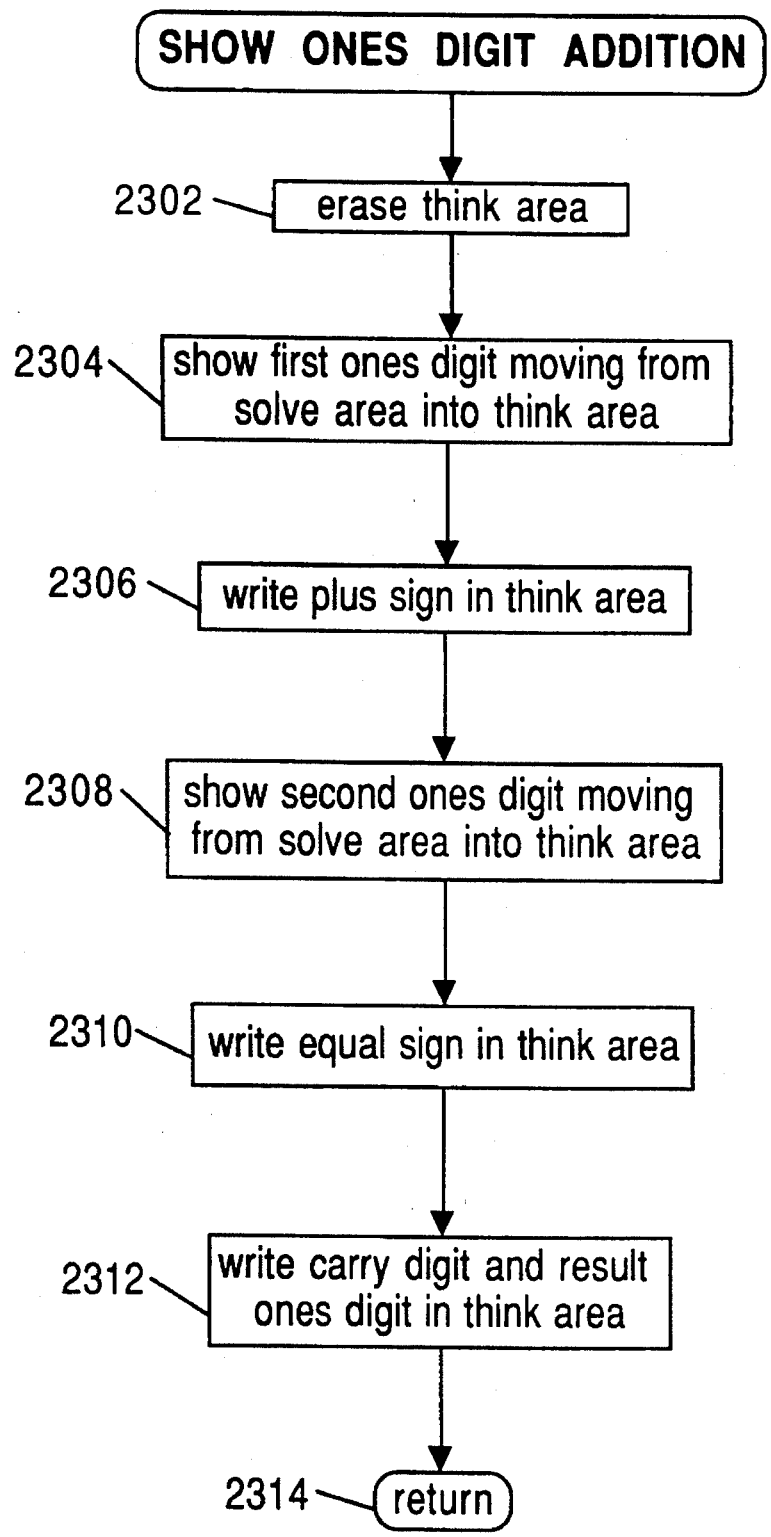
FIG. 23 is a flow chart describing the logic of the SHOW ONES DIGIT ADDITION function in the lesson.

FIG. 23 is a flow chart describing the logic of the SHOW ONES DIGIT ADDITION function in the lesson. Block 2302 erases the think area of the screen 12. Block 2304 shows the first ones digit moving on the screen 12 from the solve area to the think area. Block 2306 writes a plus sign on the screen 12 in the think area. Block 2308 shows the second ones digit moving on the screen 12 from the solve area into the think area. Block 2310 writes an equal sign on the screen 12 in the think area. Block 2312 writes the carry digit and results one digit on the screen 12 in the think area. Block 2314 terminates that function.

Figure 24:
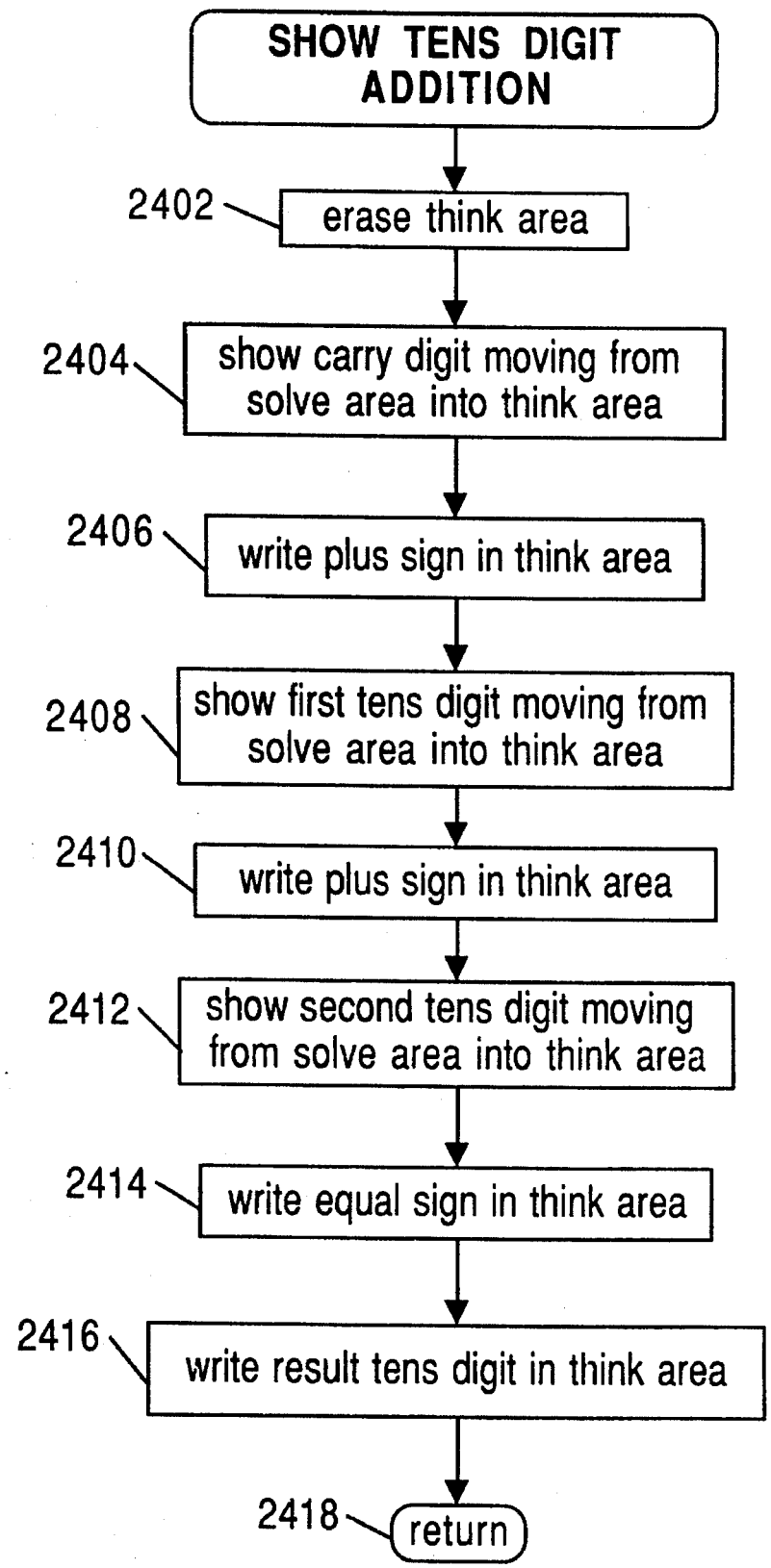
FIG. 24 is a flow chart describing the logic of the SHOW TENS DIGIT ADDITION function in the lesson.

FIG. 24 is a flow chart describing the logic of the SHOW TENS DIGIT ADDITION function in the lesson. Block 2402 erases the think area on the screen 12. Block 2404 shows the carry digit moving on the screen 12 from the solve area into the think area. Block 2406 writes a plus sign on the screen 12 in the think area. Block 2408 shows the first tens digit moving on the screen 12 from the solve area into the think area. Block 2410 writes a plus sign on the screen 12 in the think area. Block 2412 shows the second tens digit moving on the screen 12 from the solve area into the think area. Block 2414 writes an equal sign on the screen 12 in the think area. Block 2416 writes the result tens digit on the screen 12 in the think area. Block 2418 terminates the function.

Figure 25A:
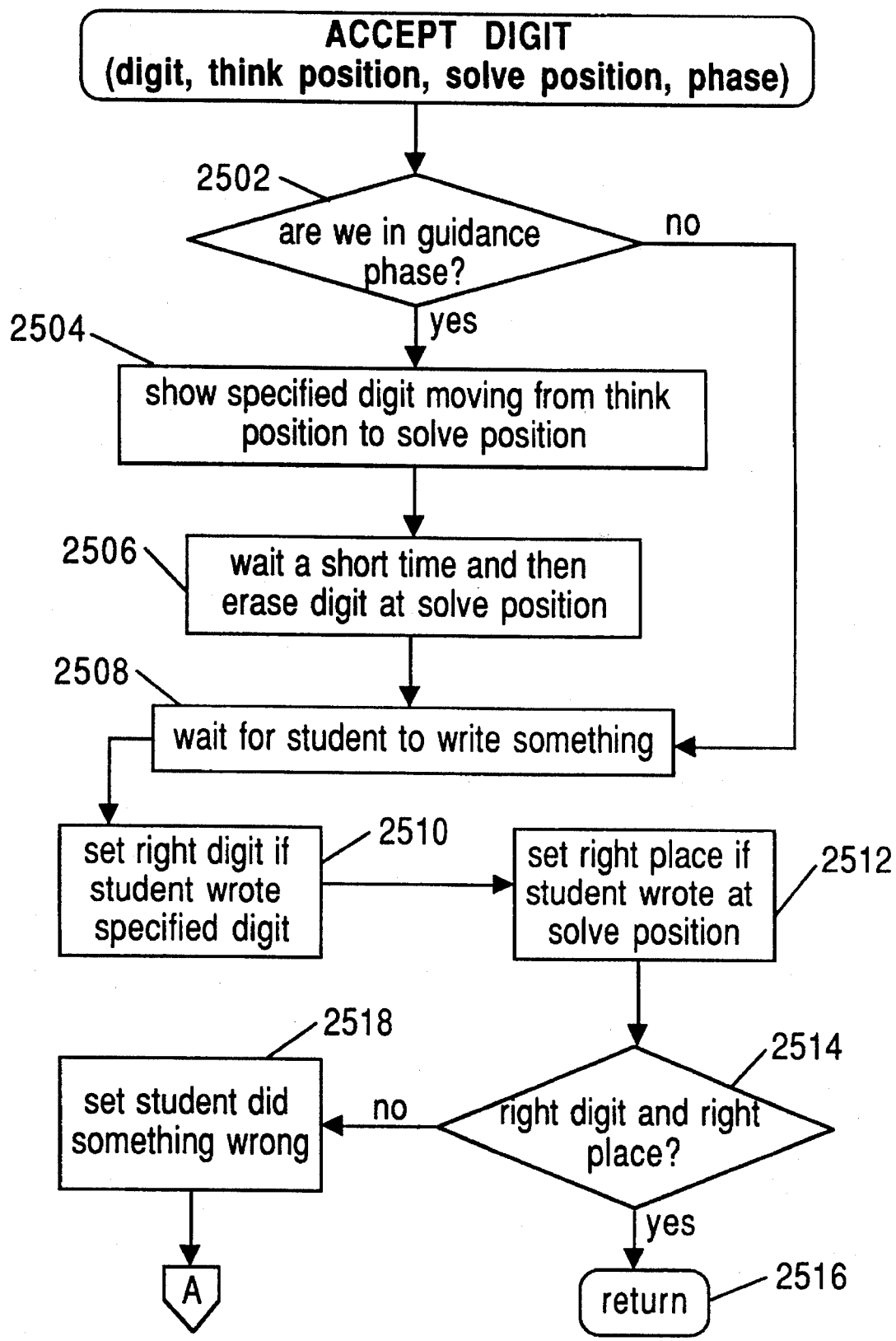
FIGS. 25A and 25B are a flow chart describing the logic of the ACCEPT DIGIT function in the lesson.
Figure 25B:
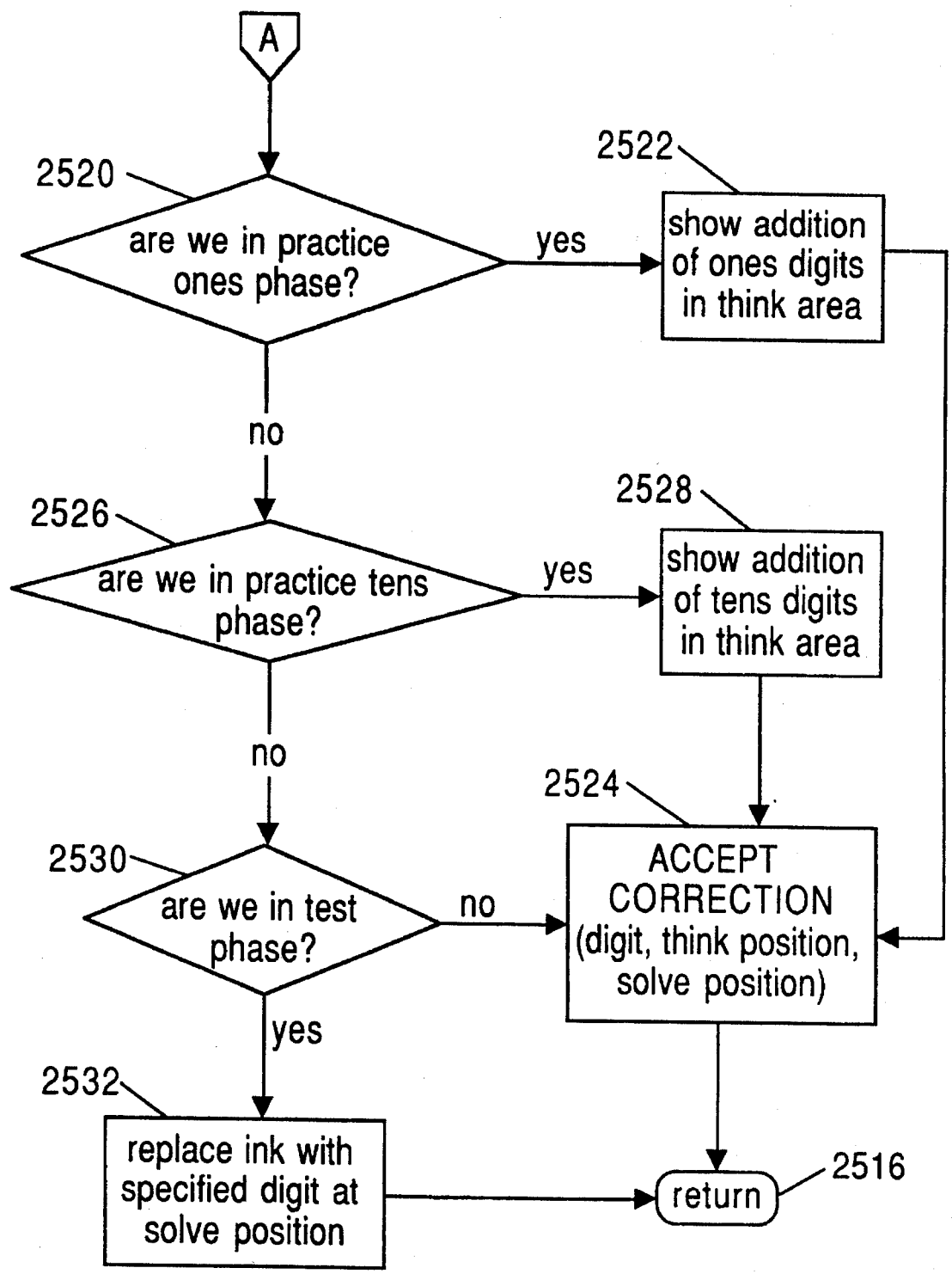

FIGS. 25A and 25B are a flow chart describing the logic of the ACCEPT DIGIT function in the lesson. The ACCEPT DIGIT function accepts as parameters, a digit, think position, solve position and phase. Block 2502 is a decision block that determines whether or not the lesson is in the guidance phase. If so, block 2504 shows the specified digit moving on the screen 12 from the think position to the solve position. Block 2506 waits a short time and then erases the digit on the screen 12 at the solve position. Block 2508 waits for the student to write something on the screen 12. Block 2510 sets a flag indicating a right digit if the student wrote the specified digit. Block 2512 sets a flag indicating a right place, if the student wrote at the solve position on the screen 12. Block 2514 is a decision block that determines whether both the right digit and right place flags are set. If so, block 2516 terminates the function. If not, block 2518 sets a flag indicating that the student did something wrong. Block 2520 is a decision block that determines whether the TeachPad computer 10 is in the practice ones phase. If so, block 2522 shows the addition of the ones digits on the screen 12 in the think area. Block 2524 performs the ACCEPT CORRECTION function, as described in more detail in FIG. 26, for the specified digit, think position and solve position. Block 2526 is a decision block that determines whether the lesson is in the practice tens phase. If so, block 2528 shows the addition of the tens digit on the screen 12 in the think area. If not, control transfers to block 2530. Block 2530 is the decision block that determines whether the lesson is in the test phase. If not, control transfers to block 2524. If so, block 2532 replaces the ink on the screen 12 with the specified digit at the solve position.

Figure 26:
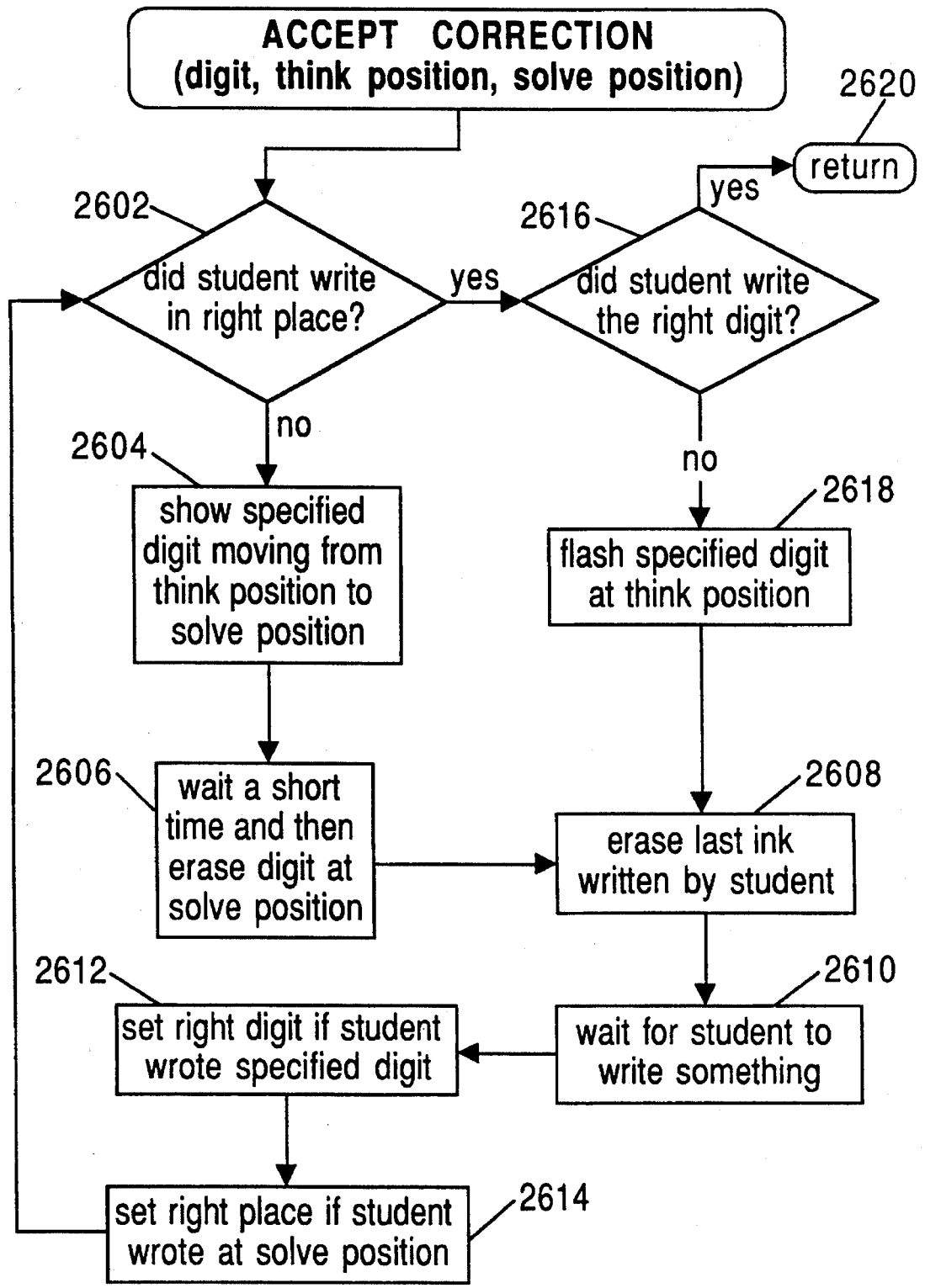
FIG. 26 is a flow chart describing the logic of the ACCEPT CORRECTION function in the lesson.

FIG. 26 is a flow chart describing the logic of the ACCEPT CORRECTION function in the lesson. The ACCEPT CORRECTION function accepts as parameters a digit, think position and solve position. Block 2602 is a decision block that determines whether the student wrote on the screen 12 in the right place. If not, block 2604 shows a specified digit moving on the screen 12 from the think position to the solve position. Block 2606 waits a short time and then erases the digit on the screen 12 at the solve position. Block 2608 erases the last ink written by the student on the screen 12. Block 2610 waits for the student to write something on the screen 12. Block 2612 sets a flag indicating a right digit if the student wrote the specified digit. Block 2614 sets a flag indicating the right place if the student wrote at the solve position. If block 2602 determined that the student wrote in the right place, control transfers to block 2616. Block 2616 is a decision block that determines whether the student wrote the right digit. If not, block 2618 flashes the specified digit on the screen 12 at the think position. If so, control transfers to block 2620 which terminates the function.

CONCLUSION

In summary, the present invention discloses a computer-implemented, pen-based teaching system that recognizes handwritten input. The system comprises a display simulating a sheet of paper, and a stylus simulating a pen. The system uses handwriting recognition to interact with the student, so that the student enters input into the system as though it were a piece of scratch paper.

The foregoing description of the preferred embodiment of the present invention has been presented only for the purposes of illustration and description. The foregoing description is not intended to be exhaustive or to limit the invention to the precise form disclosed. Many modifications and variations are possible in light of the teaching herein. For example, the following paragraphs describe some alternatives in accomplishing the same invention.

Those skilled in the art will recognize that the present invention is applicable to systems with different configurations of devices and components. The example configurations of devices and components cited in the present specification are for illustrative purposes only and are not intended to be exhaustive or to limit the invention to the precise form disclosed.

Those skilled in the art will recognize that the present invention is applicable to systems with different configurations of software and lesson scripts. The example configurations of software and lessons scripts cited in the present specification are for illustrative purposes only and are not intended to be exhaustive or to limit the invention to the precise form disclosed.

It is intended that the scope of the invention be limited not by this detailed description, but rather by the claims appended hereto.

What is claimed is:

1. A computer-implemented teaching system, comprising:

(a) a display screen covered by a touch sensitive surface; and (b) a processing circuit, coupled to the display screen and touch sensitive surface, for recording movements of a pointing member as the pointing member traces across the surface, for recognizing the recorded movements of the pointing member across the surface as handwritten input, for interpreting the handwritten input as characters, numbers and commands, and for displaying the recorded movements of the pointing element on the display screen, the processing circuit further comprising instructional means for interpreting lesson scripts to generate a lesson sequence for teaching mental skills, for displaying the lesson sequence on the display screen, and for recognizing a student's response to the lesson sequence from the characters, numbers and commands.

2. The invention as set forth in claim 1 above, wherein the instructional means further comprises guidance means for animating a problem-solving example in the lesson sequence.

3. The invention as set forth in claim 1 above, wherein the instructional means further comprises feedback indication means for indicating the correctness of the student's response immediately upon interpreting the characters, numbers and commands.

4. The invention as set forth in claim 1 above, wherein the instructional means further comprises means for displaying additional instruction material on the display screen when the student's response is incorrect.

5. The invention as set forth in claim 1 above, wherein the instructional means further comprises means for interpreting the lesson scripts to determine an operation of the lesson sequence.

6. The invention as set forth in claim 1 above, wherein the instructional means further comprises voice synthesis means for converting text in the lesson scripts into speech.

7. The invention as set forth in claim 1 above, wherein the instructional means further comprises means for tracking the student's status and progress.

8. The invention as set forth in claim 1 above, wherein the instructional means further comprises means for simultaneously displaying information on the display screen and an external monitor attached to the system.

9. The invention as set forth in claim 1 above, wherein the instructional means further comprises means for displaying a problem to be solved by the student on the display, wherein the display screen is logically divided into "solve" and "think" subareas, and the problem is displayed in the "solve" subarea.

10. The invention as set forth in claim 9 above, wherein the instructional means further comprises means for displaying a solution to the problem in the "think" subarea of the display screen, wherein the solution comprises one or more problem solving steps displayed sequentially.

11. A computer-implemented teaching method, comprising the steps of:

(a) interpreting lesson scripts to generate a lesson sequence for teaching mental skills;

(b) displaying the lesson sequence on a display screen covered by a touch sensitive surface;

(c) recording movements of a pointing member in a memory as the pointing member traces across the surface;

(d) displaying the recorded movements of the pointing member on the display screen;

(e) recognizing the recorded movements of the pointing member as handwritten input and interpreting the handwritten input as characters, numbers and commands; and (f) recognizing a student's response to the lesson sequence from the characters, numbers and commands.

12. The invention as set forth in claim 11 above, further comprising the step of animating a problem-solving example in the lesson sequence.

13. The invention as set forth in claim 11 above, further comprising the step of indicating the correctness of the student's response immediately upon recognition of the characters, numbers and commands.

14. The invention as set forth in claim 11 above, further comprising the step of displaying additional instruction material on the display screen when the student's response is incorrect.

15. The invention as set forth in claim 11 above, further comprising the step of interpreting the lesson scripts to determine an operation of the lesson sequence.

16. The invention as set forth in claim 11 above, further comprising the step of converting text in the lesson scripts into speech.

17. The invention as set forth in claim 11 above, further comprising the step of tracking the student's status and progress.

18. The invention as set forth in claim 11 above, further comprising the step of simultaneously displaying information on the display screen and an external monitor attached to the system.

19. The invention as set forth in claim 11 above, further comprising the step of displaying a problem to be solved by the student on the display screen, wherein the display screen is logically divided into "solve" and "think" subareas, and the problem is displayed in the "solve" subarea.

20. The invention as set forth in claim 11 above, further comprising the step of displaying a solution to the problem in the "think" subarea of the display screen, wherein the solution comprises one or more problem solving steps displayed sequentially.

21. A computer-implemented teaching method, comprising the steps of:

(a) displaying a lesson sequence on a display screen covered by a touch sensitive surface, wherein the lesson sequence comprises a problem to be solved by the student on the display, the display screen is logically divided into "solve" and "think" subareas, and the problem is displayed in the "solve" subarea;

(b) recording movements of a pointing member in a memory as the pointing member traces across the surface;

(c) displaying the recorded movements of the pointing member on the display screen;

(d) recognizing the recorded movements of the pointing member as handwritten input and interpreting the handwritten input as characters, numbers and commands; and (e) recognizing a student's response to the lesson sequence from the characters, numbers and commands.

22. The invention as set forth in claim 21 above, further comprising the step of displaying a solution to the problem in the "think" subarea of the display screen, wherein the solution comprises one or more problem solving steps displayed sequentially.

23. A computer-implemented teaching system, comprising:
 (a) a display screen covered by a touch sensitive surface; and
 (b) a processing circuit, coupled to the display screen and touch sensitive surface, for recording movements of a pointing member as the pointing member traces across the surface, for recognizing the recorded movements of the pointing member across the surface as handwritten input, for interpreting the handwritten input as characters, numbers and commands, and for displaying the recorded movements of the pointing element on the display screen, the processing circuit further comprising instructional means for displaying a lesson sequence on the display screen, wherein the lesson comprises a problem to be solved by the student on the display, the display screen is logically divided into "solve" and "think" subareas, and the problem is displayed in the "solve" subarea.

24. The invention as set forth in claim 23 above, wherein the instructional means further comprises means for displaying a solution to the problem in the "think" subarea of the display screen, wherein the solution comprises one or more problem solving steps displayed sequentially.

* * * * *